United States Patent [19]

Ewing, Jr. et al.

[11] 3,810,162

[45] May 7, 1974

[54] NONLINEAR CLASSIFICATION RECOGNITION SYSTEM

[75] Inventors: William Steele Ewing, Jr., Dallas; Thomas Walter Ellis, Richardson; William Clay Choate, Dallas, all of Tex.

[73] Assignee: Texas Instruments Incorporated, Dallas, Tex.

[22] Filed: June 1, 1970

[21] Appl. No.: 42,428

[52] U.S. Cl. .................................................. 340/172.5

[51] Int. Cl. .................................................. G06f 15/18

[58] Field of Search ........................ 340/172.5, 146.3

[56] References Cited

UNITED STATES PATENTS

| | | | |
|---|---|---|---|
| R26,772 | 1/1970 | Lazarus | 340/172.5 |
| 3,446,950 | 5/1969 | King, Jr. et al. | 340/172.5 |
| 3,333,249 | 7/1967 | Clapper | 340/172.5 |
| 3,309,674 | 3/1967 | Lemay | 340/172.5 |
| 3,388,381 | 6/1968 | Prywes et al. | 340/172.5 |
| 3,241,124 | 3/1966 | Newhouse | 340/172.5 |
| 3,346,844 | 10/1967 | Scott et al. | 340/172.5 |
| 3,551,895 | 12/1970 | Driscoll, Jr. | 340/172.5 |

*Primary Examiner*—Gareth D. Shaw

[57] ABSTRACT

In a classification recognition system comprised of a trainable non-linear signal processor having at least one input signal U and one desired output signal Z applied thereto during training and at least one actual output signal X derived therefrom during execution, an improved subsystem is provided for selecting a proper output X according to some predetermined procedure when the processor has identified two or more of the desired output signals Z with the same input signal U during training. Generally, the signal processor stores the desired output signals in registers of a tree-allocated memory array wherein the allocation is determined by a particular input signal U during the training cycle. The subsystem is essentially comprised of an artificial extension of the tree-allocated memory array wherein different values of Z associated with the same input signal U are individually stored during training. In an execution cycle, one or more of such Z's may be selected to become the output X for an input U. In one embodiment of the invention only one of such Z's is selected according to a predetermined scheme whereby the most likely Z is selected to be the actual output X.

6 Claims, 48 Drawing Figures

INVENTOR
William Steele Ewing, Jr.
William Clay Choate
Thomas Walter Ellis
BY
WITNESS
ATTORNEY

| SEARCH | IE(1) | IE(2) | IE(3) | ITOT | I TOTAL | JC | IGI(q)/IAI(q) q→ 1 | 2 | 3 | 4 |
|---|---|---|---|---|---|---|---|---|---|---|
| 1 | 1 | 1 | 2 | 4 | 4 | 2 | $Z_2/3$ | $Z_6/2$ | 1 | 1 |
| 2 | 1 | 1 | 7 | 9 | 4 | 2 | $Z_2/3$ | $Z_6/2$ | 1 | 1 |
| 3 | 1 | 4 | 6 | 11 | 4 | 2 | $Z_2/3$ | $Z_6/2$ | 1 | 1 |
| 4 | 1 | 3 | 4 | 8 | 4 | 2 | $Z_2/3$ | $Z_6/2$ | 1 | 1 |
| 5 | 1 | 3 | 0 | 4 | 4 | 3 | $Z_5/7$ | $Z_2/3$ | $Z_6/2$ | 1 |
| 6 | 0 | 0 | 1 | 1 | 1 | 1 | $Z_7/2$ | 1 | 1 | 1 |

Fig.20

Fig. 25
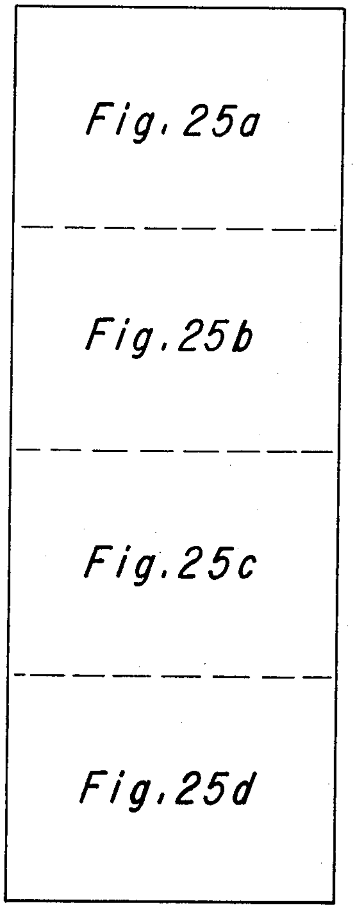
Fig. 25a
Fig. 25b
Fig. 25c
Fig. 25d
Fig. 26
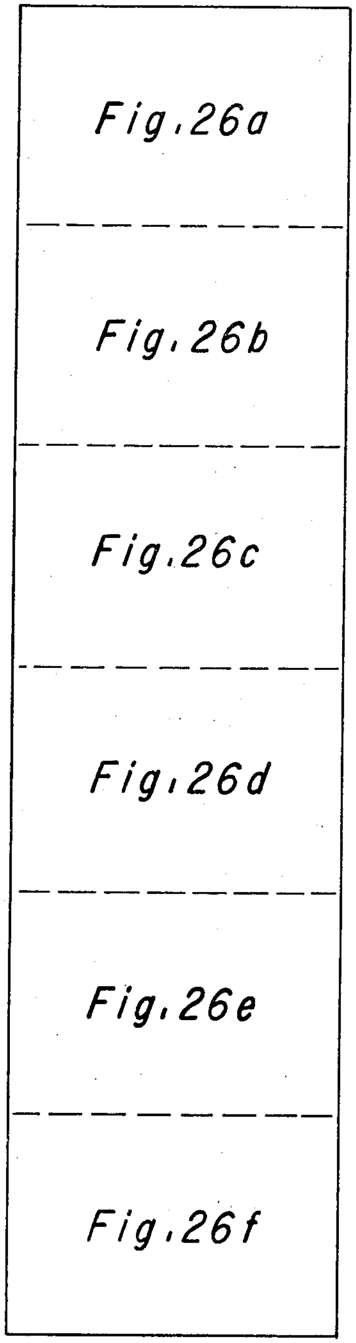
Fig. 26a
Fig. 26b
Fig. 26c
Fig. 26d
Fig. 26e
Fig. 26f

NONLINEAR CLASSIFICATION RECOGNITION SYSTEM

This invention relates to trainable nonlinear processor methods and systems for recognizing and classifying signals, and more particularly, to a subsystem for selecting a particular output signal according to some desired criteria when the processor has identified two or more possible desired output signals as being associated with the same input signal during training.

This invention further relates to the nonlinear processors disclosed in Bose, U.S. Pat. No. 3,265,870, which represents an application of the nonlinear theory discussed by Norbert Weiner in his work entitled *Fourier Integral and Certain of Its Applications*, 1933, Dover Publications, Inc., and to the trainable signal processor systems described in co-pending patent application Ser. No. 889,240 now abandoned, for a "Storage Minimized Optimum Processor," U.S. Pat. No. 3,596,258 for an "Expanded Search Method and System in Trained Processors" and co-pending patent application Ser. No. 889,143 now abandoned, for "Probability Sort in a Storage Minimized Optimum Processor," each filed on Dec. 30, 1969, and assigned to the assignee of the present invention.

Nonlinear processors are generally employed where it is desired to utilize certain of priori information regarding the characteristics of a signal or noise associated with the signal. They are also employed where it is necessary to remove nonlinear distortions. For example, the problems of classification, of which character and verbal word recognition are examples, require, in general, a nonlinear capability. In classification a decision is made relative to a signal, based on an input, which is derived from the signal and noise. Since this is invariably a nonlinear operation, linear systems are ineffective and nonlinear systems must be employed.

A trainable processor is a device or system capable of receiving and digesting information in a training mode of operation and subsequently operating on additional information in an execution mode of operation in the manner determined or learned during training.

The processes of receiving and digesting information comprise the training mode of operation. Training is accomplished by subjecting the processor to typical input signals together with desired outputs or responses to those signals. The combined input and desired output signals used to train the processor are called "training functions." During training the processor determines and stores cause-effect relationships between input signals and corresponding desired outputs. The cause-effection relationships determined during training are called "trained responses."

The post training process of receiving additional information via input signals and operating on it in some desired manner to perform useful tasks is called "execution." More explicitly, for the processors considered herein, one purpose of execution is to produce from the input signal an output, called the actual output, which is the best, or optimal, estimate of the desired output signal. There are a number of useful criteria defining "optimal estimate." One is minimum mean squared error between desired and actual output signals. Another, particularly useful in classification applications, is minimum probability of error.

Optimal, nonlinear processors may be generally of the type disclosed in Bose Pat. No. 3,265,870. Such processors have a wide variety of applications and are applicable to any problem in which a cause-effect relationship can be determined via training. While the present invention may be employed in connection with such processors, it is more particularly related to the processors disclosed and claimed in patent applications Ser. No. 889,240, Ser. No. 889,241 and Ser. No. 889,143 referred to above, which are briefly described within this specification to provide a setting for the description of the present invention.

Generally, the trained responses referred to above are stored in registers of a memory array wherein the location of memory address bears a defininte relation to the digital or quantized analog value of the input signal. This value which is associated with both the input signal and memory address is called a "key."

The trained responses can be stored in a random access memory at locations specified by the keys, that is, the key can be used as the address of the memory at whic the appropriate trained response is stored. Such storage procedure is called direct addressing since the trained response is directly accessed. Direct addressing, however, often makes very poor use of the memory because a sufficient number of storage registers must be reserved for all possible keys, whereas only a few of such keys may be generated in a specific problem. For example, the number of registers required to store all English words of 10 letters or less, using direct addressing, is $26^{10} > 100,000,000,000,000$. Yet *Webster's New Collegiate Dictionary* contains fewer than 100,000 entries. Therefore, less than 0.0000001 percent of the storage that must be dedicated to training in a direct addressing system would actually be utilized. Furthermore, the mere necessity of allocating storage on an a priori basis precludes a number of important applications because the memory required greatly exceeds that which is available.

In order to avoid the problems created by direct addressing, tree structures are employed for the allocation and processing of information files. Generally, an operation based upon a tree structure is described in co-pending patent application Ser. No. 889,240 referred to above. Training functions are generated for the purpose of training the processor. From such training functions are derived a set of key functions and for each unique value thereof a trained response is determined. The key functions and associated training responses are stored as information in a tree-allocated memory array serving as the information file. Since key functions which do not occur are not allocated, storage is employed only on an "as needed" basis. Therefore, in a preferred embodiment the tree-allocated memory array is utilized.

For the purpose of tree allocation, the key is decomposed into components called "key components." Each of the components is associated with a level in the tree structure and all levels of the tree are essential to represent a key. The term "level" and other needed terminology will be described hereafter in detail. Briefly, however, the key components of the input signal are compared with corresponding key components at each level. At the last level, that is, the level corresponding to the last component of the key, the trained response which is associated with the particular key is stored or referenced by a stored address.

Suppose, these elements of the input signal which are selected to comprise the key are the same for two different input signals of which two different corresponding desired output signals. Generally, in solving certain type problems with nonlinear processing, as described in detail in the aforementioned co-pending patent applications, it is desirable to compute for the trained response the expected value of the desired output given that the specified leaf node is selected. This will minimize the mean squared error between the desired and actual output signals. Thus a running average of the conditioned desired output signal is maintained in storage at the leaf along with the weight of the average for the purpose of updating and this average becomes the actual output of the processor during the execution mode.

This method is not, however, applicable to most classification problems. For example, consider a simple character recognition problem in which the objective is to classify various optical patterns into 26 categories corresponding to the 26 letters of the alphabet. Further, let us assume that the desired output for an "A" is "1," the desired output for a "B" is "2," and so forth, so that the desired output for a "Z" would be "26."

Now, with reference to the letters "D" and "O," for example, the components which form the input signal to the processor and hence the key function, may at some time during the training process be the same. The letters are placed on a grid and examined at certain points of the grid. The fewer the grid points, the simpler the system and the less memory space needed, but the more likely it is that the same input signal and corresponding key components will appear for different desired outputs. It is thus easy to see that some compromising must be done and that in an optimal system, at least some letters which are closely related, such as "D" and "0," may occasionally provide the same input signal into the system.

Let us therefore further assume for purposes of discussion that the same pattern comprising an input signal occurs 100 times in training; 75 times corresponding to a "D" (desired output of "4") and 25 times to an "0" (desired output of "15"). According to the mean squared error criterion, the expected value of the desired output or trained resonse would be $[75(4) + 25(15)]/100 = 6.75$. Rounded off to the nearest integer, the trained response stored in the last level of the tree corresponding to the particular input signal would be "7." The number "7," however, corresponds to "G," the seventh letter of the alphabet, but a letter which never once corresponded to the particular input signal during training. The shortcomings of averaging the desired output codings and storing them in a single register are thus evidenced. The most likely letter to occur (maximum likelihood) letter "D" might have been properly determined had the coding of the desired outputs for "D" and "0" been adjacent integers. This method is impractical, however, in that the arrangement of letters, each closest to the other in form such as "A" and "R" and "D" and "O" assigned adjacent integers, might be proper for one input signal pattern but improper for another. Take for example the letters "C," "D," "O" and "Q"; each one of the four letters cannot be adjacent to each of the others.

In a classification recognition system comprising a trainable signal processor having at least one input signal and one desired output signal applied thereto during training and at least one actual output signal derived therefrom during execution, it is therefore an object of the present invention to provide a subsystem for selecting a proper output signal according to some predetermined procedure when the processor has identified two or more of the desired output signals with the same input signal during training.

It is another object of the invention to rpovide a subsystem in such classification recognition system for selecting the most likely desired output signal as the actual output signal when the processor has identified two or more desired output signals with the same input signal during training.

It is a further object of the invention to provide a subsystem in such classification recognition system for storing and producing all desired output signals associated with a single input signal when the processor has identified a plurality of desired output signals with such input signal during training.

It is still another object of the present invention to provide a subsystem in such classification recognition system for storing and assembling, according to degree of likelihood, all desired output signals associated with a single input signal when the processor has identified a plurality of desired ouptut signals with such input signal during training.

These and other objects are accomplished in accordance with the present invention by providing a subsystem essentially comprised of an artificial extended level of the tree-allocated memory array wherein different desired outputs associated with a single input signal are individually stored during training. In an execution cycle, one or more of such desired outputs is selected, according to some predetermined procedure, to become the actual output associated with such input signal. All desired outputs associated with a single input form a class which is stored and may be periodically arranged in an order according to degree of likelihood. In one embodiment of the invention, only one of such desired outputs representing the maximum likelihood is selected to become the actual output. In another embodiment the actual output becomes the entire class of desired outputs associated with the input.

Further objects and advantages of the invention will be apparent from the detailed description and claims and from the accompanying drawings illustrative of the invention wherein:

FIGS. 19 and 20 illustrate an example of a portion of a completed tree array.

FIGS. 21, 21*a*–21*b*, 22–24 comprise flow diagrams representative of the operations of the nonlinear processor of the present invention during both training and execution.

Figure 1:
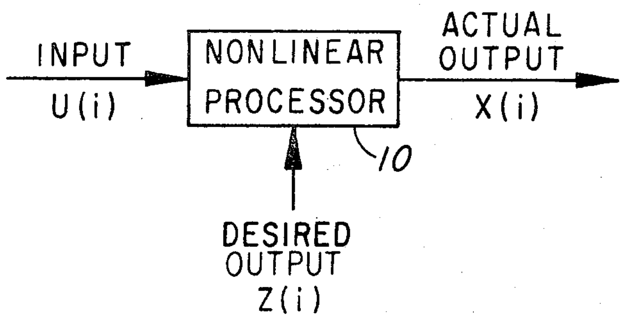
FIG. 1 illustrates, generally, the operation of the nonlinear processor of the classification system of the invention.

FIGS. 25, 25a–25d, 26, 26a–26f illustrate a special purpose computer embodiment of the nonlinear processor of FIG. 1 and, in particular, the subsystem comprising the present invention.

Referring now to the drawings, in simplest form, the processor comprising the classification recognition system is as shown in FIG. 1, identified generally by the numeral 10. There are two inputs, U(*i*) and Z(*i*), and one output, X(*i*). The signals transmitted to and from these inputs and output may comprise a plurality of signals or components of a single signal, in which case the inputs and output represent a set, designated by the letter "i." Input U(*i*) corresponds to the normal input, while Z(*i*) corresponds to the desired output (or response). Output X(*i*) is the processor's estimate of Z(*i*) and will be referred to as the "actual output" to distinguish it from the "desired output," Z(*i*). Operation of the processor involves two phases: a training phase and an execution phase. During the training phase, the signals U(*i*) and Z(*i*) are applied. As noted, U(*i*) represents, in a statistical sense, the normal input and Z(*i*) is the desired output for that input. As training progresses, the internal structure of the processor adapts so that the actual output most nearly approximates the desired output over the training period.

The execution phase is the use of the processor to solve a real-life problem. In this phase, U(*i*) is the actual input and X(*i*) is the estimate of Z(*i*). There is no input to the Z(*i*) terminal since it is now generally unknown. In certain instances, however, where the desired output signal can be ascertained, training may be continued during execution.

When either simulated or recorded data are employed in the training phase, there is obviously no need to use a 1:1 time scale. Thus, a slowly varying process can be accelerated to effect training in less time. Conversely, a rapidly varying process may be slowed so that the data rates do not exceed the capabilities of the training processor which may be embodied in a properly programmed general purpose computer. Execution, which is a simpler process, may subsequently be effected on a faster special purpose machine as well as on the general purpose computer.

The classification recognition system of the invention is applicable to the classification of almost any set of information derived from input signals, whether the input signals are digital or analog. Analog signals are first quantized in a suitable analog-to-digital converter as the processor itself is a digital system. In the case of spoken words, for example, the signal, which is typically analog, is first preprocessed to remove the noise therefrom and then converted into a suitable digital signal. Such preprocessor is described in detail in the Bose patent, referenced above.

In view of the foregoing, it is both impractical and unnecessary to discuss each and every set of information which may be classified utilizing the system of the present invention and only the use of the system for optical character recognition will be described in detail herein.

Figure 2:
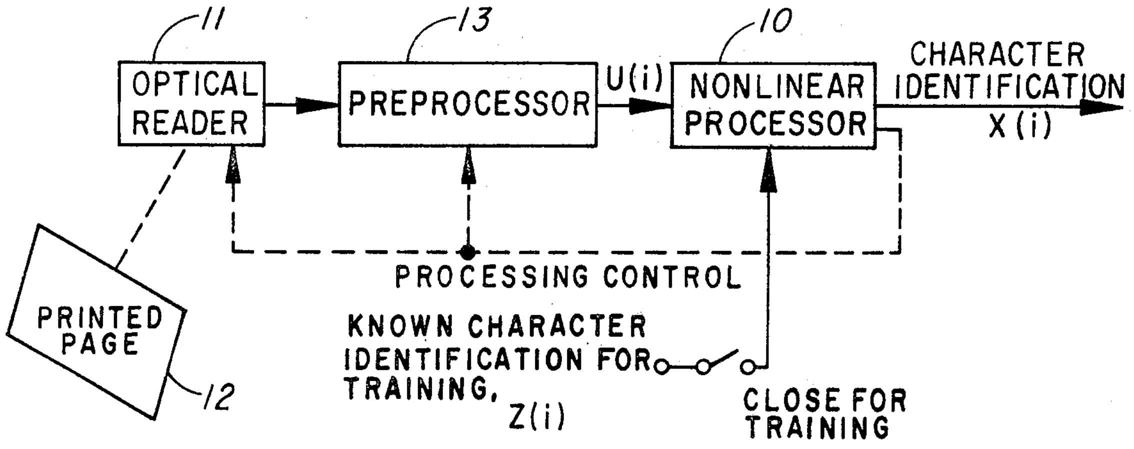
FIG. 2 illustrates, generally, an embodiment of a character recognition system utilizing the nonlinear processor.

The operations involved in applying the nonlinear processor to the character recognition problem are shown in FIG. 2. It has been found to be advantageous to add to the structure of FIG. 1 a preprocessor 13 as indicated in FIG. 2, The function of preprocessor 13 is to reformat the input data in such a way that essential information is conserved, but the data rate is increased as the total information to processor 10 is reduced. This simplifies the task of the processor. In character recognition the functions of preprocessor 13 are primarily character cleanup (removing noise, thinning lines, filling gaps because of poor inking, etc.) and reducing the format of the character image for simplified processing.

In the first operation, optical reader 11 extracts the image from printed page 12 and supplies this image to preprocessor 13. Preprocessor 13 cleans up the character image, removes noise, and reduces the dimension of the character pattern. The reformed pattern, in the form of a digital signal, is supplied to nonlinear processor 10 which performs the character identification. In the process, nonlinear processor 10 governs the operation of preprocessor 13 and optical reader 11. To effect the training phase of the operation, a number of character patterns are read from printed page 12 along with their known identification which are supplied to the processor as the desired output Z(*i*). Once processor 10 has been trained for a representative sample of characters, it is ready for the execution phase of operation. Now, as the character patterns are read off printed page 12 and fed to the system, processor's output X(*i*) provides the best estimate of what the characters are.

Optical reader 11 is typically in the form of a grid. Electric eyes or photosensitive cells are selectively placed at various points on the grid and will generate a logical "1" or logical "0" condition depending upon whether a particular point on the grid is inked or not inked. The resulting signal is in the form of a binary array, each bit position thereof corresponding to a point on the grid.

Figure 3:
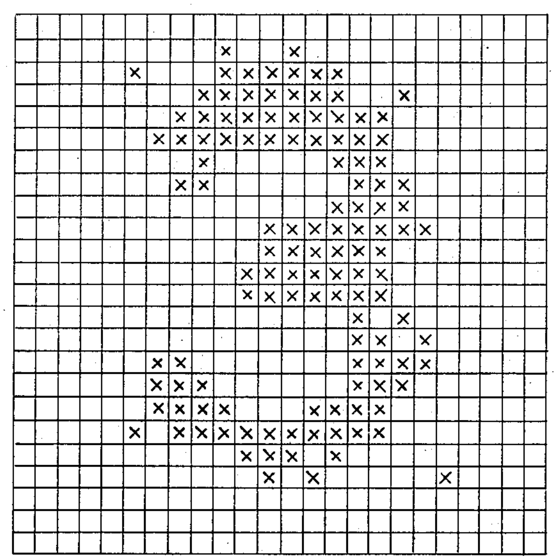
FIG. 3 illustrates the operation of an optical sensor subsystem utilized in conjunction with the character recognition system of FIG. 2.

A typical 24 by 24 point grid is illustrated in FIG. 3. The numeral "3" is being read as shown. Ink appears on the printed page below those electric eyes corresponding to the points on the grid marked with an X which, in turn, transmit a logical 1 signal to the preprocessor. If no ink appears below an electric eye, indicated by a blank square, a logical 0 is sent to the preprocessor.

Figure 4:
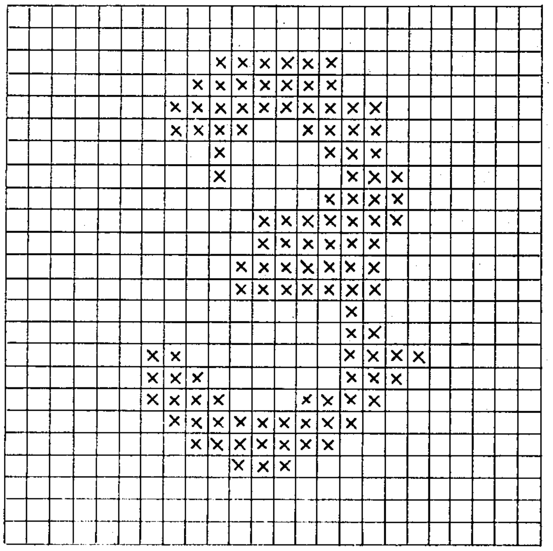
FIGS. 4–6 illustrate the operation of the preprocessor of the character recognition system of FIG. 2.
Figure 5:
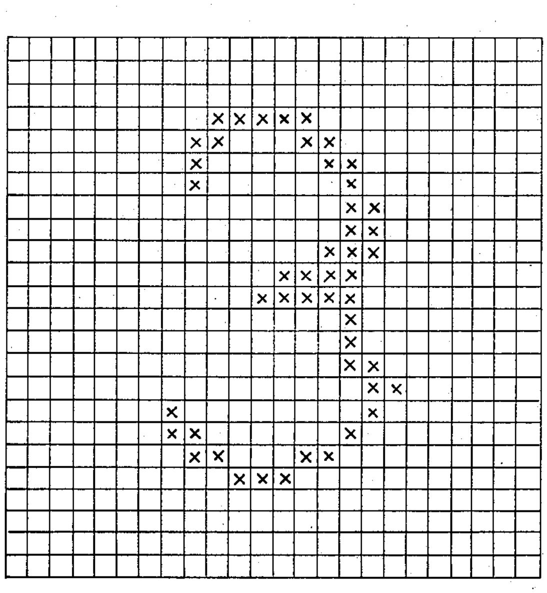
Figure 6:
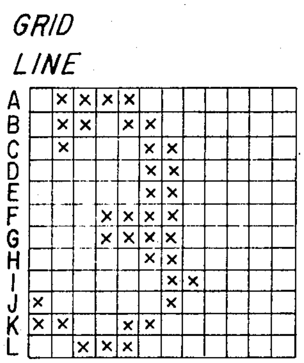

The first operation of the preprocessor, as illustrated in FIG. 4, is to eliminate any noise or stray points (those points unconnected to the main character) and to fill the gaps (those blank points surrounded by "X"'s). At a next preprocessor stage, the character is logically thinned by removal of superfluous logical 1's therefrom. The thinned character is illustrated in FIG. 5. Whatever information (logical 1's) remains is then normalized into information which represents the compacting of the letter onto a final, smaller grid. The normalization of the numeral "3" into a 12 by 12 grid is illustrated in FIG. 6.

Each of the bit positions representing the character, now 144, may then be transmitted directly to the processor. In the illustrated embodiment, however, it has been found advantageous to consider each line of the grid A, B, C . . . L and to convert the binary representation of each such line into its decimal equivalent. By so doing, the number of components comprising the set of information which forms the input to the processor has been reduced to 12. Thus the input signal of such embodiment is the set U(A), U(B), U(C), . . . U(L) .

As indicated earlier, in a preferred embodiment of the invention, a tree-allocated memory array is utilized to store the trained responses. More particularly, the set of information comprising the input signal U($i$) is utilized to define a key function. For the purpose of tree allocation, the key is decomposed into components called key components. A natural decomposition is to associate one key component with each component {U(1), U(2), . . . , U(n)} of the input signal, although this choice is not fundamental. Thus where the twelve lines of a grid are utilized, as illustrated in FIG. 6, the set comprising the input signal is {U(1), U(2) U(3) . . . U(12)}, and each of the key components corresponds to one member of the set. Further, it will be seen that each key component is associated with a level in the tree structure memory array as will henceforth be described in detail.

A graph comprises a set of nodes and a set of unilateral associations specified between pairs of nodes. If node $r$ is associated with node $s$, the association is called a branch from initial node $r$ to terminal node $s$. A path is a sequence of branches such that the terminal node of each branch coincides with the initial node of the succeeding branch. Node $s$ is reachable from node $r$ if there is a path from node $r$ to node $s$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length ($s$—1) from a root is on the $s^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node $m$ comprises the filial set of node $m$, and $m$ is the parent node of that set. A set of nodes reachable from node $m$ is said to be governed by $m$ and comprises the nodes of the subtree rooted at $m$. A chain is a tree, or subtree, which has at most one branch leaving each node.

In the present system, a node is realized by a portion of storage consisting of at least two components, a node value stored in a VAL register associated with the node and an address component designated ADP. The node value serves to distinguish a node from all other nodes of the filial set of which it is a member and corresponds directly with the key component which is associated with the level of the node. The ADP component serves to identify the location of memory of another node belonging to the same filial set. Thus, all nodes of a filial set are linked together by means of their ADP components. These linkages commonly take the form of a "chain" of nodes constituting the filial set, and it is therefore meaningful to consider the first member of the chain the entry node and the last member the terminal node. The terminal node may be identified by a distinctive property of its ADP. In addition, a node may commonly contain another address component ADF plus other information. The ADF links a given node to its filial set at a next level of the tree. Since in some applications the ADF linkage can be computed, it is not found in all tree structures.

In operation, the nodes of the tree are processed in a sequential manner with each operation in the sequence defining in part a path through the tree which corresponds to the key function and provides access to the appropriate trained response. This sequence of operations, in effect, searches the tree allocated array to determine if an item corresponding to the particular key function is contained therein. If during training the item cannot be located, the existing tree structure is augmented so as to incorporate the missing item into the file. Every time such a sequence is initiated and completed, the processor is said to have undergone a training cycle.

The operations of the training cycle can be made more concrete by considering a specific example. Consider FIG. 7 wherein a tree structure such as could result from training a processor is depicted. The blocks represent the nodes stored in memory. They are partitioned into their value (VAL), ADP, and ADF components. The circled number associated with each block identifies the node and corresponds to the location (or locations) of the node in memory. As discussed, the ADF of a node links it to a node of its filial set at the next level of the tree. For example, in FIG. 7, $ADP_1$ links node 1 to node 8 and $ADF_1$ links node 1 to node 2. The trained responses ($G_2$, etc.) are stored in lieu of ADF components at the leaf nodes since the leaves have no progeny. Alternatively, the ADF component of the leaves may be the address at which the trained response is stored. In this setting the system inputs are key components and are compared with a node value stored at the appropriate level of the tree.

When the node value stored in the VAL register matches a key component, the node is said to be selected and operation progresses via the ADF to the next level of the tree. If the node value and key component output do not match, the node is tested, generally by testing the ADP, to determine if other nodes exist at the same level within the set which have not been considered in the current search operation. If one or more nodes exist, transfer is effected to the node specified by the ADP and the value of that node is compared with the key component. Otherwise, a node is created and linked to the filial set by the ADP of what previously was the terminal node. The created node, which becomes the new terminal node, is given a value equal to the key component stored in the VAL register of the node, an ADP component indicating termination, and an ADF component which initiates a chain of nodes through the leaf node.

When transfer is effected to the succeeding level, the operations performed are identical to those just described provided the leaf level has not been reached. At the leaf level if a match is obtained, the trained response can be accessed as a node component or its address can be derived from this component.

Operations within a single level whereby a node is selected or added is termed a level iteration. The first level iteration is completed when either a node of the first level is selected or a new one added.

Figure 7:
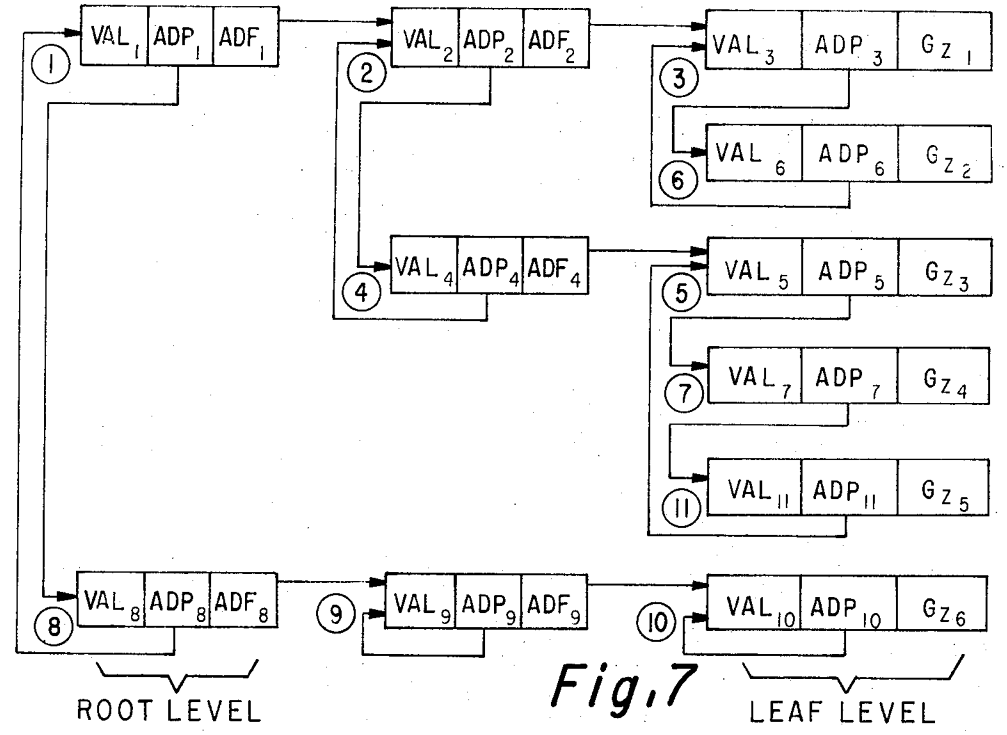
FIGS. 7–18 illustrate the formation of a tree-allocated memory array comprising the nonlinear processor of FIG. 1. during a training phase and, in particular, the subsystem comprising the present invention.

Note in FIG. 7 that the node location specified by the ADF is always one greater than the location containing the ADF. Clearly, in this situation the ADF is superfluous and may be omitted to conserve storage. However, all situations do not admit to this or any other simple relationship, whence storage must be alloted to an ADF component. This is true of a system utilizing a probability sort procedure, hereinafter to be described in detail with reference to a preferred embodiment.

Training progresses in the above manner with each new key function generating a path through the tree defining a leaf node at which the trained response G(Z) is stored. All subsequent repreated keys serve to locate and update the appropriate trained response. In one embodiment, the nodes are periodically rearranged so that those most often selected appear earliest in the filial set. During training the failure to match a node value stored in the VAL register of the node with the output of the corresponding key component serves to instigate the allocation or new storage node in the tree to accommodate the new information.

As discissued previously, when the tree allocation procedure is used, the numerical magnitude of a particular node value is independent of the location or loactions in memory at which the node is stored. This provides a good deal of flexibility in assigning convenient numerical magnitudes to the key components.

A specific example of the storage of information in registers as a tree-allocated memory array during a plurality of training cycles is explained hereinafter with reference to FIGS. 8–18.

As stated previously, the allocation of information in particular registers representing a node of the tree array is determined by key components derived from the input signal to the processor. Initially, information is stored in the next available set of registers representing a node position. During the formation of the tree array, however, a probability sort procedure is utilized and information stored at a particular node position is rearranged so that the node position selected most often during the entire training cycle appears earliest in a filial set. Such rearrangement significantly reduces the time required during both the training and execution cycles to find a trained response, as the node least likely to be selected becomes the terminal node of the filial set. The probability sort procedure is the subject matter of co-pending patent application Ser. No. 889,143, referenced above. In the preferred embodiment, each node position is comprised of four registers or segments. The first of such registers is the value register, designated as VAL, in which the value of the key component is stored.

The second register is designated the ADP register. If the number stored in the ADP register is equal to or less than the node number, there are no further nodes in that set. If the number stored in the ADP is greater than the node number, this indicates that there are other nodes in that level and the number stored in the ADP register then indicates the node to be examined next.

The third register is designated the ADF register. The number stored in the ADF register indicates a node to go to in the next level if the key component of the presently-searched level equals the number stored in the VAL register of the presently-searched level. The third register of the last level of any filial set, however, is designated as the G register in which the desired trained response is stored, and the register of such last level inherently indicates the number of times a particular number stored in the G register of a node has been selected with respect to the same key function.

Lastly, the N-designated register contains a number indicating the number of times that the number stored in the VAL register at a particular node position has equaled a corresponding key component during training. The N register of a node in the leaf level is designated as an A register when there is no artificial level extending from such node and indicates the number of times key function has been associated with the desired output stored in the G register thereof during training. The artificial level always contains A rather than N registers to indicate the number of times the same key function has been associated with each desired output stored therein.

Figure 8:
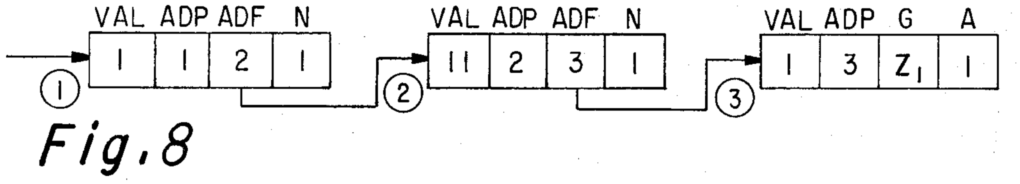

Referring now to FIG. 8, the key function for the first training cycle is, for example, 1–11–1 with an associated desired response of $Z_1$. In the first training cycle all node registers are blank. In the first level iteration the first key component 1 is stored in the VAL register of the first node. Since there are no other nodes in the first level, ADP is set to 1, the next node position corresponding to the next level is the second node so ADF is set to 2, and N is set to 1 corresponding to a first time the node has been selected. For the second level iteration the VAL of the second node becomes 11, the ADP is set at 2 since there are no other nodes in that level of the filial set, ADF is set to 3, and *N* is set to 1. After the third level iteration in the third node the value stored in the VAL register of the node is 1, the ADP is 3, *G* is $Z_1$, and the *A* is 1.

Figure 9:
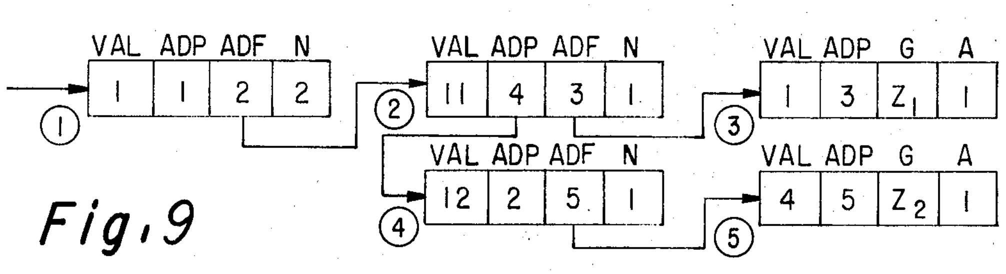

The key for the second training cycle is 1–12–4. Referring now to FIG. 9, the first key component 1 is compared in the first level iteration with the valve stored in the VAL register of node 1. The key component 1 matches the value 1 in the VAL register, so that the number 2 stored in the ADF register directs the next level of iteration to node 2. Node 1 has been selected twice so that the number in the *N* register of node 1 is changed from 1 to 2. In the second level iteration, the key component 12 is compared with the value 11 stored in the VAL register of node 2. The key component 12 is not equal to the value 11 and as there are no other nodes in the filial set indicated by the ADP not being greater than the node number 2, another node is created. Since node 4 is the next available node, the ADP of 2 in node 2 is changed to a 4 and the key component 12 is entered in the VAL register of node 4. The ADP is set to 2 indicating the node from which that filial set has started. The ADF is set to 5 and the N register is set to 1 indicating that node 4 has been selected once. For the third level iteration node 5 is the next available node and is so used. The key component 4 is stored in the VAL register of node 5. The ADP register is set at 5 as this is the node which has been selected and there are no additional nodes in that filial set. A desired response, $Z_2$, is then stored in the G register and the A register of node 5 is set to 1, indicating that the value stored in the G resister has occurred once.

Figure 10:
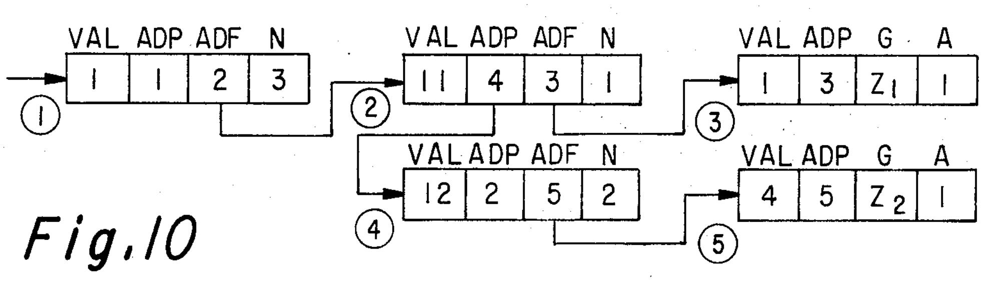

Referring now to FIG. 10 the key for the third training cycle is 1–12–5. For the first level iteration of the third training cycle the value 1 in the VAL register of node 1 is compared with the key component 1 of the third key. There is a match. The ADP remains the same, the ADF remains the same and the number in the N register is increased by one to 3 indicating that the value 1 in the VAL register of node 1 has been selected 3 times. In the second level iteration the value 11 in the VAL register of node 2 is not equal to the key component 12 as shown in FIG. 10 and the 4 in the ADP register is greater than the node number 2 indicating that there is a node 4 to be examined. The fact that there is another node in this filial set is an indication that the information in the nodes may have to be rearranged. This means that since there is another node in that filial set there may be a node lower in the filial set which after this level iteration may have been selected a larger number of times than another node presently of higher order in the filial set and hence, closer to the entry node of the filial set.

Therefore at this point in time when there is no match in the first node and there is an indication that there is another node in that filial set, the number in the *N* register and the node number itself are stored in temporary storage registers. The node number is stored and indicated as *K* and the *N* number is stored as $N_{MAX}$.

After the node number of node 2 (2) has been stored as K and the *N* number has been stored as $N_{MAX}$, the value in the VAL register of node 4 is compared with the second key component 12. These two numbers match so that the number 1 in the N register of node 4 is changed to 2 indicating that the value 12 in the value register of node 4 has been selected twice.

Figure 11:
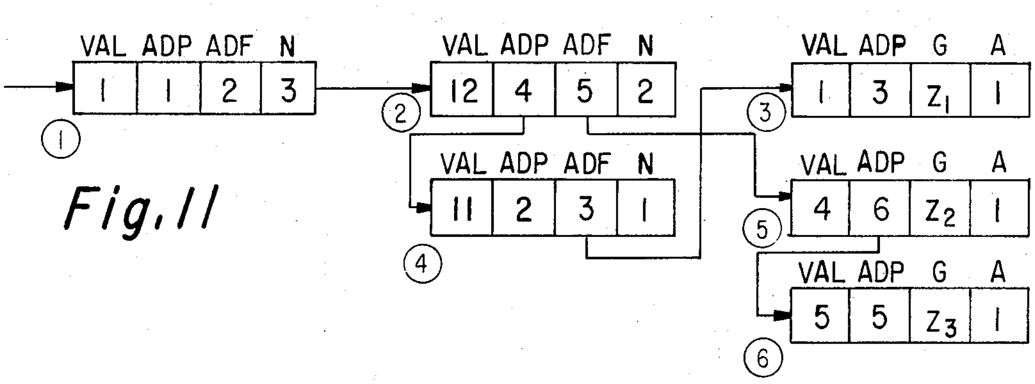

At this point the number stored in the N register of node 4 is compared with the number stored in $N_{MAX}$. $N_{MAX}$ is 1 and is the number of times that the value 11 had been selected in the value register of node 2. The 1 stored in $N_{MAX}$ is less than the 2 stored in the N register of node 4. The contents of the registers comprising node 2 and the registers comprising node 4 should be rearranged because the contents of the VAL register of node 4 has been selected a larger number of times than the contents of the VAL register of node 2. Referring to FIG. 11 it can be noted that the ADPs of both nodes 2 and 4 remain the same; however, the ADFs are exchanged. The 12 that was in the VAL register of node 4 is put into the VAL register of node 2 and the 11 that was in the VAL register of node 2 is put into the VAL register of node 4. The number 1 which was in the N register of node 2 is put into the N register of node 4 and the 2 that was in the N register of node 4 is put into the N register of node 2.

As a result of the operation just described, the value which was in the VAL register of node 4 will now be examined first rather than the previous contents of the VAL register of node 2.

Note that the ADFs are exchanged in the nodes because the ADFs indicate which node is to be examined in the next level. As the values were exchanged it is thus necessary that the ADFs be changed. Only the ADP registers of the nodes remain unchanged.

The third level iteration is directed to node 5 by the ADF of node 2 as shown in FIG. 11. The third level component is compared with the value 4 in the VAL register of node 5. They do not match and the ADP of note 5 is equal to the node number indicating that there is no further node in that filial set. The next available node is node 6 so that the key component 5 is stored in the VAL register of node 6 as value 5. The ADP of node 5 is changed to 6 to indicate that it is linked to a node 6. The ADP of node 6 is 5, the G is $Z_3$ and the A is 1. This completes the third training cycle.

This description has illustrated the necessity of the ADF in some embodiments. The contents of the nodes are continually rearranged during the different level iterations so the next node to be examined will not alwyas be the next node of highest numerical order.

Figure 12:
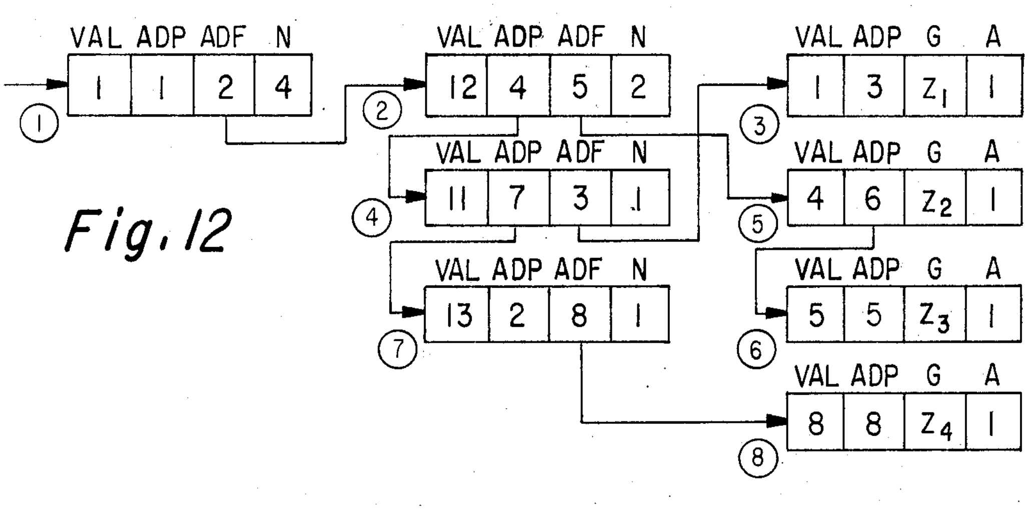

For a description of the fourth training cycle, reference is now made to FIG. 12, in which the key is 1-1-3-8. The first level iteration compares the key component 1 with the value 1 in the VAL register of node 1. There is a match so that the N register is changed from 3 to 4, as shown, indicating that the value 1 has been selected 4 times.

In the second level iteration the key component 13 is compared with the value 12 in the VAL register of node 2. There is no match and the ADP of node 2 is 4 indicating that there is another node in that filial set which should be examined. The node number 2 is stored as K and the number 2 is stored as $N_{MAX}$. In node 4 the key component 13 is compared with the value 11. There is no match and the ADP of 4 indicates that there are no further nodes in the same set to be examined. The next available node is node 7 so that the ADP of node 4 is changed from 2 to 7.

At this point the N of node 4 is compared with $N_{MAX}$ of 2. The N of node 4 is 1 which is less than $N_{MAX}$ of 2, so that the contents of node 2 and 4 will not be rearranged. Therefore, $N_{MAX}$ and K are redefined. The new $N_{MAX}$ is the N of node 4 which is 1 and the K is the node number of node 4. It is apparent at this point that since there are no subsequent nodes which are created there is no possibility of $N_{MAX}$ being less than the N of the node to be created in that filial set. However, for convenience of logic design the $N_{MAX}$ and K are still redefined.

The ADP of node 4 has been changed to 7 as 7 is the next available node. Node 7 is now selected with the VAL register of node 7 being set equal to the second key component 13. The ADP of node 7 is set to 2 indicating that the original node of that filial set is node 2 and the contents of the N register becomes 1 indicating that the value 13 has been selected once. For the third level iteration, the ADF automatically selects the next available node which is 8. The ADF of node 7 therefore becomes 8.

The N of node 7 is compared with N max. The N of node 7 is not greater than $N_{MAX}$ so that there is no rearrangement of the contents of the nodes.

In the third level iteration, the third key component 8 goes into the VAL register of node 8. The ADP is 8, the G is $Z_4$ and the A is 1.

Figure 13:
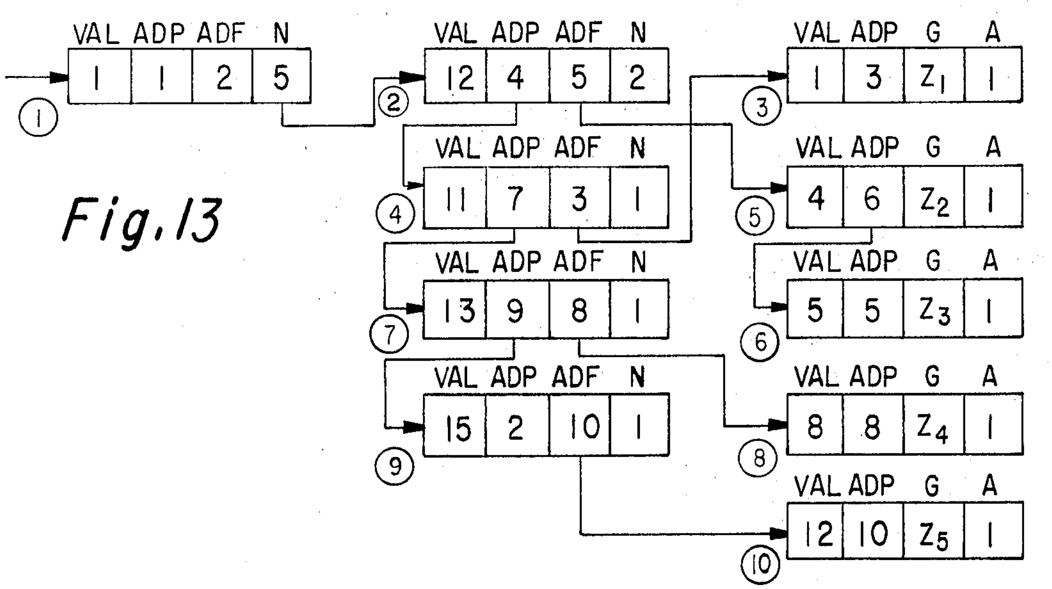

Referring now to FIG. 13, the key for the fifth training cycle is 1-15-12. During the first level iteration the first key component 1 is compared with the value 1 in the VAL register of node 1. There is a match and N becomes 5 indicating that the value 1 in the VAL register of node 1 has now been selected 5 times.

For the second level iteration the ADF of node 1 indicates that node 2 should be examined. The second key component 15 does not match the value 12 in the VAL register of node 2. Therefore the contents of the N register of node 2 are stored as N max and the node number 2 is stored as K. The ADP of node 2 indicates that there is another node in that filial set, so node 4 is examined. The second key component 15 does not match the value 11 in the value register of node 4, and the N of node 4 remains 1. $N_{MAX}$ (2) is compared with the N of 1 of node 4 and the N of node 4 is less than $N_{MAX}$, so that there is no rearrangement of information between nodes. Therefore, $N_{MAX}$ and K are redefined. $N_{MAX}$ becomes the N of node 4 which is 1 and K becomes the node number 4. The ADP of node 4 indicates that node 7 is to be examined next so that the key component 15 is compared with the value 13. There is no match and the N of node 7 remains 1. The N of 1 of node 7 is compared with $N_{MAX}$ and since the N is not greater than the $N_{MAX}$ 1, there is no rearrangement between nodes 4 and 7, $N_{MAX}$ is again redefined, and becomes the N of node 7 which is 1 and K becomes 7 which is the node number of node 7.

The ADP of node 7 was 2 in FIG. 12 indicating that there are no further nodes in that filial set. Therefore, the next available node selected is node 9 and the ADP of node 7 becomes 9 as shown in FIG. 13. New node 9 is selected and the key component 15 becomes the value stored in the VAL register of node 9, the ADP is 2 and N is 1. At this time $N_{MAX}$ of 1 is compared with the N of 1 of node 9. N is not greater than $N_{MAX}$ so there is no rearrangement between nodes 7 and 9. For the third level iteration as node 9 has been a newly selected node the next available node selected is node 10. The ADF of node 9 becomes 10 and for node 10 the value in the value register becomes 12. The ADP becomes 10, the *G* is $Z_5$ and the *A* is 1.

Now, referring to FIG. 14, the key is again 1–15–12, but for a $Z_6$. During the first level iteration the key component 1 equals the value 1 at the first node so that the N of node 1 is changed to 6. During the second level iteration the key component 15 is compared with the value 12 in the VAL register of node 2. There is no match so that the N 2 of node 2 is stored as $N_{MAX}$. $N_{MAX}$ thus becomes 2 and K becomes the node number 2. The key component 15 is then compared with the value 11 stored in the VAL register of node 4. There is no match, and N remains 1. N is less than $N_{MAX}$ of 2 so that $N_{MAX}$ is redefined as 1 and K is redefined as 4. The key component 15 is then compared with the value 13 in the VAL register of node 7 and there is no match so that N remains at 1. The N of 1 is not less than $N_{MAX}$ so that $N_{MAX}$ remains 1 and N is 4.

The key component 15 is then compared with the value 15 stored in the VAL register of node 9. There is a match so that the N of node 9 becomes 2.

Figure 14:
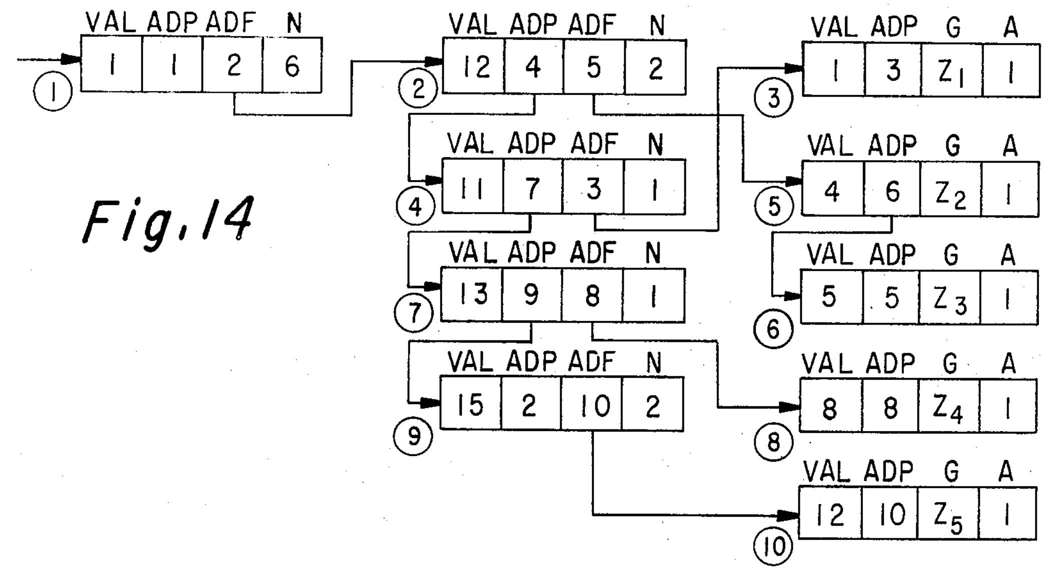

At this point in time before the rearrangement, the ADP remains 2, the ADF remains 10 and the number in the N register is changed from 1 to 2 as shown in FIG. 14.

$N_{MAX}$ is 1 and K is 4. The $N_{MAX}$ of 1 is compared with the 2 in the N register of node 9. N is greater than $N_{MAX}$ so that the contents of the node identified by K (node 4) are exchanged with the contents of the present node 9. The results are shown in FIG. 14 with node 4 now having a value of 15 stored in its VAL register, an ADF of 10 and an N of 2. Node 9 now has a value of 11 stored in its VAL register, an ADF of 3 and an N of 1. This indicates that the value 15 (which is now in Node 4) has been selected more times than value 11 or value 13. After this rearrangement the third level iteration is carried out and the ADF of node 4 (10) indicates that node 10 is the node to be examined for the third level iteration. The third key component 12 is compared with the value 12 in the tenth node. There is a match.

Now, in accordance with the subsystem of the present invention, the desired output stored in the G register of node 10 ($Z_5$) is compared with the desired output $Z_6$ now associated with the same input key 1–15–12. If $Z_5$ is equal to $Z_6$, then the number stored in the A register is merely increased by one, indicating that the same input key and associated desired output has been again selected.

Figure 15:
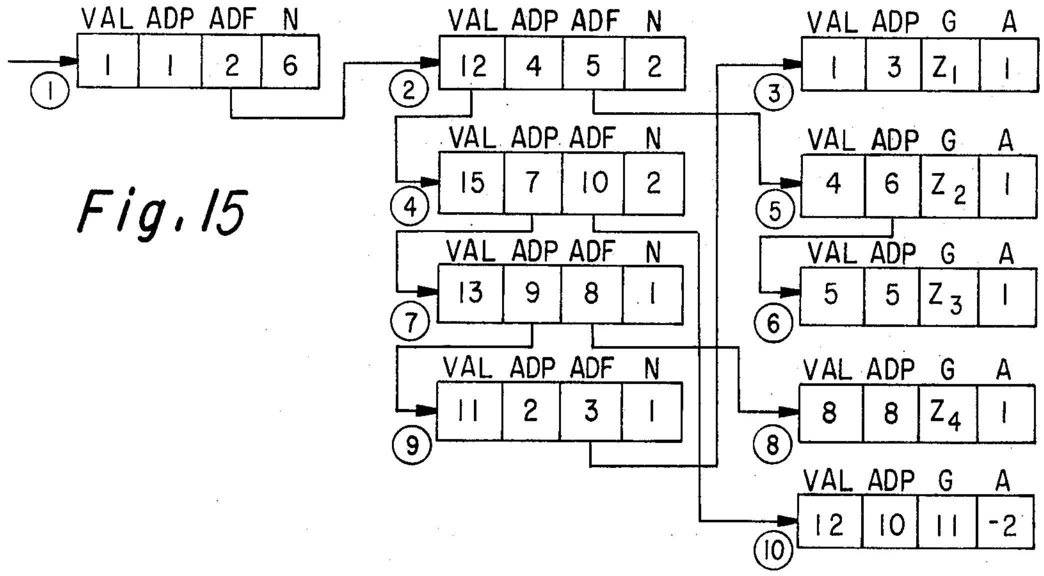

Let us assume, however, that $Z_5$ does not match $Z_6$; a new procedure must be initiated. The desired output $Z_5$ stored in the G register of node 10 and the A value associated therewith are transferred to temporary storage registers. The G register of node 10 then becomes an ADF register and is set to contain the node number of the next available register, namely, node 11, as indicated in FIG. 15. This ADF now becomes a link to a new fourth artificial level. The A register of the third level becomes an N register and merely indicates the number of times the node was selected during training. As this is the second time node 10 has been selected, the value in the new N register is the value of the former A register increased by one. In addition, as the ADF is in the third level, a negative (−) sign is placed before the number N, the necessity of which will be subsequently discussed.

The reason the new fourth level is referred to as an "artificial" level is because unlike the first three levels discussed, there is no corresponding key component associated with the level. Therefore, the artificial level does not have to include a VAL register associated with it.

Figure 16:
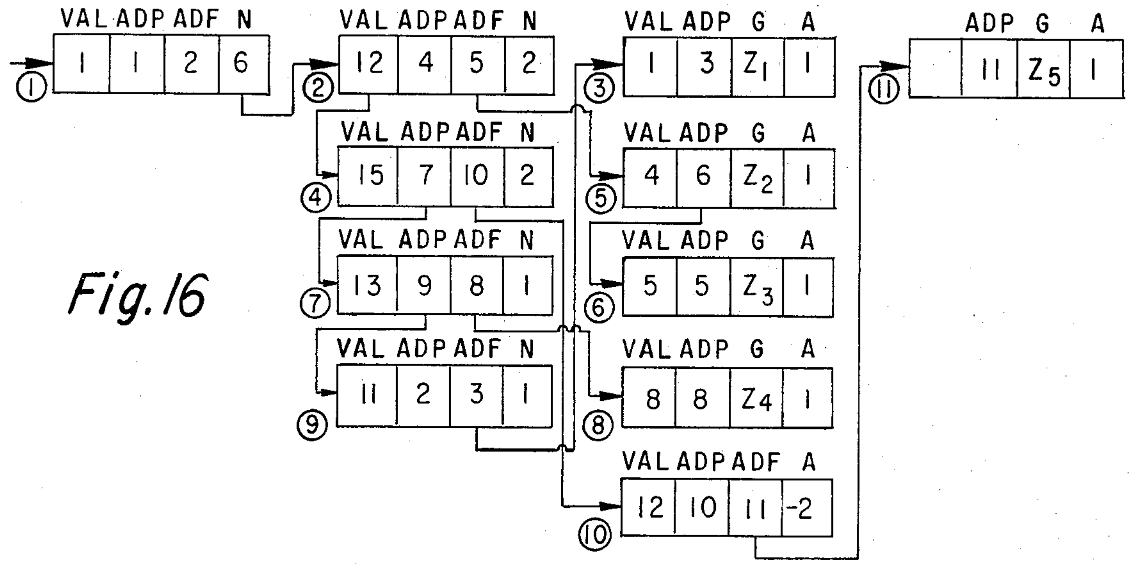

As illustrated in FIG. 16, a register or series of registers of the fourth level has three components. Firstly, an ADP component to link all nodes of the artificial level associated with the same key function; secondly, a G component in which to store the desired output Z; and lastly, an A register to indicate how many times a particular value of Z was associated with the same input signal or corresponding key function during the training process.

As indicated above, the next available node is node 11, which address has been placed in the ADP register of node 10. The ADP of node 11 is 11 since there are, as yet, no other nodes in the fourth level with which it is associated. The value of Z ($Z_5$) previously associated with node 10 is now transferred from temporary storage to the G register of node 11, and the A value previously associated with node 10 is transferred from temporary storage to the A register of node 11.

Figure 17:
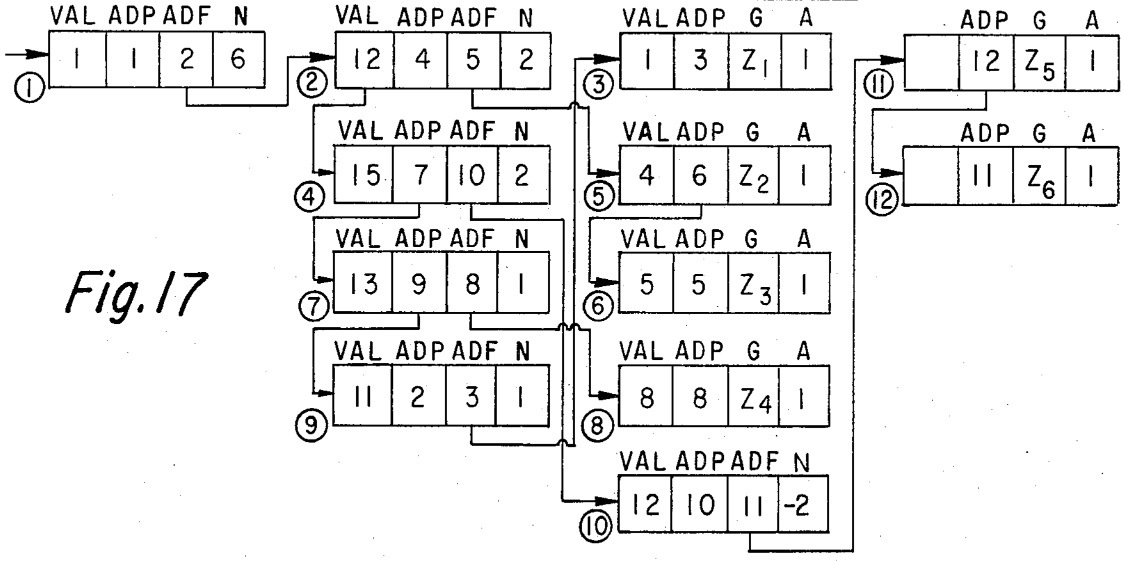

Next, as illustrated in FIG. 17, the new desired output $Z_6$ associated with the same key function as $Z_5$ must be stored. Therefore, the ADP Of node 11 becomes the value of the next available node, namely, node 12. The ADP of node 11 is therefore set equal to 12, and the ADP Of node 12 is set equal to 11, as there are no further nodes in the fourth level of the tree associated with the particular input or key function. The value of the desired output $Z_6$ is stored in the G register of node 12, and since this is the first time this Z ($Z_6$) has been associated with this particular key function, a "1" is stored in the A register of the node.

Figure 18:
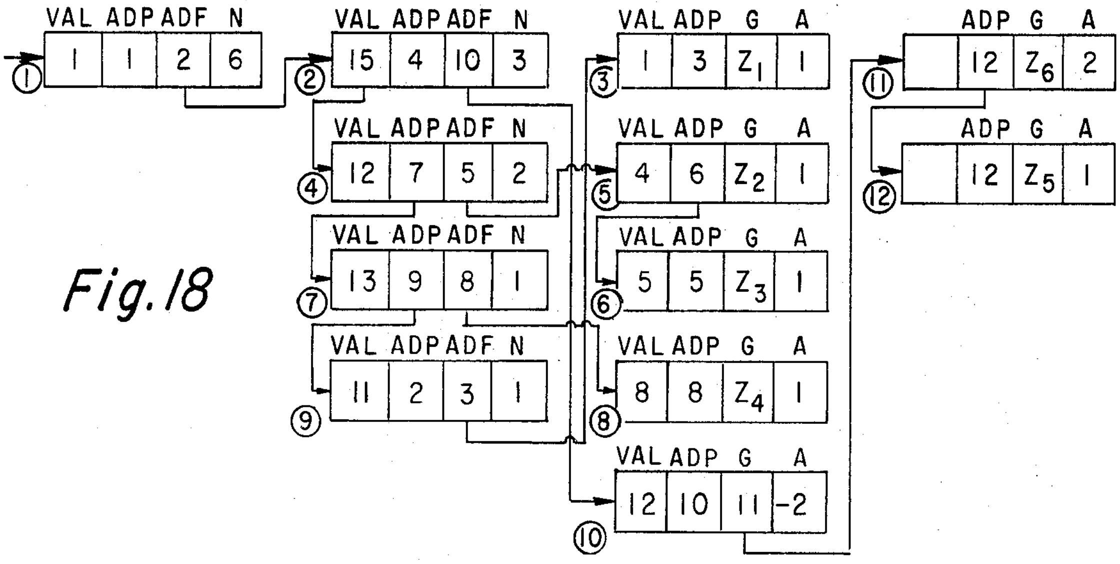

Referring now to FIG. 18, assume that the next or seventh key is once again 1–15–12 and, further, that it is once again associated with a desired output of $Z_6$. The procedure is similar to the sixth training cycle. The N of node 1 is changed to a value of seven, as the node has once again been selected. In the second level iteration, the value 15 in the VAL register of node 4 again matches the second key component so that the information stored in the VAL, ADF and N registers, respectively, of nodes 2 and 4 in FIG. 17 will be transposed as indicated in FIG. 18 by the procedure previously described with reference to FIG. 11. The ADF of node 2 now leads us to node 10.

The third key component matches the value stored in the VAL register of node 10. Since node 10 has an ADF register rather than a G register, indicated by the negative value in the N register, the present desired output, namely, $Z_6$, is not compared to the number stored in the ADF register. Instead, the ADF/G of node 10 leads us to node 11 of the artificial fourth level. The present Z ($Z_6$) is compared to the G of node 11. As $Z_6$ does not match the value of $Z_5$ stored therein, and as the ADF of node 11 is other than an 11, namely, 12, we are next led to node 12.

At this point in time, however, when there is no match, the number stored in the A register is placed in temporary storage along with the node number intself. The node number is stored as K and the A number is stored as $N_{MAX}$. After the node number of node 11 has been stored and the A value of 1 stored as $N_{MAX}$, the present Z ($Z_6$) is compared to the value of Z stored in the G register of node 12. There is a match. The value stored in the A register of node 12 is increased by one, indicating the node has been once again selected.

At this point, the value stored in the A register of node 12 is compared with $N_{MAX}$. $N_{MAX}$ has a value of 1, while the value stored in the A register of node 12 is equal to 2. This indicates that the contents of the G and A registers, respectively, of nodes 11 and 12 should be transposed. Thus, the G of node 11 is exchanged with the G of node 12, and the A of node 11 is exchanged with the A of node 12.

As a result of the immediately preceding procedure, the desired output $Z_6$, now stored in the G register of node 11, as illustrated in FIG. 18, will be examined first. More importantly, however, it is evident that the desired outputs now stored in the G registers of the fourth artificial level will be in their order of likelihood. This is important in one embodiment of the invention, where, during an execution cycle, it is desired that a listing of all Z's associated with a particular input signal or key function becomes the actual output X, in the order of their likelihood. In another embodiment, where only the most likely G is utilized as the actual output X, only the G of the third level or the G of the first node in the set comprising the fourth or artificial level associated with the particular input signal is selected.

The training process continues, as illustrated above, until the nonlinear processor has been sufficiently trained. It is obvious, that sufficiency, however, is going to be only a small percentage of all possible combinations of input signals and corresponding key functions. If too many input signals are examined during training, it costs additional training time, execution time and memory space. This may not be readily apparent ftom the system illustrated above with reference to FIGS. 8–18 which used keys of three components and hence three true and one artificial tree level. But, a system utilizing more key components requires greater and greater multiples of time and memory space. Take, for example, the character recognition system utilizing a 12 by 12 grid whereby a key function comprising 12 key components is required. If too few signals are examined, on the other hand, the probability that the system will make an error in classification increases. Optimum systems must therefore be chosen with the above criteria in mind, with reference to the particular problem to be solved and with reference to the particular degree of accuracy required.

Figure 19:
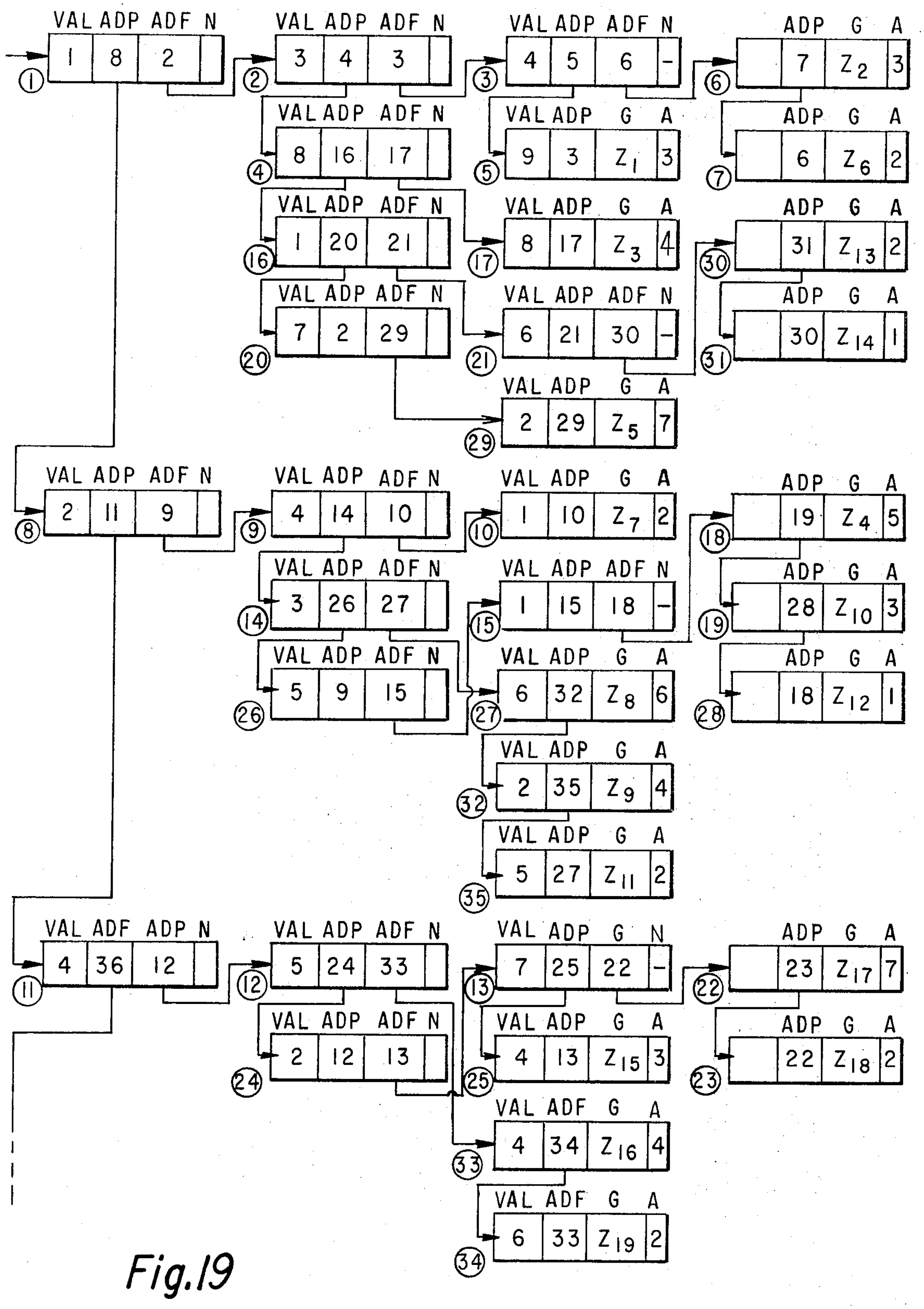

Once the processor of the system has been trained, it is ready for the execution phase. FIG. 19 illustrates a portion of a completed tree-allocated memory array comprised of three true levels and one artificial level. The values of N are utilized in rearrangement of the tree during training, but once the tree has been completed, they serve no further purpose. Thus, for the purpose of simplicity, the values of N have been eliminated from FIG. 19. The negative signs are retained to indicate those nodes of the leaf in which a G register has been converted to an ADF register.

Assume now, a key of 2–3–2 for the first input signal to the processor during an execution cycle. The first key component 2 is compared with the value stored in the VAL register of node 1. No match is found, and as the ADP of node 1 (8) is greater than the node number 2, node 8 is the next node to be searched. The first key component 2 is now compared to the value 2 stored in the VAL register of node 8. This time there is a match, so the ADF register of node 8 leads us to node 9 where the second key component 3 is compared with the value 4 stored in the VAL register. No match is found; the ADP of node 9 (14) is greater than the node number 9, so that node 14 is the next node to be searched. The second key component 3 matches the value 3 stored in the VAL register of node 14, and so the next node to be searched may be found in the ADF register of node 14, namely node 27. Thus, the third key component 2 is now compared with the value 6 stored in the VAL register of node 27. There is no match; the ADP of node 27 (32) is greater than the node number of 27, so the next node to be searched is 32. The value 2 stored in the VAL register of node 32 matches the third key component 2. Since the third level of the tree is the least true level, that is, there are no further key components to be seached for, the N/A register of the third level is now examined to determine if the number stored in the ADF/G register is an ADF or a G value. If the N/A number is negative (−), the ADF/G register contains an ADF value leading to a node of the fourth artificial level; if the N/A number is positive, the ADF/G register contains a G value, and the number stored in the G register becomes the actual output of the processor corresponding to the input signal being searched. In particular, the number stored in the N/A register of node 32 is a positive number, thus it is determined that the value stored in the ADF/G resigter is a G value, and $Z_9$ becomes the actual output X of the processor comprising the system.

As a second example, assume this time an input to the processor having a corresponding key function of 1–1–6. Again we begin at node 1. Since the first key component 1 matches the value 1 stored in the VAL register of that node, there is a match and we need look no further in the first level. The ADF of node 1 (2) then leads us to node 2 where the second key component 1 is compared with the value 3 stored in the VAL register. There is no match and the ADP Of 4 is greater than the node value of 3, so node 4 is the next node to be searched. The value 8 stored in the VAL register of that node again does not match the second key component 1 and hence we must continue the search. The ADP of node 4 (16) is greater than the node number 4, so the next node to be tried is node 16. This time, when the key component 1 is compared with the value 1 stored in the VAL register of node 16 there is a match. We then follow the ADF to node 21 where the third key component 6 is compared to the value 6 stored in the VAL register of that node. There is a match. At this point in time, as we have finished matching all components of the key function, we make the test for the ADF/G register of this third level to see whether the register is, in fact, an ADF register or a G register. The number stored in the N/A register is negative. This indicates that the value stored in the ADF/G register is an ADF number, and that we must go further and examine the fourth artificial level before we can determine the actual output X. In particular, the ADF register of node 21 indicates that the next node is node 30. Since the Zs stored in the fourth level are periodically rearranged during training such that they are stored in the order of likelihood, the Z stored in the G register of node 30 represents the most likely Z associated with the input signal corresponding to the key function 1–1–6. In one embodiment of the invention, the most likely value of Z, namely, $Z_{13}$, is all that is required to become the actual output X. In other embodiments, however, it is desirable to have a listing of all Zs associated with the input in the order of their likelihood. Thus, in such embodiments, first node 30 is examined and $Z_{13}$ is the most likely Z; then the ADP of node 30 leads us to node 31. $Z_{14}$ is thus the second most likely output. Since the ADP value of node 31 (30) is less than the node number 31, there are no further Z values comprising the set. The actual output X for the input having a corresponding key function of 1–1–6 would thus be the set $\{Z_{13}, Z_{14}\}$.

As a third example, assume now that an input is presented to the processor having a corresponding key function of 2–4–2. First, the first key component 2 is compared to the value 1 stored in the VAL register of node 1. There is no match, and the ADP of node 1 is greater than one, namely, 8, so we next examine node 8. This time the key component 2 matches the value 2 stored in the VAL register, so that we next compare the second key component 4 to the value 4 stored in the VAL register of node 9. There is a match. The ADF of node 9 next leads us to node 10. The third key component 2 is compared with the value 1 stored in the VAL register of that node. There is not match, but now, the value in the ADP register 10 is not greater than the node number 10, indicating that there are no other nodes in the set to be searched.

At this point, an expanded search, the subject matter of co-pending patent application 889,241, referenced above is initiated. The expanded search is a subsystem utilized in an execution cycle when an untrained point is reached, that is, a point at which no corresponding trained key is found. Since the sytem was not trained on such a key, there can be no trained response.

The term DIF, which is heretofore utilized in conjunction with the expanded search subsystem is defined as the absolute difference between its coordinates. In other words, DIF$[j,k]$ equals $|j-k|$. In general, the DIF term can be any operator that measures in some sense the closeness of a trained key and an execution key. The absolute difference is chosen here for convenience. A register, called ITOTAL, indicates the smallest DIF so far indicated between the untrained execution key and a trained key. Another register called ITOT, contains a running total of the DIF between the key component and the value at each node. Thus, the contents of the ITOT register will indicate the cumulative difference between the key components and the values stored in the VAL registers for one execution key. This will become more apparent during the following description.

A series of IE registers ID($i$) where $i$ corresponds to each true level of the tree, indicates the DIF of the node for the level $i$ after comparison with the $i^{th}$ key component. Thus, IE(1) indicates the DIF of the node for level 1 after comparison with the first key component, IE(2) shows the DIF of the node in the second level after comparison with the second key component and IE(3) indicates the DIF in the third level node after comparison with the third key component.

A series of IGI($q$) registers indicate the contents of the G registers associated with the particular trained key functions which are closest to the untrained execution key according to the DIF. The q represents each one of the Gs associated with the trained keys closest to the untrained execution key, including each member of the set of desired outputs Z comprising the fourth level of the tree when such is the case. Thus, a trained response or desired output Z itself is entered into an IGI($q$) register. Another series of registers called IAI($q$) indicate the contents of the A registers associated with each of the G registers. A JC register keeps track of the number of trained responses in the IGI register at any one time and is hence equal to the largest value of $q$. In an embodiment of the system in which only the maximum likelihood desired output Z is required to comprise the actual output X, however, only one G need be stored in an IGI register and one corresponding A stored in an IAI. Hence, in such an embodiment, $q$ is always equal to one, and the JC register may be eliminated or merely utilized to keep track of the number of times the DIF which is considered as a possible best DIF has been found.

The following, with reference to FIGS. 19 and 20, describes the search iterations which are carried out when the untrained point is reached. First the entry node of the tree, node 1, is returned to. For the first level search iteration, the first key component (2) of the execution key 2–4–2 is again compared with the value 1 stored in the VAL register of node 1. The absolute difference is taken between these two numbers (the DIF) and is stored in the ITOT register as a 1 and in the IE(1) register as a 1. For the second level search iteration, the second key component 4 of the execution key is compared with the value 3 stored in the VAL register of node 2. The absolute difference or DIF of 1 is stored in the IE(2) register and is also added to the ITOT register so that the contents of the ITOT register are changed from 1 to 2.

For the third level search iteration, the third key component 2 of the execution key is compared with the value 4 of node 3. The difference is 2 so that a 2 is entered into register IE(3) and ITOT becomes 4, indicating that the total difference between the execution key 2–4–2 and the trained key 1–3–4 is 4. At this point, the leaf level has been reached at node 3. ITOT is at 4 and ITOTAL is at 4. A three-level serach iteration has thus been completed.

A search iteration is again started to determine the best DIF corresponding to the execution key 2–4–2. In one embodiment, the whole tree will eventually be searched during this operation in the manner to be next described. Other embodiments require only a partial search of the tree by utilization of a "node rejection" subsystem which will be described later.

Before the search continues, the G's and corresponding A's of node 3, located in nodes 6 and 7, are stored in the IGI(1) and IGI(2) the IAI(1) and IAI(2) registers, respectively, as illustrated for the first search in FIG. 20; IGI(1) = $Z_2$ and IGI(2) = $Z_6$. At this time these Gs corresponding to the trained key 2–4–2 represent the best DIF as indicated in the ITOTAL register. This is obviously true since the key 1–3–4 is the only key for which a search iteration has been completed. In the JC register the number 2 is stored to indicate that at this point the best DIF has been found once with two corresponding G's. The best G's and corresponding A's have been stored directly. Since what is actually desired is to find the best G's and corresponding A's for an execution key 2–4–2 there is no need to go back to the address of the best G's and corresponding A's and hence there is no need to actually store such address. The best G's and A's are available from the IGI and IAI registers directly. Another means of identifying the set of the best G's and corresponding A's would be to store the address of the node where the set of such best G's and A's are located, rather than the set of G's and A's themselves. In such an embodiment, it is necessary to go back to the addresses of the best G's and corresponding A's after all search iterations have been completed.

Referring again to FIG. 19, the next node in the third level to be searched is node 5 since it is the next available node in that filial set. This is carried out by subtracting from ITOT the difference of the previous third level search iteration which is 2. This difference of 2, found in the IE(3) register, is subtracted from the ITOT register so that ITOT is now 2. The third key component 2 of the execution key is next compared with the value 9 in the VAL register of node 5. There is a difference of 7 between the third key component of 2 and the value 9 of node 5. This difference of 7 is placed in the IE(3) register and is also added to the 2 in the ITOT register so that the ITOT register is not set at 9.

At this point the contents of the ITOT register which is 9 for a query key of 1–3–4 are compared with the contents of the ITOTAL register which is 4, the DIF for a query key of 1–3–9. If the DIF stored in the ITOT register is broadly better than the DIF stored in the ITOTAL register then we will change the ITOTAL register to the new better DIF and store its corresponding trained responses in the IAI and IGI registers. The DIF in this specific example is defined as being better when it is smaller than another DIF. In this case, since the DIF of 4 stored in the ITOTAL register is smaller than the DIF of 9 stored in the ITOT register, the DIF in the ITOTAL register is by definition better, and there will be no change in the ITOTAL register, as shown in FIG. 20 for the second search. The second search iteration has now been completed. The best DIF thus far is still the set of Gs for key 1–3–4.

Node 5 was at the leaf level and there are no further nodes in the set indicated by the ADP. For the third search iteration it is therefore necessary to go back to the second level to node 4. Both the third level difference of 7 between the third key component 2 and the value 9 in the VAL register of node 7 and the second level difference of 1 between the second key component 4 and the value 3 stored in the VAL register of node 2 must be subtracted from ITOT. This is done by subtracting IE(3) and IE(2) from ITOT leaving ITOT equal to 1. Then for the second level search iteration the second key component 4 of the execution key is compared with the value 8 of node 4. The difference is 4 and this difference is put in the IE(2) register and also added to the ITOT of 1 so that ITOT is now 5. For the third level search iteration the third key component 2 of the execution key is compared with the value 8 of node 17. The difference is 6 and is entered into the IE(3) register and added to ITOT to make ITOT 11.

The third search iteration has been completed and, as illustrated in FIG. 20, the ITOT of 11 is compared with the ITOTAL of 4 to see if the DIF of 11 for trained key 1–8–8 is less than or equal to 4, and thus broadly speaking better than or equal to the DIF which is already stored in the ITOTAL register which is the DIF Of trained key 1–3–4. The ITOT difference of 11 is worse than the ITOTAL of 4, in the sense that it is strictly larger, so that the contents of the IGI and IAI registers are not changed, and a search using the execution key continues.

Since the ADP of node 17 is 17, as illustrated in FIG. 19, there are no further nodes in the filial set, and it is necessary to return again to the second level of the tree, namely, to node 16. Again, before the fourth search iteration is made at node 16, the prior differences of nodes 17 and 4, stored in the IE(3) and IE(2) registers, are subtracted from ITOT so that ITOT is now 1. The second key component 4 of the execution key is compared with the value 1 of node 16. The difference of 3 is entered into the IE(2) register, as shown in FIG. 20, and added to the ITOT register so that the total DIF in the ITOT register is now 4. Then, the DIF of 4 between the third key component 2 and the value of 6 stored in the VAL register of node 21 (the next node indicated by the ADF of node 16) is stored in IE(3) and added to the ITOT register. The sum in the ITOT register is now 8 which is again greater than the DIF of 4 stored in the ITOTAL register.

The ADP of node 21 is 21, and hence it is again necessary to return to the second level, namely, to node 20, as shown in FIG. 19. The numbers stored in the IE(3) and IE(2) registers are subtracted from ITOT, so ITOT is again 1. The second key component 4 of the execution key is compared with the value 7 stored in the VAL register of node 20. The DIF of 3 is stored as IE(2) and also added to ITOT, now equal to 4. The ADF of node 20 next leads us to node 29 in the third level where the value of 2 stored in its VAL register is compared to the third key component 2. The DIF is 0, so that IE(3) is set equal to 0 and ITOT remains equal to 4.

At this point, as indicated in the chart of FIG. 20, with reference to the fifth search, ITOT is equal to ITOTAL. Thus, both the prior key 1–3–4 and the present key 1–7–2 have a DIF of 4, and the set of G's and corresponding A's must be added to the set of G's and A's comprising the set IGI($q$) and IAI($q$). In addition, in one embodiment of the invention, it is necessary to keep all members of the set in their order of likelihood. Thus, according to the present value of JC, there are two IGI's with corresponding IAI's. These two IGI's and corresponding IAI's are placed into temporary storage along with the G of $Z_5$ and corresponding A of 7 found in node 29. These G values and corresponding A's are next replaced in the IGI and IAI registers in their order or likelihood, the one of most likely (i.e., the one with the highest corresponding A value) occupying the first register IGI(1) in the set. Before this can be done, however, it must be determined whether, in fact, the G of key 1–7–2 is different from the G's of key 1–3–4. Thus, $Z_5$ is compared with $Z_2$ and $Z_6$. If, for example, $Z_5$ is equal to $Z_2$, $Z_5$ is eliminated but its corresponding A value is added to the A value corresponding to $Z_2$. The A's of the remaining trained responses are then replaced in the IGI and IAI registers with the most likely trained response stored in the IGI(1) register.

Assume, however, that none of the G's match. In such case, as indicated on the chart of FIG. 20, IGI(1) $= Z_5$, IGI(2) $= Z_2$ and IGI(3) $= Z_6$. Since there are now three members of the set of Gs $\{Z_5, Z_2, Z_6\}$ the JC register is set equal to 3.

Before continuing with the description of further searches in the tree, one embodiment of the expanded search subsystem which reduces the total search time through the tree will be briefly described. It will be noted that the contents of the ITOT register are periodically compared to the contents of the ITOTAL register. In fact, after each addition to the ITOT register, the contents of the ITOT register may be compared with the ITOTAL register. If the contents of the ITOT register are greater than the ITOTAL register and the leaf level of a filial set has not yet been reached, node rejection takes place. Node rejection is used since the DIF at this point in the search iteration is already greater than the best ITOTAL DIF and there is no need to make further search iterations in the branches extending from that node. This can be better understood with reference to a specific example. In the second search iteration, after the second level search of node 4, the DIF is 5. This DIF of 5 is already greater than the DIF of 4 which has been identified for training key 1–3–4. This means that even if the search iteration continues via the ADF of node 4 to the third level to look at node 17, the DIF must be greater than the DIF of 4 already registered in ITOTAL. Therefore, the additional level search is not made and node rejection occurs.

At this point in the search, all branches of the tree of FIG. 19 extending from the ADF of node 1 have been examined. It is therefore now necessary to return to node 1 in the first level and via its ADP of 8 to node 8. The values stored in the IE(3), IE(2) and IE(1) registers are subtracted from ITOT, so that ITOT is now 0. The first key component 2 is compared with the value 2 stored in the VAL register of node 8. The DIF is equal to 0, so that IE(1) is now set equal to 0 and ITOT remains at 0. In the second level, the second key component 4 is compared with the value 4 in the VAL register of node 9. Again, DIF is equal to 0. IE(2) is then set equal to 0; ITOT remains at 0. The ADF of node 9 next leads to node 10 in the third level. The 1 stored in the VAL register of that node is now compared with the third key component 2. The DIF is 1, and therefore, a 1 is stored in the IE(3) register and ITOT becomes 1. This DIF of 1 for the key function 2–4–1, now in the ITOT register, is compared with the DIF of 4 stored in the ITOTAL register. According to definition, the smaller DIF of 1 stored in the ITOT register is better than the DIF of 4 stored in ITOTAL. Therefore, the DIF of 1 is stored in the ITOTAL register and the corresponding G and A of key 2–4–1 are entered into the IGI and IAI registers. IGI(1) is thus set to $Z_7$, IAI(1) is set to 2 and the counter JC is set at 1 to indicate that only one trained response with the best DIF has been selected. Because JC is now equal to 1, the registers IGI(2), IGI(3), IAI(2) and IAI(3) are essentially cleared.

Further search iterations are continued in the above manner until the entire tree has been searched. If node rejection is utilized, the search will be speeded up considerably as indicated. In fact, had node rejection been used, no further searches would be made for the tree illustrated in FIG. 19 because no DIF of 1 or less can be found in testing nodes 14, 26 or 11.

The system of the invention has now been generally described. As previously indicated, one embodiment of the nonlinear processor of the invention may be comprised of a specialized digital system. It has been recognized, however, that a general-purpose digital computer may be regarded as a storeroom of electrical parts and when properly programmed, becomes a special-purpose digital computer or specific electrical circuit. Therefore, other embodiments of the invention will employ a properly programmed general-purpose digital computer to replace some or all of such specific digital circuitry. Both an embodiment of a specialized digital system as well as a general-purpose computer embodiment of the invention will henceforth be described in detail.

Figures 21, 21A, 21B:
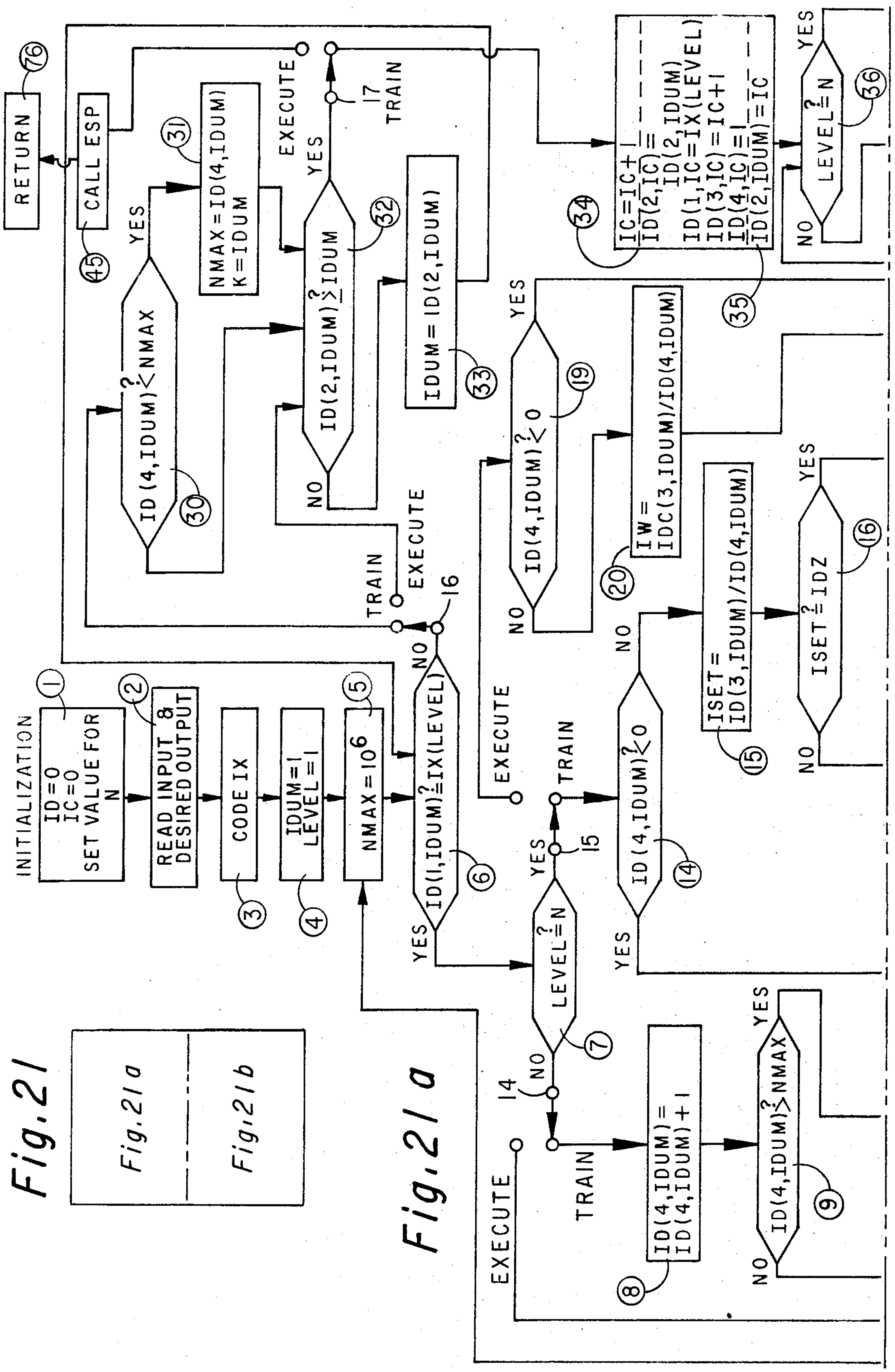
Figure 21B:
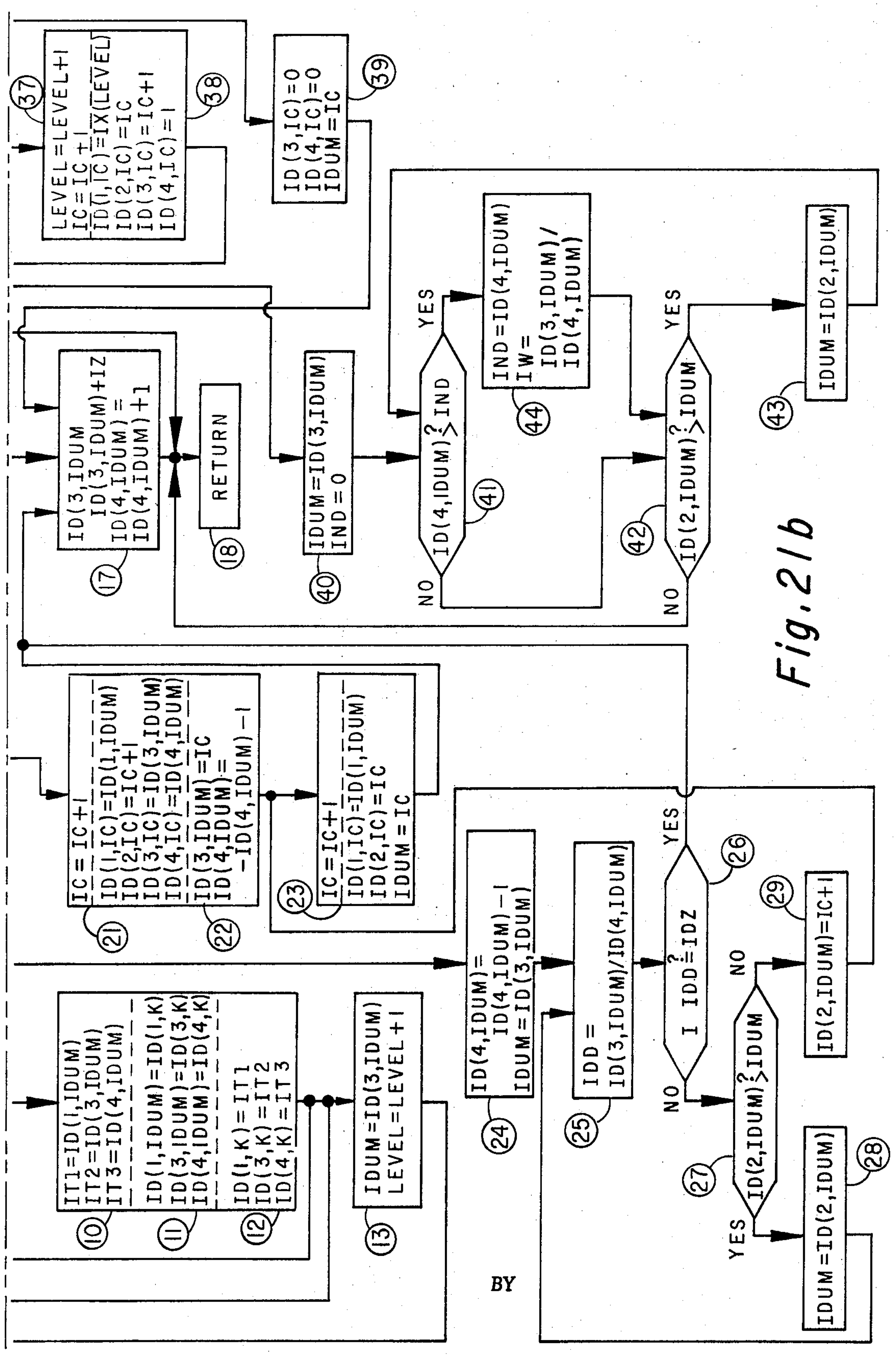
Figure 22:
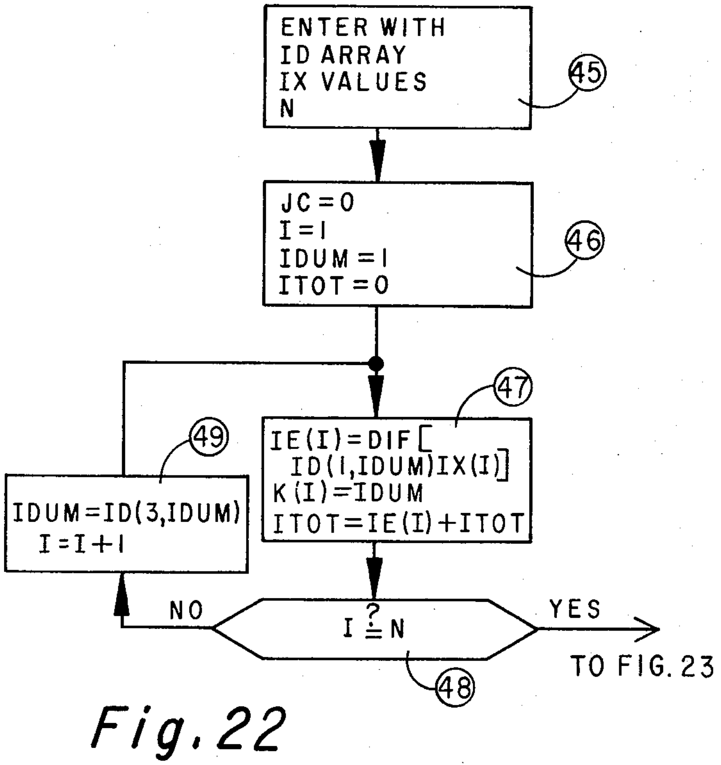
Figure 24:
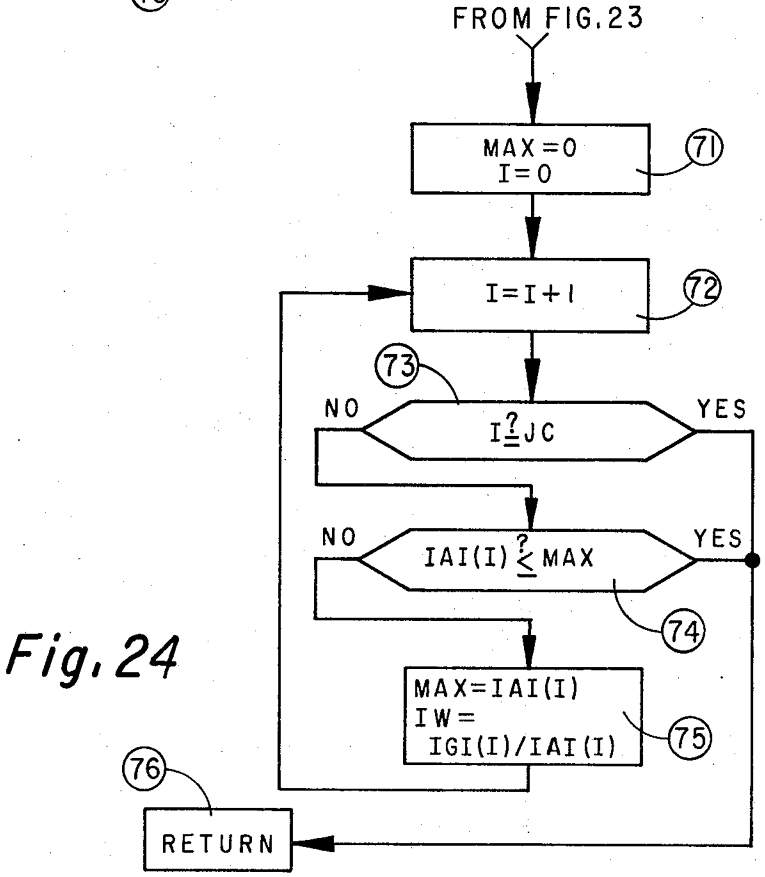
Figure 23:
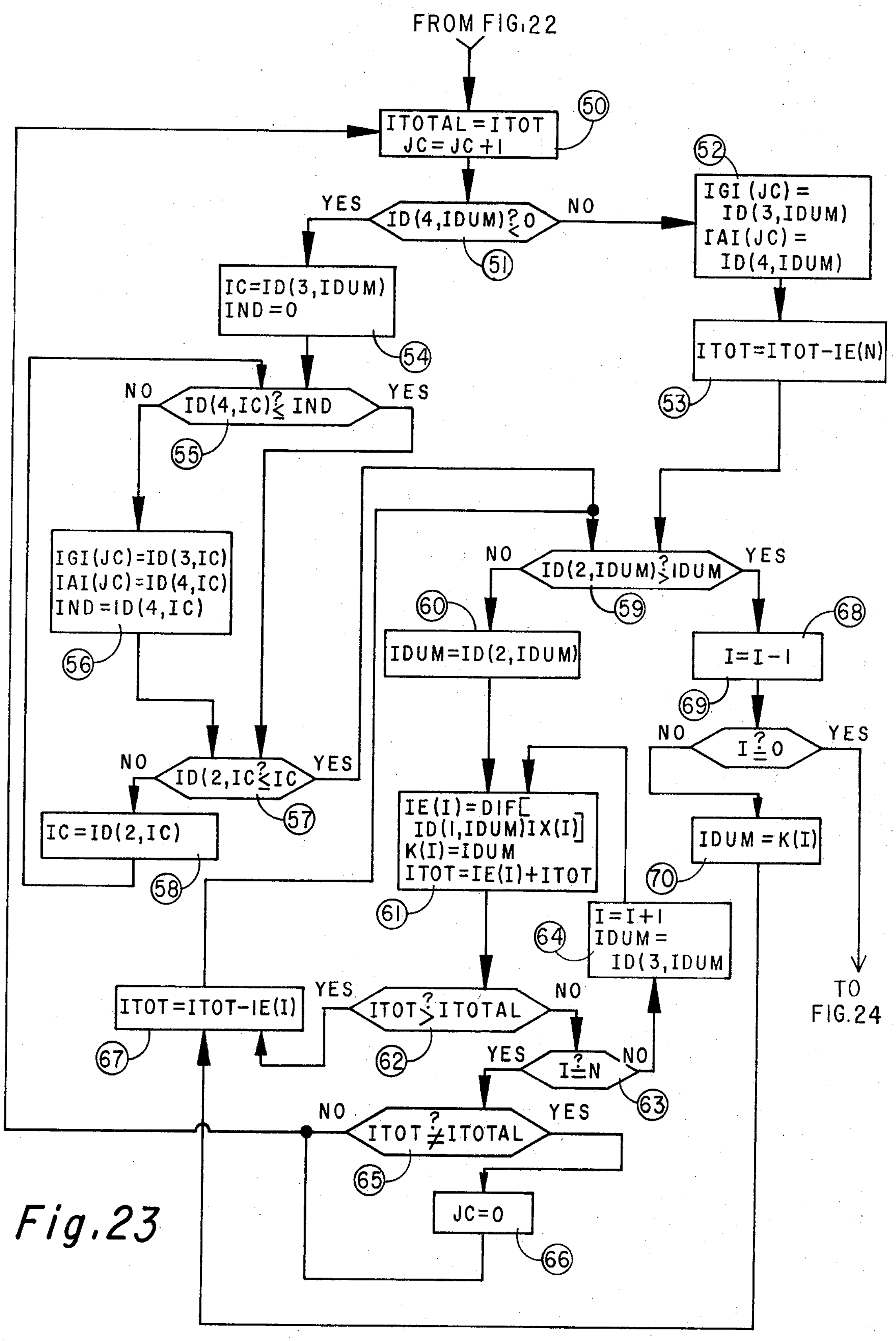
Figure 25A:
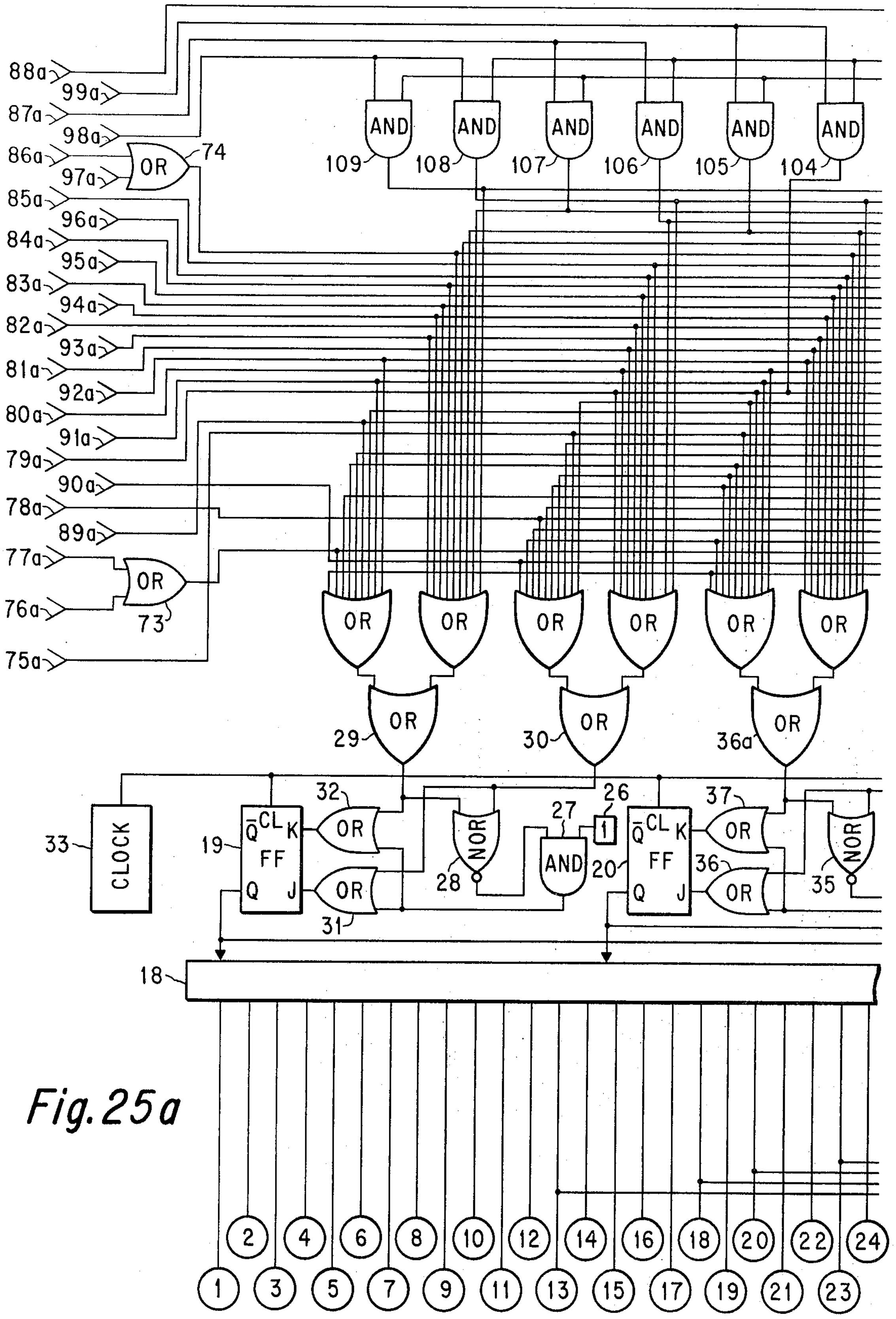
Figure 25B:
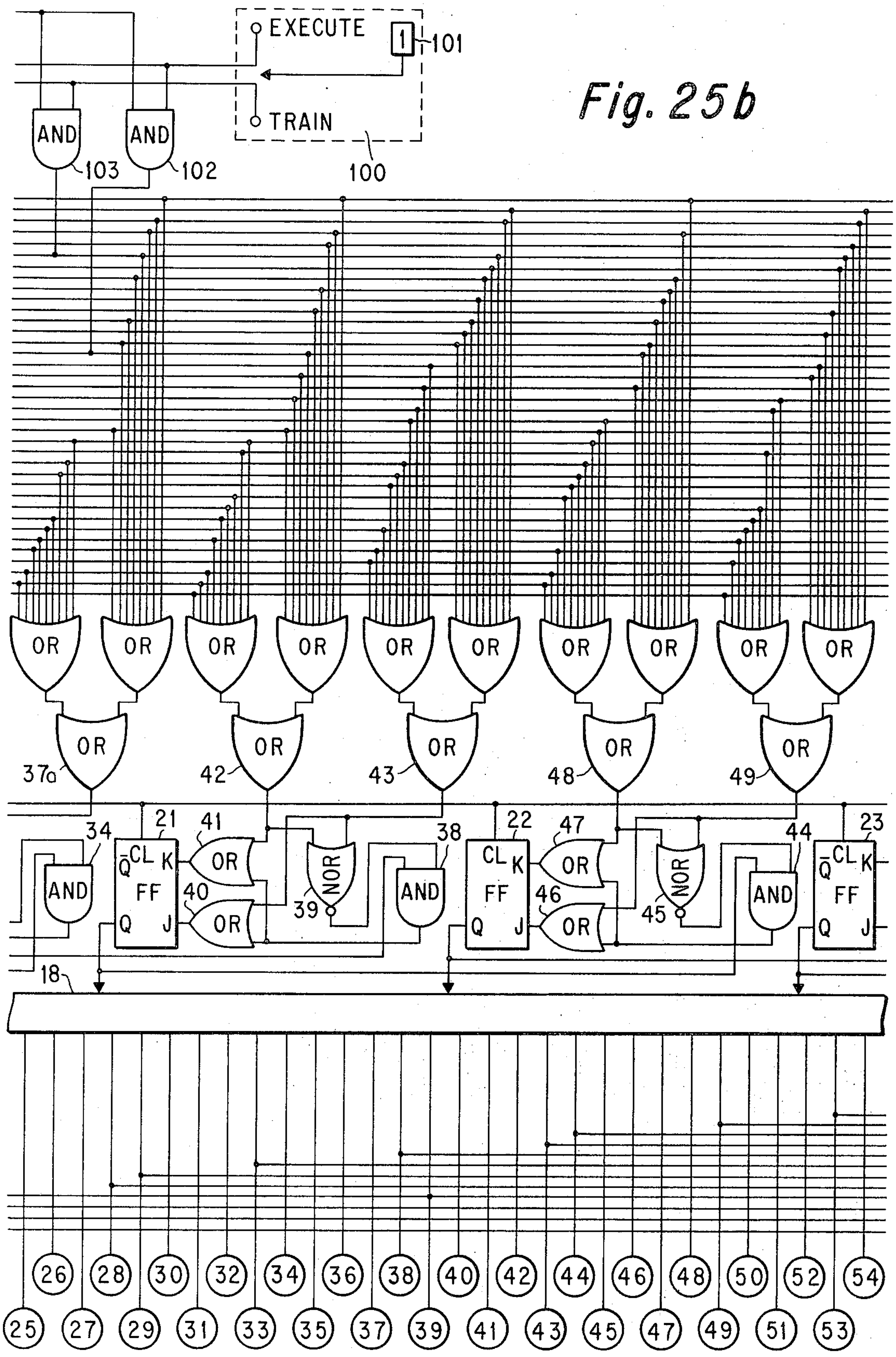
Figure 25C:
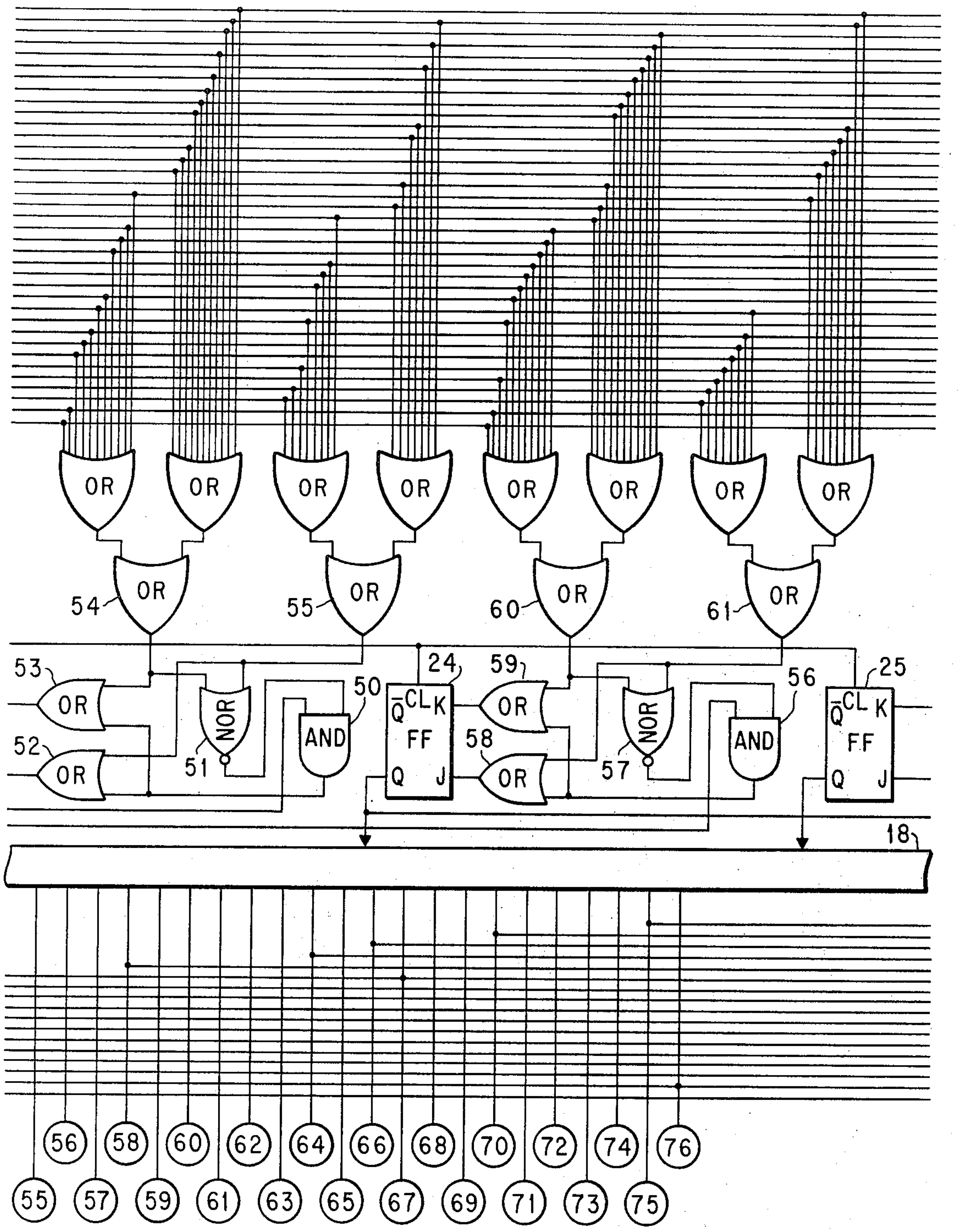
Figure 25D:
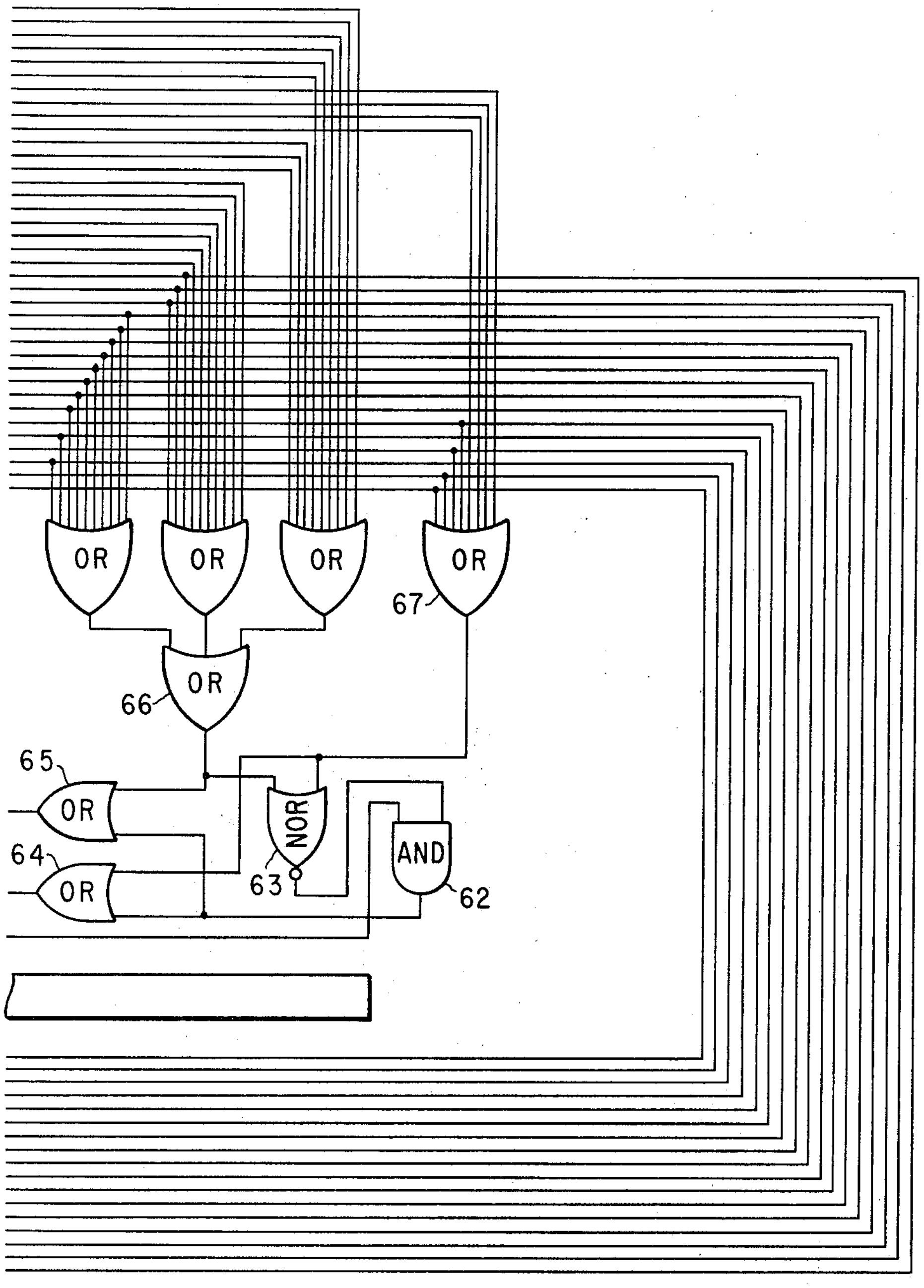
Figure 26A:
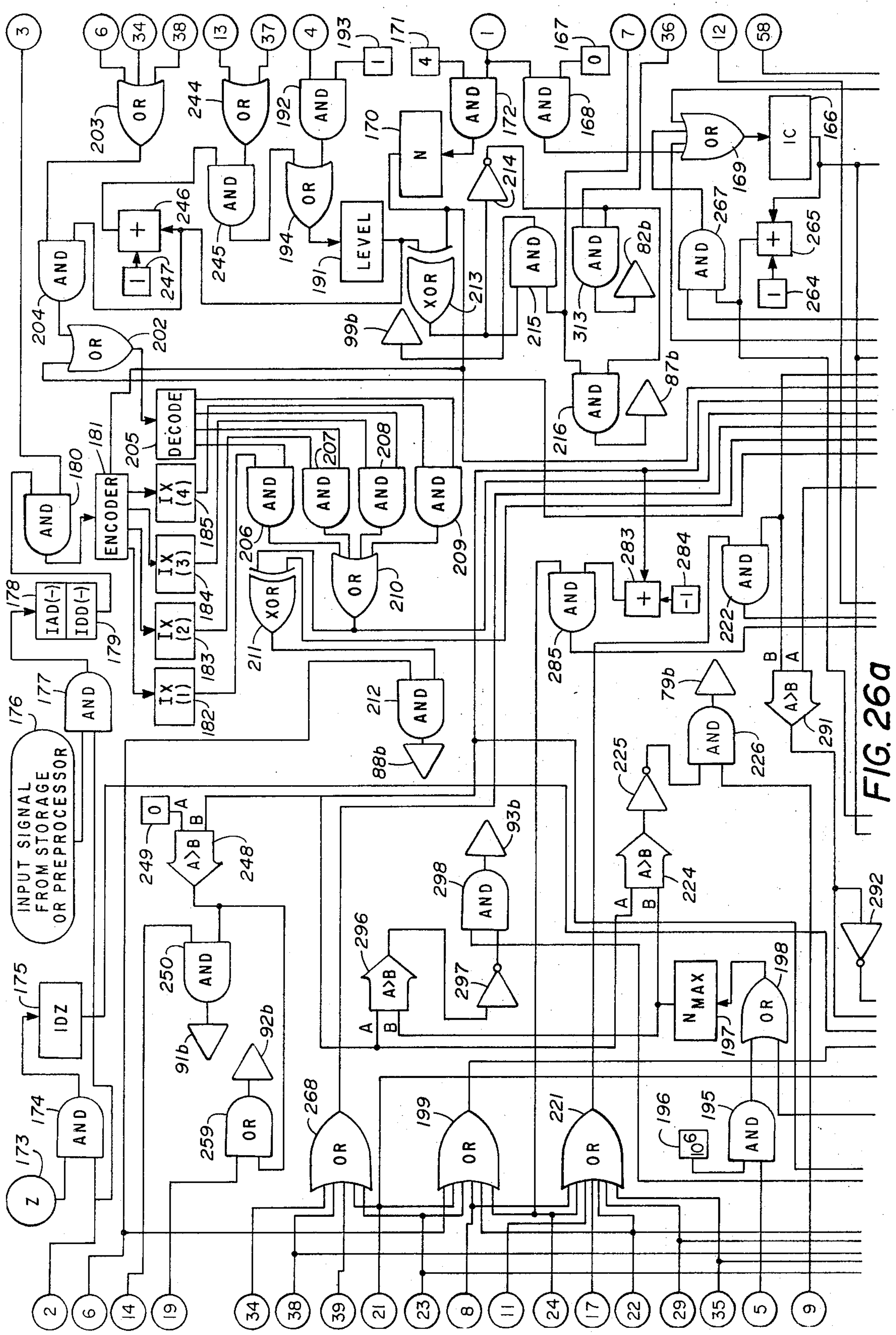
Figure 26B:
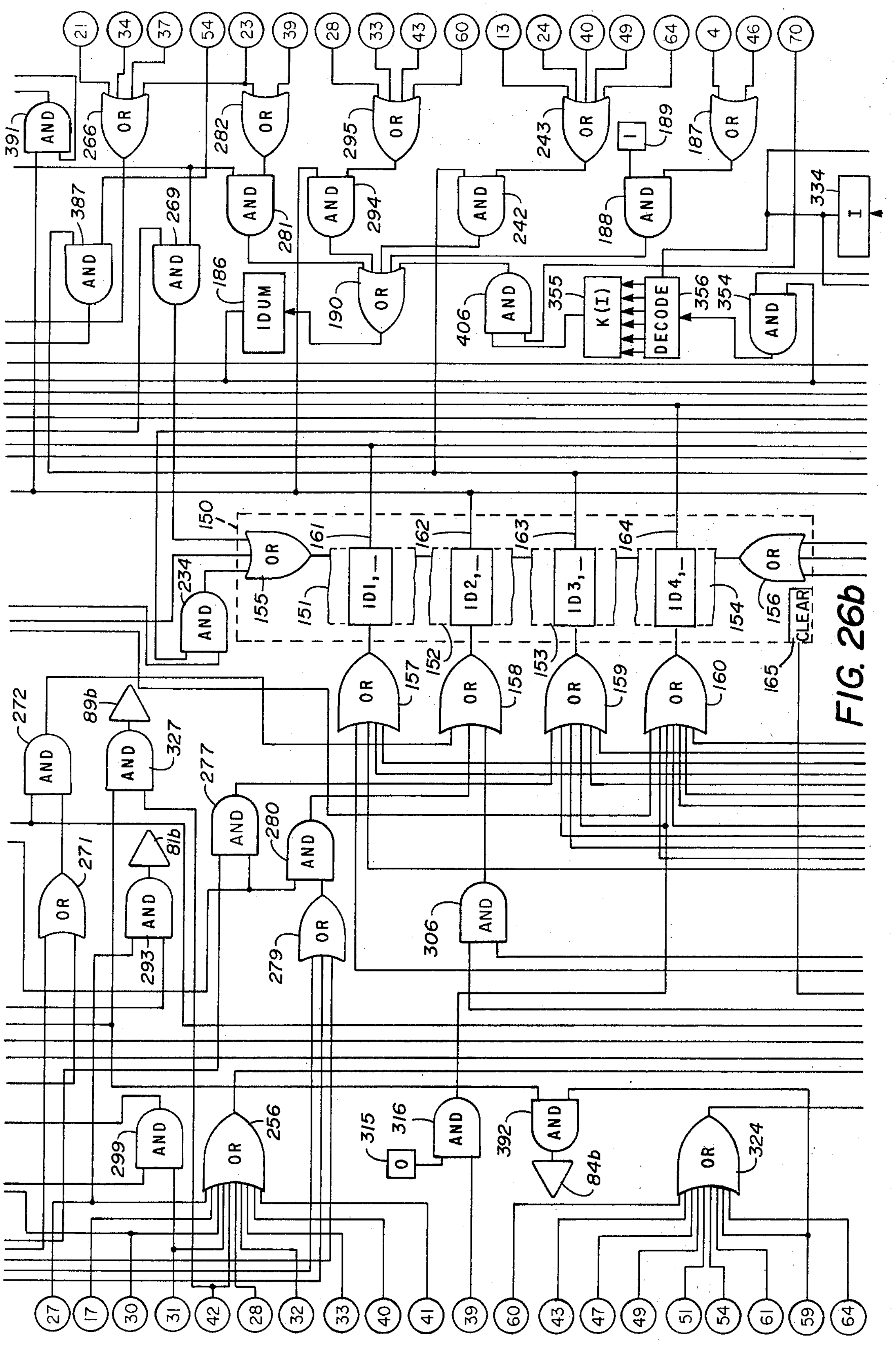
Figure 26C:
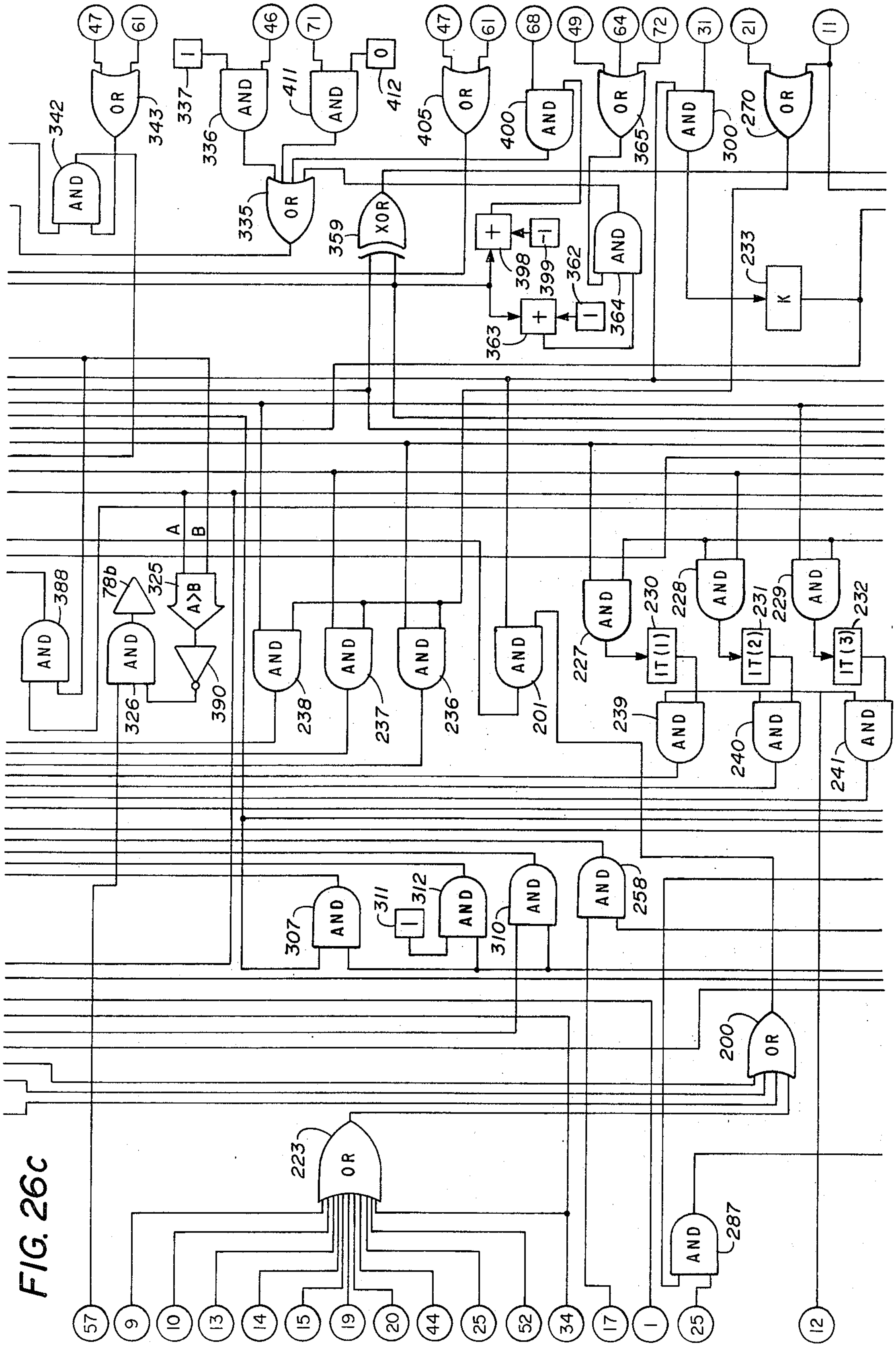
Figure 26D:
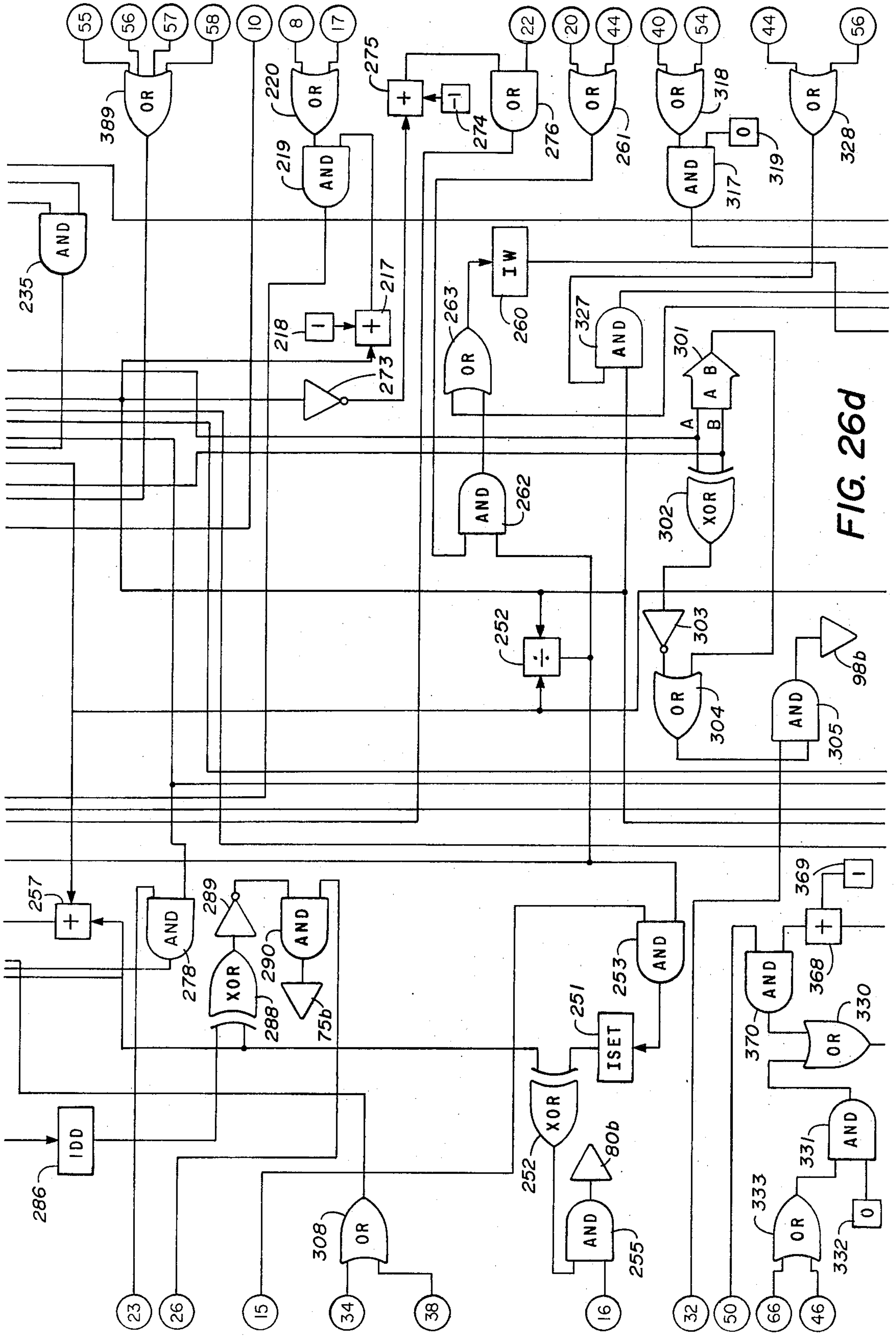
Figure 26E:
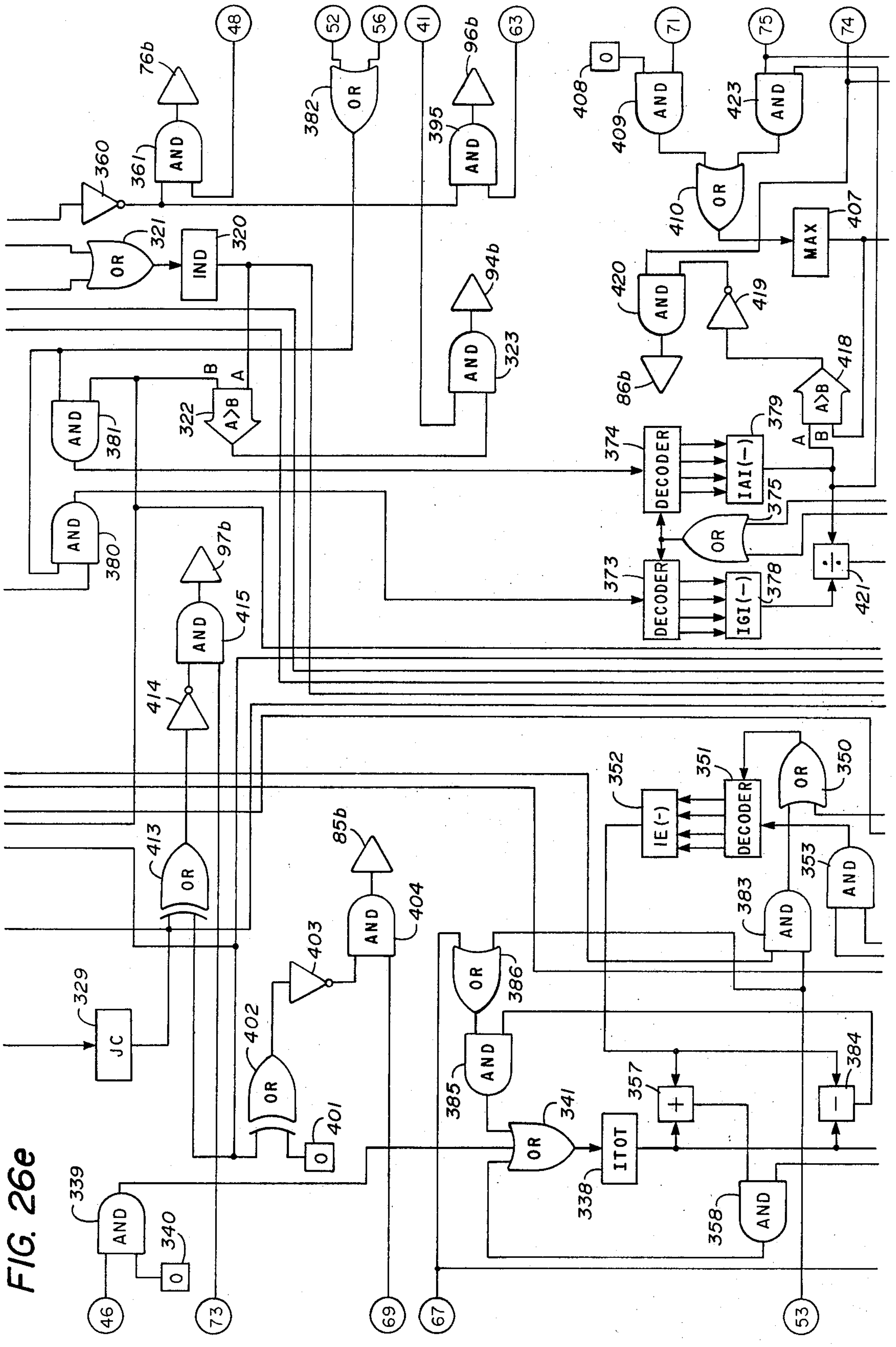
Figure 26F:
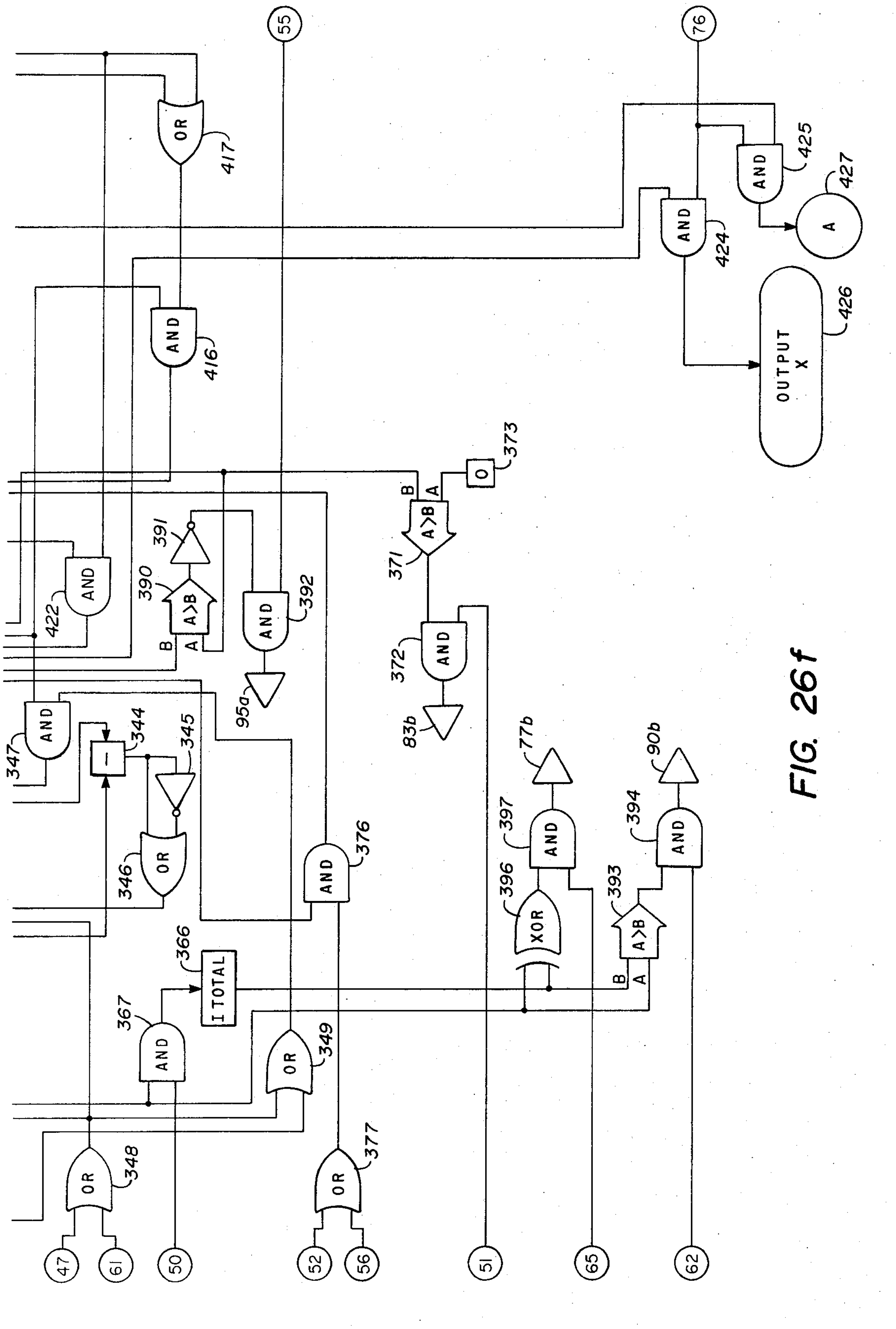

The flow diagrams of FIGS. 21–24 apply to operations on a general purpose digital computer as well as operation of a special purpose computer illustrated in FIGS. 25 and 26. The flow diagram of FIG. 21 is comprised of two FIGS. 21*a* and 21*b* which are put together as illustrated in FIG. 21. The special purpose digital computer will carry out the operations represented in the flow diagrams automatically. A FORTRAN IV program comprising TABLE II will allow the operations of the flow diagram to be carried out on any general purpose digital computer having a corresponding FORTRAN compiler.

The flow diagram of FIG. 21 essentially follows the operation of an embodiment of the nonlinear processor utilizing the tree-allocated memory array system previously discussed with reference to FIGS. 7–20. It will be noted that in FIG. 21, control states 1–45 and 76 are assigned to the various operations required in the flow diagram and that switches 14–17 are set in position for use during the training phase. When switches 14–17 are changed to the second terminals thereof, the flow diagram is representative of the operation of the processor after training and during the execution phase. With respect to the operation of the processor during execution, control state 45 calls for the subsystem comprising the expanded search procedure (ESP) to be utilized. The ESP subsystem is then separately illustrated in the flow diagrams of FIGS. 22–24 with reference numerals corresponding to control states 45–76.

The legends set out in FIGS. 21–24 will best be understood by reference to the specific embodiments illustrated in FIGS. 25–26 and in TABLE II. Briefly, however, notice should be taken of the following legends use in FIGS. 21–24 and TABLE II as they relate to the previous general description of the processor of the invention.

The term IAD(1–144) represents the 144 bit positions comprising a 12-by-12 grid of a preprocessor stage as discussed above with reference to FIG. 6. An equivalent representation for IAD(1–144) is IDD(1–12, 1–12). As discussed previously, the 12 bits comprising each of the 12 lines of the 12-by-12 grid might be converted into its decimal equivalent, in which case, the number of signals into the processor would be reduced to 12. In the particular embodiments we are now going to discuss, the 144 bits comprising the grid are divided into four parts of 36 bits each rather than into 12 parts of 12 bits each. Each of the four segments of 36 bits is converted into its decimal equivalent. The input signal into the processor is therefore the set { u(1), u(2), u(3), u(4)}. The term IX is henceforth utilized to represent the members of the set. Thus IX(1) represents u(1), IX(2) represents u(2), IX(3) represents u(3) and IX(4) represents u(4).

The four registers comprising the nodes of the tree-allocated array are represented by an ID array: ID(1, 18), ID(2, ), ID(3, ), and ID(4, ). The number which is placed in the blank space indicates the number of the node which the particular ID represents. ID(1, 18) represents the VAL register of the node; ID(25 18) represents the ADP register of the node; ID(3, ) represents the ADF register of the node or the G register if the node happens to be in the leaf level; ID(4, 18) represents the N register of the node or the A register if the node happens to be in the leaf level. Thus, for example, the VAL of node 1 is stored in the ID(1,1) register while the ADP of node 1 is stored in the ID(2,1) register. Occasionally in the description the ID registers will be referred to without a node number as I 1, ID2, ID3 and ID4.

IDUM is an incrementing or dummy register, and its contents signify the node identification at any instant during operation. The VAL register of a node may therefore be referred to as ID(1,IDUM).

In the following descriptions, the N is merely an indicator of the number of true levels in the tree or in other words the total number of key components which in this embodiment is four corresponding to the four component input signals. It is therefore evident, that the N which is used in the following description is not the same as the N register, previously discussed and now ID(4, ).

LEVEL is a register numerically indicating the level in the tree structure and, more particularly, the value stored therein assumes different values during operation, indicating the level of operation with the tree structure at any given time.

IC is a counter which keeps track of the total number of nodes used up at any instant. Therefore, when it is necessary to add a new node to the tree, the new node number will be the value of (IC+1) and the new node number will then be stored as IC.

IT(1), IT(2) and IT(3) are temporary storage registers utilized for various purposes. Several additional dummy variables are used throughout and will be identified as encountered. All other terms used in the following discussion and which have been previously discussed with respect to the general description above have essentially the same meaning.

As mentioned previously, a specialized hardware computer embodiment of the trainable processor of the invention is illustrated in FIGS. 25 and 26. FIG. 25 consists of 4 parts (FIGS. 25*a*, 25*b*, 25*c*, and 25*d*) which are put together as shown in FIG. 25. FIG. 26 is in six parts (FIGS. 26*a*, 26*b*, 26*c*, 26*d*, 26*e*, and 26*f*) which are put together a shown in FIG. 26. The operation of such specialized computer embodiment follows the sequence of steps depicted in the flow charts of FIGS. 21–24, that is, during each of the 76 control states of the flow charts one or more operations are carried out by the computer. A time pulse distributor subsystem of the computer, illustrated in FIG. 25, provides the 76 control states (represented by encircled numerals).

The time pulse distributor is essentially comprised of a resettable binary counter which continues to count from 0–127, unless reset at some point in the sequence, and binary-to-decimal decoder 18. The counter is comprised of seven J–K flip-flops 19–25. Each J–K flip-flop has two inputs, J and K. Its operation is as follows. When no input (i.e., logic 0) is applied, the state of the flip-flop remains unchanged when a pulse is applied to its clock (CL) input. When a logic 1 is applied only to the J input, the flip-flop is switched to the 1 state and its output Q is a logic 1. When a logic 1 input is applied only to the K input of the flip-flop, it is set to a 0 state, and the output Q is a logic 0. When logic 1 inputs are applied to both J and K, the flip-flop switches to its complement state. Flip-flop 19 forms the lowest order binary bit of the counter ($2^0$). A logic 1 signal, provided by logic 1 generator 26, is introduced into AND-gate 27 along with the output of NOR-gate 28. When the input signals from OR-gates 20 and 30 are logical 0's, a logical 1 will be transmitted from NOR-gate 28 to AND-gate 27, and thereby a logical 1 is transmitted to both the J and K inputs via OR-gates 31 and 32, respectively. Hence, at each pulse from clock 33 to the CL input of flip-flop 19 the output Q is changed to its complement, as long as the inputs to NOR-gate 28 are both logical 0's. OR-gates 29 and 30 provide means for setting or resetting the flip-flop. Thus, a logic 1 input or OR-gate 29 causes NOR-gate 28 to be set to a logic 0 state and thereby introduces a logic 1 from OR-gate 29, via OR-gate 32, only to the K input of flip-flop 19 causing such flip-flop to be set at 0. On the other hand, a logic 1 input to OR-gate 30 also causes NOR-gate 28 to a logic 0 state but now OR-gate 30 introduces a logic 1, via OR-gate 31, only to the J input of flip-flop 19 causing the flip-flop to be set to a logic 1 on the next clock pulse.

The Q output of flip-flop 19 is transmitted to binary-to-decimal decoder 18 as well as to AND-gate 34. Similarly, the Q output of flip-flop 20 forms the second order ($2^1$) binary bit and is transmitted to binary-to-decimal decoder 18 and to AND-gate 38; the Q output of flip-flop 21 forms the third order ($2^2$) binary bit and is transmitted to binary-to-decimal decoder 18 and to AND-gate 44; the Q output of flip-flop 22 forms the fourth order ($2^3$) binary bit and is transmitted to binary-to-decimal decoder 18 and to AND-gate 50; the Q output of flip-flop 23 forms the fifth order ($2^4$) binary bit and is transmitted to binary-to-decimal decoder 18 and to AND-gate 56; the Q output of flip-flop 24 forms the sixth order ($2^5$) binary bit and is transmitted to binary-to-decimal decoder 18 and to AND-gate 62; and the Q output of flip-flop 25 forms the highest or seventh order ($2^6$) binary bit and is transmitted only to binary-to-decimal decoder 18. As a result, when the output of NOR-gates 35, 39, 45, 51, 57 or 63 are at logical 1 states and the Q outputs from the previous flip-flop (19, 20, 21, 22, 23 or 24, respectively) is also at a logical 1, logical 1's are transmitted from AND-gates 34, 38, 44, 50 56 or 62, respectively, to the J and K inputs of the next flip-flop in the series (20, 21, 22, 23, 24 or 25, respectively) via OR-gates 36 and 37, 40 and 41, 46 and 47, 52 and 53, 58 and 59, or, 64 and 65, respectively. Thus, unless there is a logical 1 transmitted from OR-gate 29, 36*a*, 42, 48, 54, 60 or 66 via OR-gates 32, 37, 41, 47, 53, 59 or 65, respectively, to the K inputs of flip-flop 19, 20, 21, 22, 23, 24 or 25, respectively, in which instance the respective flip-flop is set to a logic 0 on the next pulse from clock 33, or, there is a logic 1 transmitted from OR-gate **30, 37*a*, 43, 49, 55, 61 or 67 via OR-gates 31, 36, 40, 46, 52, 58 or 64, respectively, to the J input of flip-flop 19, 20, 21, 22, 23, 24 or 25, respectively, in which instance the respective flip-flop is set to a logic 1 on the next pulse from clock 33, flip-flop 19 changes state on every clock pulse, flip-flop 20 changes state on every other clock pulse, flip-flop 21 changes state every fourth clock pulse, flip-flop 22 changes state every eighth clock pulse, flip-flop 23 changes state every sixteenth clock pulse, flip-flop 24 changes state every 32nd clock pulse and flip-flop 25 changes state every 64th clock pulse. Thus, a resettable 0–127 decimal counter is provided which is coupled to binary-to-decimal decoder 18. Of the 128 possible states only 0–76 are utilized in the illustrative embodiment herein described. When the control state is 76, that is, when a logic 1 is transmitted on line 76 (encircled), such signal is fed back to OR-gates 29, 37, 42, 48, 54, 60 and 67,** thereby resetting the counter to binary number 0000010 and hence to control state 2.

Logical 1 signals are transmitted to OR-gates 42, 48, 54, 60 or 66, or, 43, 49, 55, 61 or 67 when it is desired to reset the counter to a particular control state on the next clock pulse rather than having the counter continue in its consecutive sequence of control states. The inputs to these OR-gates come from three sources. Firstly, as indicated above with respect to control state 76 (encircled), certain control states are fed back to various ones of OR-gates 42, 48, 54, 60 or 66, or, 43, 49, 55, 61 or 67 so that a selected state will become the next state.

Secondly, when certain conditions, which will hereinafter be described in detail, occur with respect to the particular data being fed into the computer and when a particular control state is reached, logical 1 signals are transmitted via one of the inputs **75*a*–99*a* to OR-gates 42, 48, 54, 60 or 66, or, 43, 49, 55, 61 or 67 so that the counter will be reset to a selected state on the next pulse from clock 33.**

OR-gate 73 provides means for resetting the counter to the same condition (0110010 or control state 50) when a logical 1 is transmitted to either input **76*a* or 77*a*. OR-gate 74 provides means for resetting the counter to the same condition (1000100 or control state 68) when a logical 1 is transmitted to either input 86*a* or 97*a*.**

Lastly, when certain control states have been reached, the next control states are dependent upon whether the mode of operation is in a training cycle or an execution cycle corresponding to switches 14–17 in FIG. 21. Switfh 100 is thus provided to transmit a logic 1 signal from logic 1 generator 101 via AND-gates 102–109 to OR-gates 42, 48, 54, 60 or 66, or 43, 49, 55, 61 or 67 whereby the counter will be reset to a selected state on the next clock pulse.

The entire operation of the time pulse distributor is shown in TABLE I. The counter is initially at zero. The first clock pulse will set the time pulse distributor at control state 1. The next state is normally the next consecutive state unless at a certain control state a condition occurs which resets the counter to a selected control state. The

TABLE I

| STATE | CONDITION | NEXT STATE |
|---|---|---|
| 1 | | 2 |
| 2 | | 3 |
| 3 | | 4 |
| 4 | | 5 |
| 5 | | 6 |
| 6 | If ID(1, IDUM)=IX(LEVEL) | 7 |
| | else — If TRAIN | 30 |
| | else — If EXECUTE | 32 |
| 7 | If LEVEL=N — If TRAIN | 14 |
| | If LEVEL=N — If EXECUTE | 19 |
| | else — If TRAIN | 8 |
| | else — If EXECUTE | 13 |
| 8 | | 9 |
| 9 | If ID(4, IDUM)>$N_{MAX}$ | 10 |
| | else | 13 |
| 10 | | 11 |
| 11 | | 12 |
| 12 | | 13 |
| 13 | | 5 |
| 14 | If ID(4, IDUM)<0 | 24 |
| | else | 15 |
| 15 | | 16 |
| 16 | If ISET=IDZ | 17 |
| | else | 21 |
| 17 | | 18 |
| 18 | | 2 |
| 19 | If ID(4, IDUM)<0 | 40 |
| | else | 20 |
| 20 | | 18 |
| 21 | | 22 |
| 22 | | 23 |
| 23 | | 17 |
| 24 | | 25 |
| 25 | | 26 |
| 26 | If IDD=IDZ | 17 |
| | else | 27 |
| 27 | If ID(2, IDUM)>IDUM | 28 |
| | else | 29 |
| 28 | | 25 |
| 29 | | 23 |
| 30 | If ID(4, IDUM)<$N_{MAX}$ | 31 |
| | else | 32 |
| 31 | | 32 |
| 32 | If ID(2, IDUM) IDUM — If TRAIN | 34 |
| | If ID(2, IDUM) IDUM — If EXECUTE | 45 |
| | else | 33 |
| 33 | | 6 |
| 34 | | 35 |
| 35 | | 36 |
| 36 | If LEVEL=N | 39 |
| | else | 37 |
| 37 | | 38 |
| 38 | | 36 |
| 39 | | 17 |
| 40 | | 41 |
| 41 | If ID(4, IDUM)>IND | 44 |
| | else | 42 |
| 42 | If ID(2, IDUM)>IDUM | 43 |
| | else | 18 |
| 43 | | 41 |
| 44 | | 42 |
| 45 | | 46 |
| 46 | | 47 |
| 47 | | 48 |
| 48 | If I=N | 50 |
| | else | 49 |
| 49 | | 47 |
| 50 | | 51 |
| 51 | If ID(4, IDUM)<0 | 54 |
| | else | 52 |
| 52 | | 53 |
| 53 | | 59 |
| 54 | | 55 |
| 55 | If ID(4, IC)>IND | 56 |
| | else | 57 |
| 56 | | 57 |
| 57 | If ID(2, IC)>IC | 58 |
| | else | 59 |
| 58 | | 55 |
| 59 | If ID(2, IDUM)>IDUM | 68 |
| | else | 60 |
| 60 | | 61 |
| 61 | | 62 |
| 62 | If ITOT>ITOTAL | 67 |
| | else | 63 |
| 63 | If I=N | 65 |
| | else | 64 |
| 64 | | 61 |
| 65 | If ITOT ≠ ITOTAL | 66 |

| | | |
|---|---|---|
| | else | 50 |
| 66 | | 50 |
| 67 | | 59 |
| 68 | | 69 |
| 69 | If I=0 | 71 |
| | else | 70 |
| 70 | | 67 |
| 71 | | 72 |
| 72 | | 73 |
| 73 | If I=JC | 76 |
| | else | 74 |
| 74 | If IAI(I)>MAX | 75 |
| | else | 76 |
| 75 | | 72 |
| 76 | | 2 |

present state, reset conditions and next state are shown on the table for each of control states 1–76.

The time pulse distributor subsystem of FIG. 25 then operates the remainder of the system, illustrated in FIG. 26, as follows:

Control State 1

The four registers comprising each node of the tree-allocated memory array are provided by assigning one of four segments of random access memory 150 to each. Thus, a first segment 151 of the registers comprising memory 150 is dedicated to provide ID1 (or VAL) registers, a second segment 152 is dedicated to provide ID2 (or ADP) registers, a third segment 153 is dedicated to provide ID3 (or ADF/G) registers and a fourth segment 154 is dedicated to provide ID4 (or N/A) registers. In each segment 151–154, enough registers are provided to allow one for every node of the completed tree. OR-gate 155 is utilized as an input node selector to the read control of the registers comprising memory 150 while OR-gate 156 is utilized as the output node selector to the write control.

It should be noted at this point that the logic gates shown in FIG. 26 are each representative of one or a plurality of such gates depending upon whether the logic is being performed on a binary or decimal number. Thus, when the number being introduced into such logic gate is a binary true (logical 1) or false (logical 0), only one such gate is necessary; when the number being introduced into such logic gate is a decimal number, one of such logic gates is required for each bit of the binary number representing such decimal number. The registers of FIG. 26 also have sufficient bit positions to store the binary representations of the decimal numbers which are to be stored.

Returning now to memory 150, when a signal is applied to OR-gate 157 and a node number is applied to OR-gate 155, such signal is registered in the ID1 register having that node number. Similarly, when signals are applied to OR-gates 158–160, such signals will be registered in the ID2, ID3 and ID4 registers, respectively, having the node number being applied to OR-gate 155.

On the other hand, the information stored in the ID1, ID2, ID3 and ID4 registers corresponding to the node number applied to OR-gate 156 will appear on outputs 161, 162, 163 and 164, respectively.

During control state 1, each register in memory 150 is initialized to a decimal zero state. This is accomplished when, at control state 1, a signal is transmitted to "clear" input 165 of memory 150. In addition, IC register 166 is set to a decimal zero by transmitting a zero signal from generator 167 via AND-gate 168 to OR-gate 169. N register 170 is initialized by setting it equal to the number of real levels in the tree-allocated memory array which also corresponds to the number of key components that each input signal is encoded to.

As the number of levels is four in this particular embodiment, the initialization is accomplished by transmitting a decimal "4" signal from generator 171 via AND-gate 172 to N register 170.

Control State 2

During this control state, new input data comprising 144 binary bits of information from a grid or from tape storage and a desired output signal are read into the system and stored. On a control signal from the time pulse distributor subsystem, desired output signal 173 is transmitted via AND-gate 174 to IDZ register 175 where it is stored. Input signal 176 is transmitted via AND-gate 177 to two registers where they are stored, IAD register 178 and IDD register 179.

Control State 3

It is now necessary to encode the input signal stored in register 179 into key components. This is accomplished when, during this control state, a signal is transmitted to AND-gate 180, allowing the information stored in register 179 to be transmitted to encoder 181. Encoder 181 is controlled by N register 170 which indicates to encoder 181 the number of key components the input signal is to comprise. As there are to be four key components in this particular embodiment, key components IX(1), IX(2), IX(3) and IX(4) are provided by encoder 181 and are stored in registers 182, 183, 184 and 185, respectively.

Control State 4

IDUM register 186 is set to a decimal "1" when a pulse from the time pulse distributor subsystem is transmitted to OR-gate 187. The output of OR-gate 187 turns on AND-gate 188 which allows the decimal "1" provided by generator 189 to register 186 via OR-gate 190. LEVEL register 191 is also set equal to a decimal 1 during this control state, as AND-gate 192 is turned on, allowing a decimal 1 signal to be transmitted from generator 193 via OR-gate 194 to register 191.

Control State 5

During this control state AND-gate 195 is turned on, allowing a decimal "$10^6$" signal to be transmitted from generator 196 to $N_{MAX}$ register 197, via OR-gate 198, thereby setting register 197.

Control State 6

A decision must be made during this control state as to what the next control state will be. Thus, the contents of the ID(1,IDUM) register of memory 150 must be compared with the contents of the IX(LEVEL) register, LEVEL being a number from one to four stored in register 191, to determine whether they are equal. When they are equal, no signal is transmitted to reset the counter of the time pulse distributor subsystem illustrated in FIG. 25 and the next control state will be 7. When they are not equal, however, a logic 1 signal must be transmitted to input 88_a_ of the time pulse distributor. The counter of the time pulse distributor is then reset to control state 30 when switch 100 is set in the TRAIN position or to control state 32 when switch 100 is set in the EXECUTE position in the manner previously described in detail with reference to FIG. 25.

This is accomplished by the system of FIG. 26 when, during this control state a signal from the time pulse distributor to OR-gate 200 via OR-gate 199 turns on AND-gate 201, allowing the number now stored in IDUM register 186 to be transmitted to OR-gate 156, thereby selecting the output of a node having the same number as that contained in register 186. Output 161 of segment 151 of memory 150 is then ID(1,IDUM). In order to provide IX(LEVEL), the number stored in LEVEL register 191 is transmitted to OR-gate 202 when the control signal is sent to OR-gate 203, thereby turning on AND-gate 204. From here, the contents of LEVEL register 191 go into decoder 205 which determines whether the number is a one, two, three or four and transmits a signal to turn on one of AND-gates 206, 207, 208 or 209, respectively, depending upon the number. When AND-gate 206 is turned on the number stored in IX(1) register 182 is transmitted to OR-gate 210, when AND-gate 207 is turned on the number stored in IX(2) register 183 is transmitted to OR-gate 210, when AND-gate 208 is turned on the number stored in IX(3) register 184 is transmitted to OR-gate 210, and when AND-gate 209 is turned on the number stored in IX(4) register 185 is transmitted to OR-gate 210.

The number stored in the ID(1,IDUM) register at output 161 of memory 150 is then transmitted to an exclusive OR-gate, XOR-gate 211, along with the output of OR-gate 210 (IX(LEVEL)). XOR-gate 211 will then transmit a logic 1 signal via AND-gate 212 from output 88*b* to input 88*a* of the time pulse distributor when ID(-1,IDUM) is not equal to IX(LEVEL).

Control State 7

Another decision must be made at this control state as to which one of four possible control states is to be the next state. The decision is based on whether the number stored in LEVEL register 191 is equal to the number stored in N register 170. Thus, the numbers stored in registers 191 and 170 are transmitted to XOR-gate 213. When LEVEL is not equal to N, there is a logic 1 output from XOR-gate 213 and AND-gate 215, and therefore, as the control state is 7, the logic 1 is transmitted from output 99*b* to input 99*a* of the time pulse distributor of FIG. 25. The time pulse distributor will then allow the counter to continue to control state 8 when switch 100 is in the TRAIN position, but reset the counter to control state 13 when switch 100 is in the EXECUTE position.

On the other hand, when LEVEL is equal to N, there is a logic 0 output from XOR-gate 213 to NOT-gate 214, thereby transmitting a logic 1 via AND-gate 216 to output 87*b*. Output 87*b* is then connected to input 87*a* of the time pulse distributor which resets the counter to state 14 when switch 100 is in the TRAIN position or to state 19 when switch 100 is in the EXECUTE position.

Control State 8

During this control state the contents of the ID(-4,IDUM) register of segment 154 of memory 150 is increased by a decimal 1. To accomplish this, the control signal is transmitted via OR-gates 199 and 200 to turn on AND-gate 201, thereby utilizing the number now stored in IDUM register 186 as the node number of ID4 output 164. The output of AND-gate 201, containing such node number, is transmitted to OR-gate 156. Output 164 ID(4,IDUM) is thus transmitted to full adder 217 which adds a decimal 1, provided by generator 218, to the number stored in ID(4,IDUM). As the control signal is also being transmitted to OR-gate 220, AND-gate 219 is turned on, allowing ID(4,IDUM)+1 to be transmitted to OR-gate 160. The control signal is also being transmitted from OR-gate 221 to AND-gate 222, thus allowing input select OR-gate 155 of memory 150 to select a node having the number stored in IDUM register 186. As a result of the foregoing, the ID(-4,IDUM) register is set equal to the number being transmitted to OR-gate 160, namely, ID(4,IDUM)+1.

Control State 9

Again, a decision as to what the next control state is to be must be made. The decision is based on whether the number stored in the ID(4,IDUM) register is greater than $N_{MAX}$. The comparison is achieved as a control signal is transmitted via OR-gate 223 to OR-gate 200 which turns on AND-gate 201, allowing the number stored in IDUM register 186 to select the output node at OR-gate 156 of memory 150. Output 164 then transmits the number stored in the ID(4,IDUM) register to the A-input of comparator 224, and the output of $N_{MAX}$ register 197 is transmitted to the B-input of comparator 224. Comparator 224 operates to transmit a logic 1 output when the number introduced into the A-input is greater than the number introduced into the B-input. Thus, NOT-gate 225 transmits a logic 1 signal to AND-gate 226 when the A-input is less than or equal to the B-input, and hence, to output 79*b*. Output 79*b* is than connected to input 79*a* of the control pulse distributor of FIG. 25 which resets the counter to control state 13 when the number stored in the ID(4,IDUM) register is not greater than the number stored in $N_{MAX}$ register 197.

Control State 10

A control signal transmitted via OR-gate 123 to OR-gate 200 turns AND-gate 201 on and allows the number stored in IDUM register 186 to be used in the selection of an output node number for memory 150 at OR-gate 156. The numbers stored in registers ID(1,IDUM), ID(3,IDUM) and ID(4,IDUM) are then transmitted from outputs 161, 163 and 164, respectively, to AND-gates 227, 228 and 229, respectively. The control signal is also being transmitted to AND-gates 227, 228 and 229 so that the numbers stored in ID(1,IDUM), ID(3,IDUM) and ID(4,IDUM) are now also stored in IT(1) register 230, IT(2) register 231 and IT(3) register 232, respectively.

Control State 11

During this state the ID1, ID3 and ID4 registers of the node having the same number as is stored in IDUM register 186 must be stored in the ID1, ID3 and ID4 registers, respectively, of the node having the same number as is stored in K register 233. This is accomplished when the control signal is transmitted to AND-gate 235 via OR-gate 270 and to AND-gates 236, 237 and 238, thereby turning each of them on. AND-gate 235 allows the number stored in K register 233 to be used in selecting the node number for the outputs of memory 150 at OR-gate 156. ID(1,*k*), ID(2,*k*) and ID(3,*k*) are then transmitted via outputs 161, 163 and 164, respectively, to AND-gates 236, 237 and 238, respectively. Since these AND-gates are on during this control state, the numbers being transmitted from outputs 161, 163 and 164 are in effect being transmitted to OR-gates 157, 159 and 160, respectively. The control signal is also being transmitted to AND-gate 222 via OR-gate 221. This allows the number stored in IDUM register 186 to be utilized in selecting the node number of the registers to receive the new inputs from OR-gates 157, 159 and 160. Thus, ID(1,IDUM) has been set equal to ID(1,*k*), ID(3,IDUM) has been set equal to ID(3,*k*), and ID(-4,IDUM) has been set equal to ID(4,*k*).

Control State 12

It is now necessary to transfer the information stored in the IT1, IT2 and IT3 registers 230–232 to ID1, ID2 and ID3 registers, respectively, having the same node number as the number stored in k register 233. Thus AND-gate 234 is turned on by the control signal, allowing the number stored in k register 233 to be utilized in the selection of an input node number for memory 150 at OR-gate 155. The control signal also turns on AND-gates 239, 240 and 241, thus allowing the numbers stored in IT(1) register 230, IT(2) register 231 and IT(3) register 232 to also be stored in the ID(1,*k*), ID(3,*k*) and ID(4,*k*) registers, respectively, via OR-gates 157, 159 and 160.

Control State 13

The node number of the output selector at OR-gate 156 of memory 150 is set to the number stored in IDUM register 186, as the control signal is transmitted to AND-gate 201 via OR-gates 223 and 200. The number stored in the ID(3,IDUM) register is thus transmitted from output 163 of memory 150 to AND-gate 242. AND-gate 242 is turned on by the control signal being applied to OR-gate 243, and the number stored in the ID(3,IDUM) register is now also stored in IDUM register 186 via OR-gate 190.

The number in LEVEL register 191 must be increased by a decimal 1 during this control state. This is accomplished when the control signal from OR-gate 244 turns on AND-gate 245. The output of LEVEL register 191 is introduced into full adder 246 along with a decimal 1 provided by generator 247. The output of adder 246 (LEVEL+1) is transmitted through AND-gate 245 which is turned on and through OR-gate 194 to reset LEVEL register 191.

Control State 14

During this control state, a next control state decision must be made based on whether the number stored in the ID4 register of memory 150 having a node number, which is the same as the number stored in IDUM register 186, is less than zero. The outcome of this decision determines, in effect, whether or not there is an artificial level extending from the leaf level of the tree. In order to accomplish this operation, the control signal, transmitted to OR-gate 200 via OR-gate 223, turns on AND-gate 201 so that the number stored in IDUM register 186 is utilized in the selection of the node from which an ID4 output is to be obtained. Thus, the signal transmitted from output 164 of memory 150 is the number stored in the ID(4,IDUM) register. The signal is then transmitted from output 164 to the B-input of comparator 248. The A-input to comparator 248 is a decimal zero provided by generator 249. The output of comparator 248 is a logical 1 when ID(4,IDUM) is less than zero (negative), and as AND-gate 250 is turned on during this control state, such logical 1 is transmitted from output 91*b* to input 91*a* of the time pulse distributor. As a result, when ID(4,IDUM) is greater than zero, the next control state is 24 rather than 15.

Control State 15

ISET register 251 must be set to the value of the number stored in the ID3 register having the same node number as stored in IDUM register 186 divided by the number stored in the ID4 register having the same node number. This operation is accomplished when the control signal is transmitted to OR-gate 200 via OR-gate 223, thereby turning on AND-gate 201 and allowing the contents of IDUM register 186 to be transmitted to output select OR-gate 156 of memory 150. Outputs 163 and 164 of memory 150 are then the contents of the ID(3,IDUM) and ID(4,IDUM) registers, respectively. Both outputs 163 and 164 are connected to division arithmetic unit 252 wherein ID(3,IDUM) is divided by ID(4,IDUM). The quotient is then transmitted to AND-gate 253, which, because it is turned on at this control state, allows ISET register 251 to store such quotient.

Control State 16

A decision must be made during this control state as to what the next control state is going to be. When the contents of ISET register 251 are equal to the contents of the IDZ register 175, the counter of the time pulse distributor will merely continue to control state 17. When the contents of the two registers are not equal, however, the next control state must be 21. This is accomplished by XOR-gate 254 which compares the contents of the two registers and has a logical 1 output when the contents of the two are not equal. Output 80*b* which is connected to input 80*a* of the time pulse distributor subsystem is then a logical 1 to reset the counter to state 21 when AND-gate 255 is turned on by the control signal and a logical 1 from XOR-gate 254.

Control State 17

Output select OR-gate 156 of memory 150 is set to the contents of IDUM register 186 as the control signal is transmitted to OR-gate 200 via OR-gate 256, turning on AND-gate 201. Output 163 of memory 150 then transmits the contents of the ID(3,IDUM) register to full adder 257, where the contents are added to the contents of ID2 register 175. During this control state AND-gate 258 is turned on to allow the sum to be transmitted to OR-gate 159. Input select OR-gate 155 of memory 150 is also set to the contents of IDUM register 186 as the control signal is transmitted to OR-gate 221, turning on AND-gate 222. Thus, ID(3,IDUM)+ID2 from OR-gate 159 is stored in the ID(3,IDUM) register of memory 150.

Simultaneously, output 164 of memory 150 containing the contents of the ID(4,IDUM) register is connected to full adder 217 which adds a decimal 1 provided by generator 218. AND-gate 219 is turned on during this control state by a control signal transmitted via OR-gate 220. The output of AND-gate 219 containing ID(4,IDUM)+1 is then transmitted to OR-gate 160 and stored in the ID(4,IDUM) register of memory 150.

Control State 18

When this control state is reached, the system is ready to read in another set of input and desired output signals. Thus, the time pulse distributor subsystem of FIG. 25 will automatically reset the counter to control state 2 on the next clock pulse, as previously described with reference to that figure.

Control State 19

In a manner similar to the operation carried out during control state 14, the contents of the ID(4,IDUM) register of memory 150 is again compared to a zero provided by generator 249 in comparator 248. The output of comparator 248 is a logical 1 when ID(4,IDUM) is less than zero. When such condition occurs the logic 1 is transmitted via AND-gate 259 from output 92*b* to input 92*a* of the time pulse distributor subsystem, thereby causing the counter to reset the next control state to 40 rather than continuing to control state 20.

Control State 20

IW register 260 must be set to the contents of the ID3 register having a node number equal to the number stored in IDUM register 186 divided by the contents of the ID4 register having a node number equal to the node number stored in IDUM register 186. This is accomplished in a manner similar to the operation during control state 15. The control signal is applied to OR-gate 200 via OR-gate 223. The quotient of IE(3-,IDUM)/ID(4,IDUM) is derived from division arithmetic unit 252 and transmitted to AND-gate 262 which is turned on by a control signal to OR-gate 261. The quotient is then transmitted via OR-gate 263 to IW register 260 where it is stored.

Control State 21

Several operations occur during this control state. A decimal 1 provided by generator 264 is added to the contents of IC register 166 in full adder 265.

Then, the control signal transmitted via OR-gate 266 turns on AND-gate 266, allowing the sum from adder 265 to be stored in IC register 166 via OR-gate 169. Input select OR-gate 155 of memory 150 is set to the contents of IC register 166 as the control signal is transmitted to turn on AND-gate 269 via OR-gate 268. Output select OR-gate 156 of memory 150 is set to the contents of IDUM register 186 as a signal is transmitted to OR-gate 200 via OR-gate 199, turning on AND-gate 201.

Thus, on the control signal to OR-gate 270, the contents of the ID(1,IDUM), ID(3,IDUM) and ID(-4,IDUM) registers are transmitted via AND-gates 236, 237 and 238 to the ID(1,IC), ID(3,IC) and ID(4,IC) registers, respectively. In addition, the control signal is being transmitted via OR-gate 271 to AND-gate 272, thereby turning it on. This allows the sum from full adder 265 (IC+1) to be transmitted to OR-gate 158 and hence be stored in the ID(2,IC) register.

Control State 22

During this control state, the contents of IDUM register 186 determines the node numbers for input select OR-gate 155 and output select OR-gate 156 of memory 150, when the control signal is transmitted via OR-gate 221 to turn on AND-gate 222 and via OR-gate 199 and 200 to turn on AND-gate 201. Output 164 then contains the output of the ID(4, IDUM) register which is converted to −ID(4,IDUM) by INVERTER-gate 273 and added to a negative one provided by generator 274 in full adder 275. The sum (−ID(4,IDUM)−1) is then transmitted via AND-gate 276 which is on during this control state to OR-gate 160 where it is stored in the ID(4,IDUM) register.

Simultaneously, the control signal turns on AND-gate 277 which transmits the contents of IC register 166 to OR-gate 159, allowing the ID(3,IDUM) register of memory 150 to store such contents.

Control State 23

The contents of IC register 166 are increased by a decimal 1 when the control signal is applied to OR-gate 282 in a manner similar to the operation during control state 21.

Then, OR-gate 155 sets memory 150's input to the node having the same number as is contained in IC register 166 when the control signal is transmitted via OR-gate 268 turn on AND-gate 269, while OR-gate 156 sets memory 150's output to the node having the same number as is contained in IDUM register 186 when the control signal is transmitted via OR-gates 199 and 200 to turn on AND-gate 201. Output 161 of memory 150 is transmitted to OR-gate 157 via AND-gate 278 which is turned or during this control state, thereby inserting the contents of the ID(1,IDUM) register into the ID(-1,IC) register.

The control signal is also transmitted via OR-gate 279 to AND-gate 280 which is thereby turned on, allowing the contents of IC register 166 to be stored in the ID(2,IC) register via OR-gate 158.

AND-gate 281 is turned on when the control signal is introduced into OR-gate 282. The contents of IC register 166 are thereby transmitted via OR-gate 190 to IDUM register 186 where it is then stored.

Control State 24

A control signal to OR-gates 199 and 221 set both in the input selection and output selection of memory 150 to the contents of IDUM register 186 in the manner previously described. Output 164 of memory 150 is then transmitted to full adder 283 along with a negative one provided by generator 284. Because AND-gate 285 is on during this control state, the sum (ID((-4,IDUM)−1) is transmitted via OR-gate 160 back into the ID(4,IDUM) register where it is stored.

Outputs 163 of memory 150 transmits the contents of the ID(3,IDUM) register to AND-gate 242 which is turned on during this control state by a signal to OR-gate 242. The contents of the ID(3,IDUM) register are then transmitted via OR-gate 190 and stored in IDUM register 186.

Control State 25

IDD register 286 must be set to the contents of the ID3 register having a node number equal to the number stored in IDUM register 186, divided by the contents of the ID4 register having a node number equal to the node number stored in IDUM register 186. This is accomplished in a manner similar to the operation during control state 15. The control signal is applied to OR-gate 200 via OR-gate 223 The quotient of ID(-3,IDUM)/ID(4,IDUM) is derived from division arithmetic unit 252 and transmitted to AND-gate 287 which has been turned on during this control state. The quotient is then stored in IDD register 286.

Control State 26

During this control state the contents of IDD register 286 are compared with the contents of ID2 register 175 to determine the next control state. The outputs of both registers 286 and 175 are compared in XOR-gate 288 which produces a logical 1 output when the contents of both registers are unequal. The output of XOR-gate 288 is then complemented in NOT-gate 289. As a result, AND-gate 290 transmits a logic 1 signal from output 75b to input 75a of the time pulse distributor of FIG. 25 when the contents of registers 286 and 175 are equal, thereby resetting the counter to control state 17.

Control State 27

The contents of the ID2 register of memory 150 having the same node number as is contained in IDUM register 186 must be compared with the contents of register 186. Output select OR-gate 156 is set to the contents of IDUM register when AND-gate 201 is turned on by a control signal transmitted via OR-gates 256 and 200. The contents of the ID(2,IDUM) register at output 162 of memory 150 are transmitted to comparator 291 along with the output of IDUM register 186. When the contents of the ID(2,IDUM) register are less than or equal to the contents of register 186, the output of comparator 291 is a logical 0, and the output of NOT-gate 292 is a logical 1, which is then transmitted from output 81*b* to input 81*a* of the time pulse distributor via AND-gate 293 to reset the counter to control state 29.

Control State 28

The control signal transmitted to OR-gate 200 via OR-gate 256 turns on AND-gate 201, allowing the contents of IDUM register 186 to determine the output node number of ID2 in memory 150 at OR-gate 156. The contents of the ID(2,IDUM) register at output 162 of memory 150 are thereby transmitted to AND-gate 294 which, being turned on by the control signal from OR-gate 295, in turn transmits the signal to IDUM register 186 via OR-gate 190 where it is stored.

Control State 29

The contents of IC register 166 increased by a decimal 1 is to be inserted in the ID2 register of memory 150 having the same node number as is contained in IDUM register 186. This is accomplished when the control signal is applied to OR-gate 221, turning on AND-gate 222, thereby transmitting the contents of IDUM register 186 to input selection OR-gate 155 of memory 155, and to AND-gate 272 via OR-gate 271, thereby transmitting the sum from full adder 265 (IC+1) to OR-gate 158. The sum is then stored in the ID(2,IDUM).

Control State 30

A decision is to be made as to the next control state based on a comparison of the contents of $N_{MAX}$ register 197 and ID4 register of memory 150 having the same node number as is contained in IDUM register 186.

The ID(4,IDUM) register is selected from memory 150 when the control signal is applied to AND-gate 201 via OR-gates 256 and 200, allowing the contents of IDUM register 186 to be transmitted to OR-gate 156. The contents of $N_{MAX}$ register 197 are then compared with the contents of the ID(4,IDUM) register in comparator 296. The output of comparator 296 is a logical 0 when $N_{MAX}$ is not greater than ID(4,IDUM). When such condition occurs, the output of NOT-gate 297 is a logical 1 which is transmitted by AND-gate 298 to output 93b and thereby to input 93*a* of the time pulse distributor subsystem which resets the counter to control state 32.

Control State 31

$N_{MAX}$ register 197 is set to the contents of the ID4 register of memory 150 having the same node number as is presently stored in IDUM register 186. This is accomplished as the control signal is applied to AND-gate 201 via OR-gates 256 and 200, thereby introducing the contents of IDUM register 186 into output selection OR-gate 156. Output 164 of memory 150 (ID(-4,IDUM)) is then transmitted to $N_{MAX}$ register 197, via AND-gate 299 and OR-gate 198, where it is stored.

Simultaneously, k register 233 is set equal to the contents of IDUM register 186 as the control signal turns on AND-gate 300.

Control State 32

When the contents of the ID2 register of memory 150 having its node number equal to the contents of IDUM register 186 is not greater than or equal to the contents of register 186, the next control state is to be 34 in a training mode of operation and 45 is an execution mode of operation. This is accomplished by comparing the contents of the ID(2,IDUM) register, derived from output 162 of memory 150 when the control state is applied to AND-gate 201 via OR-gate 256 and 200, with the contents of IDUM register 186 in comparator 301 and XOR-gate 302. The output of comparator 301 is a logical 1 when IDUM is greater than ID(2,IDUM) which is then transmitted from output 98*b* via OR-gate 304 and AND-gate 305 to input 98*a* of the time pulse distributor subsystem of FIG 25. The output of XOR-gate 303 is a logical 0 when ID(2,IDUM) is equal to IDUM, an hence a logical 1 is at the output of NOT-gate 302 to be transmitted from output 98*b* via OR-gate 304 and AND-gate 305 to input 98*a* of the time pulse distributor subsystem. The time pulse distributor then resets the counter to control state 34 when switch 100 is in the TRAIN position and to control state 45 when switch 100 is in the EXECUTE position.

Control State 33

The control state is applied to AND-gate 201 via OR-gates 256 and 200, thereby allowing the contents of IDUM register 186 to select the node number for an ID2 register at output 162. The contents of the ID(-2,IDUM) register are then inserted in IDUM register 186 via OR-gate 190 when AND-gate 294 is turned on by the application of the control signal to OR-gate 295.

Controls State 34

IC register is increased by a decimal 1 as the control signal is applied to turn on AND-gate 267 via OR-gate 266, thereby allowing the contents of full adder 265 to be stored in register 166 via OR-gate 169 in a manner similar to the same operation during control state 21.

Then, the control signal is applied to AND-gate 269 via OR-gate 268, setting input select OR-gate 155 of memory 150 to the number now stored in IC register 166, and output select OR-gate 156 of memory 150 is set to the value of IDUM register 186 as the control signal is applied to AND-gate 201 via OR-gates 223 and 200. Output 162 of memory 150 (ID(2,IDUM)) is thereby transmitted to the ID(2,IC) register via AND-gate 306 and OR-gate 158 where it is stored. The control signal transmitted via OR-gate 203 turns on AND-gate 204, allowing decoder 205 to be set to the value stored in LEVEL register 191. As in the operation during control state 6, the output of OR-gate 210 is now the value of the IX(LEVEL) register. IX(LEVEL) is now stored in the ID(1,IC) register via AND-gate 307 and OR-gate 157, as the control signal is applied to AND-gate 307 via OR-gate 308. The value stored in IC register 166 increased by a decimal 1 at full adder 265 is inserted in the ID(3,IC) register of memory 150 as the control signal is applied to AND-gate 210 via OR-gate 308. A decimal 1, provided by generator 211 is inserted in the ID(4,IC) register of memory 150 as the control signal, transmitted via OR-gate 308, turns on AND-gate 312.

Control State 35

Input select OR-gate 155 of memory 150 is set to the number stored in IDUM register 186 when the control signal, transmitted via OR-gate 221, turns on AND-gate 222. The contents of IC register 166 are then stored in the ID(2,IDUM) register of memory 150 as it is transmitted via OR-gate 158 when AND-gate 280 is turned on by the control signal being applied to OR-gate 279.

Control State 36

In a manner similar to the operation during control state 7, the contents of LEVEL register 191 are compared to the contents of N register 170 by XOR-gate 213. The output of NOT-gate 214 is a logical 1 when LEVEL is equal to N. Such logic 1 is transmitted via AND-gate 313 to output 82*b* which is connected to input 82*a* of the time pulse distributor, thereby resetting the counter to control state 39.

Control State 37.

The contents of both LEVEL register 191 and IC register 166 are increased by a decimal 1 during this control state. AND-gate 267 is turned on by a control signal to OR-gate 266, thereby allowing the sum (IC+1) from full adder 265 to be inserted into register 166 via OR-gate 169. A decimal 1, provided by generator 314, is added to the contents of LEVEL register 191 in full adder 246 and then transmitted via AND-gate 245 and OR-gate 194 to register 191 where it is stored.

Control State 38.

In manner identical to the operation during control state 34, the ID(1,IC) register of memory is set equal to the contents of the IX(LEVEL) register, the ID(3,IC) register of memory 150 is set equal to the contents of the IC register 166 increased by a decimal 1 and the ID(4,IC) register is set equal to a decimal 1.

In addition, the ID(2,IC) register is set equal to the contents of IC register 166 when AND-gate 280 is turned on by the control signal being transmitted to it via OR-gate 279.

Control State 39.

Input select OR-gate 155 is set to the contents of IC register 166 when the control signal is applied to AND-gate 269 via OR-gate 268. A digital 0 from generator 315 is then stored in the ID(3,IC) and ID(4,IC) via OR-gate 159 and 160, respectively, when AND-gate 316 is turned on by the control signals. AND-gate 281 is also turned on during this control state via OR-gate 282, allowing the contents of IC register 166 to be stored in IDUM register 186 via OR-gate 190.

Control State 40.

The control signal is now applied to AND-gate 201 via OR-gates 266 and 200, allowing output select OR-gate 156 to be set to the contents of IDUM register 186. Output 163 of memory 150 now contains the contents of the ID(3,IDUM) register which is stored in IDUM register 186 when the control signal is applied to AND-gate 242 via OR-gate 243. AND-gate 317 is turned on by a control signal to OR-gate 318, thereby allowing a digital 0 provided by generator 318 to be stored in IND register 320 via OR-gate 321.

Control State 41.

During this control state a decision must be made as the next control state. Output select OR-gate 156 is set to the contents of IDUM register 186 when AND-gate 201 is turned on by a control signal via OR-gates 256 and 200. Output 164 of memory 150 (ID(4,IDUM)) is then compared with the contents of IND register 320 in comparator 322. The output of comparator 322 is a logical 1 when the contents of ID(4,IDUM) register are greater than the contents of IND register 320. As AND-gate 323 is turned on during this control state, output 94*b* transmits such logical 1 to input 94*a* of the time pulse distributor subsystem, thereby allowing the next control state to be set to 44.

Control State 42.

Again during this control state a decision must be made as to the next control state. Output select OR-gate 156 of memory 150 is to the contents of IDUM register 186 when the control signal is applied to AND-gate 201 via OR-gates 256 and 200. Output 162 of memory 150 then contains the contents of ID(2,IDUM) register which is compared with the contents of IDUM register 186 in comparator 291. When the contents of ID(2,IDUM) register are not greater than the contents of IDUM register 186, the output of comparator 291 is a logical 0 and the output of NOT-gate 292 is a logical 1. As AND-gate 327 is turned on by the control signal being applied thereto, such logical 1 is transmitted from output 89*b* to input 89*a* of the time pulse distributor subsystem of FIG. 25, resetting the counter to control state 18.

Control State 43.

The contents of IDUM register 186 are set to the contents of the ID2 register for the node number contained in IDUM register 186. This is accomplished when the control signal is applied to AND-gate 201 via OR-gates 324 and 200, allowing the contents of IDUM register 186 to select the node number of memory 150 at OR-gate 156. Output 162 of memory 150 then transmits the contents of the ID2 register having node number IDUM to IDUM register 186 via OR-gate 190 when AND-gate 294 is turned on by the control signal being applied to OR-gate 295.

Control State 44.

Output select OR-gate 156 of memory 150 is set to the contents of IDUM register 186 when the control signal is applied to AND-gate 201 via OR-gates 223 and 200. IND register 220 is then set equal to the contents of the ID(4,IDUM) register from output 164 of memory 150 as the control signal is applied to AND-gate 328. In a manner identical to the same operation during control state 20, IW register 260 is set to the contents of the ID3 register having the same node number as is contained in IDUM register 186 divided by the contents of the ID4 register having the same node number as is contained in IDUM register 186.

Control State 45.

This control state is utilized to turn on the ESP subsystem utilized in conjunction with one embodiment of the invention. In those embodiments not utilizing ESP, control states 45–75 are skipped and the time pulse distributor counter would be automatically set to control state 76. The operations carried out during control states 45–75 are illustrated in the flow charts of FIGS. 22–25, as previously mentioned.

Control State 46.

JC register 329 is set to a decimal 0 provided by generator 332 via OR-gate 330 when AND-gate 331 is turned on by the control signal applied to OR-gate 333 I register 334 is set to a decimal 1 provided by generator 337, via OR-gate 335, as the control signal is applied to AND-gate 336. IDUM register 186 is also set to a decimal 1 provided by generator 189 via OR-gate 190 as AND-gate 188 is turned on by the control signal being applied to OR-gate 187. In addition, ITOT register 228 is set, via OR-gate 341, to a decimal 0 provided by generator 340 as AND-gate 339 is turned on by the control signal.

Control State 47.

As mentioned previously with respect to the ESP subsystem, DIF is defined as the absolute difference between two numbers. During this control state, the DIF between the contents of the ID1 register for the node having the same number as is contained in IDUM register 186 and one of IX registers 182, 183, 184 or 185. The particular IX register to be utilized is defined by the value (from 1 – 4) stored in I register 334 and transmitted via OR-gate 202 to decoder 205 when AND-gate 342 is turned on by the control signal to OR-gate 343. The output of OR-gate 210 contains the contents of the IX register to be utilized which is then transmitted to binary subtractor 334. The control signal is also applied to AND-gate 201 via OR-gate 324 and 200 to transmit the contents of the ID(1,IDUM) register of memory 150 to binary subtractor 344. The output of subtractor 344 is the difference between the contents of the ID(1,IDUM) register and the contents of the IX(I) register. When this difference is negative, it is automatically converted to a positive number by inverter 345, allowing the output of OR-gate 346 to be the DIF of the two numbers.

Simultaneously, the control signal being applied to AND-gate 347 via OR-gates 348 and 349 allows the contents of I register 334 to be transmitted via OR-gate 350 to decoder 351 and thereby select a corresponding IE register 352 (IE(I)) in which the DIF is stored as AND-gate 353 is turned on.

The control signal is also utilized to turn on AND-gate 354, via OR-gate 405, allowing the contents of IDUM register 186 to be stored in a K(I) register 355, the particular K( ) register being defined by the contents of I register 334 transmitted to decoder 356.

In addition, during this control state the contents of ITOT register 339 are added to the IE(I) register 352 and stored in ITOT register 338. The addition is accomplished in full adder 357 and stored in ITOT register 338, via OR-gate 341, when AND-gate 358 is turned on by the control signal.

Control State 48

During this control state, a decision is made as to the next control state, based on the equivalency of the contents of I register 334 and N register 170. The comparison takes place in XOR-gate 359. The output of XOR-gate 359 is a logical 0 when N is equal to I and therefore the output of NOT-gate 360 is a logical 1. Such logical 1 is transmitted, via AND-gate 361, from output 76*b* to input 76*a* of the time pulse distributor subsystem to reset the counter thereof to control state 50.

Control State 49

AND-gate 201 is turned on by the control signal being applied to OR-gates 324 and 200, allowing the contents of IDUM register to select the output node at OR-gate 156 of memory 150. Output 163 of memory 150 then contains the contents of the ID(3,IDUM) register which contents are stored in IDUM register 186 when the control signal is applied to AND-gate 242 via OR-gate 243.

The contents of I register 334 are increased by a decimal 1, provided by generator 362, in full adder 363. The sum is then transmitted via AND-gate 364 (which is turned on by the control signal being applied to OR-gate 365) via OR-gate 335 to I register 334 where it is stored.

Control State 50

The contents of ITOT register 338 are inserted into ITOTAL register 366 when the control signal is applied to turn on AND-gate 367. The contents of JC register are increased by a decimal 1 provided by generator 369 in full adder 368. The sum at the output of adder 368 is then stored via OR-gate 330 in JC register 329 as the control signal is being applied to AND-gate 370.

Control State 51

A decision is made during this control state based on whether the contents of the ID4 register of node IDUM is greater than a decimal 0 or negative. In effect, this is a test for the existence of the artificial level extending from the last real level of the tree. The decimal 0 is provided by generator 373. The ID(4,IDUM) register is selected when the control signal, transmitted via OR-gates 324 and 200, turns on AND-gate 201. The comparison of the contents of the ID(4,IDUM) register from output 164 of memory 150 to the decimal 0 then takes place in comparator 371 which generates a logical 1 output when ID(4,IDUM) is less than 0. Such logical 1 is then transmitted via AND-gate 372 from output 83*b* to input 83*a* of the time pulse distributor subsystem thereby resetting the counter to control state 54 on the next clock pulse.

Control State 52

The contents of JC register 329 are transmitted via OR-gate 375 to decoders 373 and 374, when the control signal is applied to turn on AND-gate 376 at OR-gate 377. Corresponding IGI and IAI registers 378 and 379 (IGI(JC) and IAI(JC)) are thereby selected. As the control signal is applied to OR-gate 223, output 163 of memory 150 contains the contents of the ID(-3,IDUM) register and output 164 of memory 150 contains the contents of the ID(4,IDUM) register. Output 163 is transmitted via AND-gate 380 to IGI(JC) register 378 and output 164 is transmitted via AND-gate 381 to IAI(JC) register 379 where they are respectively stored when the control signal is applied to OR-gate 382.

Control State 53

During this control state ITOT register 338 is set equal to its present contents less the contents of an IE register 352, ID(N). The ID(N) register is selected from IE registers 352 by decoder 351 when the contents of N register 170 are inserted into decoder 351 by the control signal being applied to AND-gate 383. The contents of the ID(N) register are transmitted to subtractor 384 along with the present contents of ITOT register 338. The difference (ITOT-IE(N)), is then stored in ITOT register 338 as the conrol signal being applied to OR-gate 386 turns on AND-gate 385.

Control State 54

The control signal being applied to OR-gate 324 sets output select OR-gate 156 of memory 150 to the contents of IDUM register 186. Output 163 of memory 150 thereby transmits the contents of the ID(3,IDUM) register via AND-gate 387 to IC register 166 where it is stored. IND register 320 is set to a decimal 0 when the control signal being applied to OR-gate 318 turns on AND-gate 317.

Control State 55

Output select OR-gate 156 of memory 150 is set to the contents of IC register 166 when the control signal is applied to turn on AND-gate 388 via OR-gate 389. Output 164 of memory 150 thereby transmits the contents of the ID(4,IC) register to comparator 390. The output of comparator 390 is a logical 1 when the contents of the ID(4,IC) register are greater than the contents of IND register 320, and therefore the output of NOT-gate 391 is a logical 1 when the contents of the ID(4,IC) register are not greater than the contents of IND register 320.

The output of NOT-gate 391 is transmitted from output 95*b* to input 95*a* of the time pulse distributor subsystem to reset the control state to 57 as AND-gate 392 is turned on.

Control State 56

Outputs 163 and 164 transmit the contents of the ID(3,IC) and ID(4,IC) registers to AND-gates 380 and 381, respectively, as the control signal is applied to OR-gate 389. The contents of the ID(3,IC) register are stored in the IGI(JC) register and the contents of the ID(4,IC) register are stored in the IAI(JC) register in an identical manner to the same operation performed during control state 52 when the control signal is applied to OR-gates 377 and 382.

In addition, the contents of the ID(4,IC) register are stored in IND register 320 as the control signal is applied to OR-gate 328.

Control State 57

During this control state the contents of the ID2 register of memory 150 having the same node number as is stored in IC register 166 are compared to the contents of IC register 166 in determining the next control state. The contents of the ID(2,IC) register, provided at output 162 of memory 150 when the control signal is applied to OR-gate 389, are transmitted to comparator 325 along with the contents of IC register 166. The output of comparator 325 is a logical 1 when the contents of the ID(2,IC) register are not greater than the contents of IC register 166 and the corresponding output of NOT-gate 390 is a logical 1. Such logical 1 is transmitted via AND-gate 326 from output 78*b* to input 78*a* of the time pulse distributor subsystem to set the counter to control state 59.

Control State 58

The control signal applied to OR-gate 389 sets output signal OR-gate 156 of memory 150 to the node having the same number as is stored in IC register 166. Output 162 (ID(2,IC)) is stored in IC register 166 as it is transmitted via AND-gate 391.

Control State 59

A decision is made during this control state based on whether the contents of the ID(2,IDUM) register are greater than the contents of IDUm register 186. The contents of the ID(2,IDUM) register are provided at output 162 of memory 150 when the control signal is applied to AND-gate 201 via OR-gates 324 and 200. The comparison takes place in comparator 291, from which the output is a logical 1 when ID(2,IDUM) is greater than IDUM, thereby transmitting a signal via AND-gate 392 from output 84*b* to input 84*a*, resetting the counter thereof to control state 68.

Control State 60

The control signal being applied to OR-gate 324 provides the contents of the ID(2,IDUM) register at output 162 of memory 150 which is then stored in IDUM register 186 as the control signal is applied to turn on AND-gate 294 via OR-gate 295.

Control State 61

The operation of the system during this control state is identical to the operation of the system during control state 47.

Control State 62

The contents of ITOT register 338 and of ITOTAL register 366 are compared in comparator 393. The output of comparator 393 is a logic 1 when ITOT is greater than ITOTAL, thereby transmitting such logic 1 via AND-gate 394 from output 90*b* to input 90*a* of the time pulse distributor subsystem, thereby resetting the counter to control state 67.

Control State 63

The contents of I register 334 are compared to the contents of N register 170 at XOR-gate 395 in the same manner as the comparison was made during control state 48. A logic 1 signal is transmitted via AND-gate 395 from output 96*b* to input 96*a*, thereby resetting the counter to control state 65 when I is not equal to N.

Control State 64

I register 334 is increased by a decimal 1 and IDUM register 186 is set to the contents of the ID(2,IDUM) register of memory 150 in the same manner as described with reference to control state 49.

Control State 65

The contents of ITOT register 338 are compared to the contents of ITOTAL register 366 in determining the next control state. The comparison takes place at XOR-gate 396. The output of XOR-gate 396 is a logic 1 when ITOT is not equal to ITOTAL. Such logic 1 is transmitted via AND-gate 397 from output 77*b* to input 77*a* of the time pulse distributor subsystem to reset the counter thereof to control state 50.

Control State 66

JC register 329 is set to a decimal 0 when the control signal is applied to OR-gate 333 as during control state 46.

Control State 67

An IE register 352 is selected by decoder 351 in accordance with the number contained in I register 334 when the control signal is applied to AND-gate 347 via OR-gate 349. The contents of the IE(I) register 338 and the difference then restored in ITOT register 338 in the same manner as the operation performed during control state 53.

Control State 68

The contents of I register 334 are decreased by a decimal 1 during this control state. The operation occurs in full adder 398 which adds a negative (−) one provided by generator 399 to the contents of I register 334. The control signal applied to AND-gate 400 allows the sum to be stored in I register 334 via OR-gate 335.

Control State 69

A decision is made during this control state as to the next control state, based on whether the contents of I register 334 are a decimal 0. The decimal 0 is provided by generator 401 and is compared with the contents of I register 334 at XOR-gate 402. The output of XOR-gate 402 is a logical 0 when I is equal to zero and hence the output of NOT-gate is a logical 1. As AND-gate 404 is turned on during this control state, such logic 1 is transmitted from output 85*b* to input 85*a* of the time pulse distributor subsystem to reset the counter to control state 71.

Control State 70

The contents of I register 334 are utilized in the selection of a K(I) register 355 by decoder 356. The contents of such K(I) register are then inserted into IDUM register 186 as the control signal is applied to AND-gate 406.

Control State 71

MAX register 407 is set to a decimal 0 provided by generator 408 when the control signal is applied to turn on AND-gate 409, thereby transmitting it via OR-gate 410 to MAX register 407. I register 334 is set to a decimal 0 provided by generator 412 when the control signal is applied to turn on AND-gate 411.

Control State 72

The contents of I register 334 are increased by a decimal 1 in the same manner as the operation during control state 49.

Control State 73

A decision is made during this control state as to the next control state based upon the equality of the values stored in I register 334 and JC register 329. The comparison takes place at XOR-gate 413. XOR-gate 413 has a logical 0 output when the contents of the two registers are equal and NOT-gate 414 has a logical 1 output. As AND-gate 415 is turned on during this control state, such logical 1 is transmitted from output 97*b* to input 97*a* of the time pulse distributor subsystem, thereby resetting the counter to control state 76.

Control State 74

The next control state is determined by a comparison of the contents of MAX register 407 and the IAI(I) register during this control state. The IAI(I) register is selected from IAI registers 379, when AND-gate 416 is turned on by the control signal applied to OR-gate 417, and the contents of I register 334 are transmitted to decoder 374. The comparison is made by comparator 418 which has a logic 0 output when IAI(I) is not greater than the contents of MAX register 407, and hence a logical 1 is provided by NOT-gate 419. As AND-gate 420 is turned on during this control state, such logical 1 is transmitted from output 86*b* to input 86*a* of the time pulse distributor subsystem to reset the counter to control state 76.

Control State 75

The contents of I register 334 are utilized in the selection of the IGI register 378 and an IAI register 379, as the control signal is applied to AND-gate 416, and the contents of I register 334 are inserted into decoders 373 and 374 at OR-gate 375. The contents of the IGI(I) register are then divided by the contents of the IAI(I) register in division arithmetic unit 421. The quotient is transmitted, via AND-gate 422, to IW register 260 where it is stored.

The contents of the IAI(I) register are also stored in MAX register 407 during this control state, as AND-gate 423 is turned on.

Control State 76

The actual output X of the system is now stored in IW register 260 and the total number of occurrences that such output was associated with the particular input signal is stored in MAX register 407. The contents of these registers may be read out of the system at outputs 426 and 427 when AND-gates 424 and 425 are turned on by the control signal.

As previously discussed, a general-purpose digital computer may be regarded as a storeroom of electrical parts and when properly programmed, becomes a special purpose digital computer or special electrical circuit. The FORTRAN IV program of TABLE II carries out essentially the same operations in a general-purpose digital computer having a compatible FORTRAN IV compiler as the operations (represented by the flow charts of FIGS. 21–24) described above with reference to the special-purpose computer of FIGS. 25 and 26. TABLE III is a cross-reference chart indicating which FORTRAN statements in the program correspond to which control states of the flow charts and special-purpose computer.

Several embodiments of the trainable nonlinear classification recognition system of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will be apparent to persons skilled in the art, without departing from the spirit and scope of the invention.

TABLE II

```
1...          DIMENSION ID(4,3000), IX(4), IP(14),
                IAD(144),IDD(12,12)
2...          EQUIVALENCE (IAD(1), IDD(1,1))
3...          DATA ID/12000*0/
4...          LOGICAL*4 IGROW
5...          N=4
6...          IX(1)=1
7...          IC=0
8...     1    READ(5,101,END=4) IGROW,NREP
9...   101    FORMAT(L5,I5)
10...         DO 3 IREP=1,NREP
11...    8    CONTINUE
12...         READ(12,END=1000) IP
13..1000      CONTINUE
14...         IDZ=IP(1)
15...         IF(IDZ.NE.4.AND.IDZ.NE.15) GO TO 8
16...         DO 210 I=3,14
17...         DO 210 J=1,12
18...         ICAL=19+J
19...         IDD(I-2,J)=IFLD(ICAL,1, IP(I))
20... 210     CONTINUE
21...         KXI=168
22...         DO 2 IXI=2,4
23...         KXI=KXI-24
24...         IX(IXI)=0
25...         DO 2 J=1,24
26...         L=J-1
27...    2    IX(IXI)=IX(IXI)+(2**L)*IAD(KXI-L)
28...         IX(3)=1
29...         IX(2)=1
30...         CALL TREE(IX,IGROW,IC,IDZ,IW,ID,N)
31...         IF(IGROW) GO TO 3
32...         IF(IW.EQ.IDZ) GO TO 3
33...         WRITE(6,100) IDZ,IW
34... 100     FORMAT(1X,2I10)
35...    3    CONTINUE
36...         IF(IGROW) GO TO 1
37...    4    CONTINUE
38...         STOP
39...         END
40...         SUBROUTINE
                TREE(IX,IGROW,IC,IZ,IW,ID,N)
41...         DIMENSION ID(4,1),IX( 1)
42...         LOGICAL*4 IGROW
43...         IDUM=1
44...         LEVEL=1
45...    1    CONTINUE
46...         NMAX=10**6
47...    2    CONTINUE
48...         IF(ID(1,IDUM).NE.IX(LEVEL)) GO TO 10

49...         IF(LEVEL. EQ. N) GO TO 20
50...         IF(.NOT.IGROW) GO TO 30
51...         ID(4,IDUM) =ID(4,IDUM)+1
52...         IF(ID(4,IDUM).LE.NMAX) GO TO 30
53...         IT1=ID(1,IDUM)
54...         IT2=ID(3,IDUM)
55...         IT3=ID(4,IDUM)
56...         ID(1,IDUM)=ID(1,K)
57...         ID(3,IDUM)=ID(3,K)
58...         ID(4,IDUM)=ID(4,K)
59...         ID(1,K)=IT1
60...         ID(3,K)=IT2
61...         ID(4,K)=IT3
62...   30    CONTINUE
63...         IDUM=ID(3,IDUM)
64...         LEVEL=LEVEL+1
65...         GO TO 1
66...   20    CONTINUE
67...         IF(.NOT.IGROW) GO TO 40
68...         IF(ID(4,IDUM).LT.O) GO TO 50
69...         ISET=ID(3,IDUM)/ID(4, IDUM)
70...         IF(ISET.NE.IZ) GO TO 60
71...   70    CONTINUE
72...         ID(3,IDUM)=ID(3,IDUM)+IZ
73...         ID(4,IDUM)=ID(4,IDUM)+1
74...         RETURN
75...   40    CONTINUE
76...         IF(ID(4,IDUM).LT.O) GO TO 51
77...         IW=ID(3,IDUM)/ID(4,IDUM)
78...         RETURN
79...   60    CONTINUE
```

```
80...       IC=IC+1
81...       ID(1,IC)=ID(1,IDUM)
82...       ID(2,IC)=IC+1
83...       ID(3,IC)=ID(3,IDUM)
84...       ID(4,IC)=ID(4,IDUM)
85...       ID(3,IDUM)=IC
86...       ID(4,IDUM)=-ID(4,IDUM)-1
87...  77   IC-IC+1
88...       ID(1,IC)-ID(1,IDUM)
89...       ID(2,IC)=IC
90...       IDUM=IC
91...       GO TO 70
92...  50   CONTINUE
93...       ID(4,IDUM)=ID(4,IDUM)-1
94...       IDUM=ID(3,IDUM)
95... 607   IDD=ID(3,IDUM)/ID(4,IDUM)
96...       IF(IDD.NE.IZ) GO TO 605
97...       GO TO 70
98... 605   IF(ID(2,IDUM).LE.IDUM) GO TO 606
99...       IDUM=ID(2,IDUM)
100...      GO TO 607
101..606    ID(2,IDUM)=IC+1
102...      GO TO 77
103.. 10    CONTINUE
104...      IF(.NOT.IGROW) GO TO 11
105...      IF(ID(4,IDUM).GE.NMAX) GO TO 11
106...      NMAX=ID(4,IDUM)
107...      K=IDUM
108... 11   CONTINUE
109...      IF(ID(2,IDUM).LE.IDUM) GO TO 12
110...      IDUM=ID(2,IDUM)
111...      GO TO 2
112... 12   CONTINUE
113...      IF(.NOT.IGROW) GO TO 999
114...      IC=IC+1
115...      ID(1,IC)=IX(LEVEL)
116...      ID(2,IC)=ID(2,IDUM)
117...      ID(3,IC)=IC+1
118...      ID(4,IC)=1
119...      ID(2,IDUM)=IC
120... 14   CONTINUE
121...      IF(LEVEL.EQ.N) GO TO 15
122...      LEVEL=LEVEL+1
123...      IC=IC+1
124...      ID(1,IC)=IX(LEVEL)
125...      ID(2,IC)=IC
126...      ID(3,IC)=IC+ 1
127...      ID(4,IC)=1
128...      GO TO 14
129... 15   ID(3,IC)=0
130...      ID(4,IC)=0
131...      IDUM=IC
132...      GO TO 70
133... 51   CONTINUE
134...      IDUM=ID(3,IDUM)
135...      IND=0
136... 81   CONTINUE
137...      IF(ID(4 IDUM) .GT. IND) GO TO 79
138... 82   CONTINUE
139...      IF(ID(2,IDUM).LE.IDUM) GO TO 80
140...      IDUM=ID(2,IDUM)
141...      GO TO 81
142... 79   IND=ID(4,IDUM)
143...      IW=ID(3,IDUM)/ID(4,IDUM)
144...      GO TO 82
145... 80   RETURN
146..999    CONTINUE
147...      CALL ESP(IX,ID,IW,N)
148...      RETURN
149...      END
150...      SUBROUTINE ESP(IX,ID,TW,N)
151...      DIMENSION IX(1),ID(4,1),
              IE(40),IGI(40),IAI(40), K(40)
152...      JC=0
153...      I=1
154...      IDUM=1
155...      ITOT=0
156...  1   ISET=IEXOR(ID(1,IDUM),IX(I)
157...      IE(I)=NBIT(LSET)
158...      K(I)=IDUM
159...      ITOT=IE(I)+ITOT
160...      IF(I.EQ.N) GO TO 2
161...      IDUM=ID(3,IDUM)
162...      I=I+1
163...      GO TO 1
164...  2   ITOTAL=ITOT
165...      JC=JC+1
166...      IF(ID(4,IDUM).LT.O) GO TO 4
167...      IGI(JC)=ID(3,IDUM)
168...      IAI(JC)=ID(4,IDUM)
169...  5   ITOT=ITOT-IE(N)
170...      GO TO 10
171...  4   IC=ID(3,IDUM)
172...      IND=0
173...  6   CONTINUE
174...      IF(ID(4,IC).LE.IND) GO TO 20
175...      IGI(JC)=ID(3,IC)
176...      IAI(JC)=ID(4,IC)
177...      IND=ID(4,IC)
178... 20   CONTINUE
179...      IF(ID(2,IC).LE.IC) GO TO 10
180...      IC= ID(2,IC)
181...      GO TO 6
182... 10   CONTINUE
183...      IF(ID(2,IDUM).LE.IDUM) GO TO 30
184...      IDUM=ID(2,IDUM)
185... 50   CONTINUE
186...      ISET=IEXOR(ID(1,IDUM),IX(I))
187...      IE(I)=NBIT(ISET)
188...      K(I)=IDUM
189...      ITOT=IE(I)+ITOT
190...      IF(ITOT.GT.ITOTAL) GO TO 40
191...      IF(I.EQ.N) GO TO 41
192...      I=I+1
193...      IDUM=ID(3,IDUM)
194...      GO TO 50
195... 41   CONTINUE
196...      IF(ITOT.NE.ITOTAL) JC=0
197...      GO TO 2
198... 40   ITOT=ITOT-IE(I)
199...      GO TO 10
200... 30   I=I-1
201. . .    IF(I.EQ.O) GO TO 100
202...      IDUM=K(I)
203...      GO TO 40
204..100    CONTINUE
205...      MAX= 0
206...      DO 200 I=1,JC
207...      IW-IGI(I)/IAI(I)
208...      MAX=IAI(I)
209...      IF(IAI)(I).LE.MAX) GO TO 200
210..200    CONTINUE
211...      RETURN
212...      END
```

TABLE III

| Program line | Control state |
|---|---|
| 1–7 | ① |
| 8–20 | ② |
| 21–30 | ③ |
| 31–44 | ④ |
| 45–46 | ⑤ |
| 47–48 | ⑥ |
| 49–50 | ⑦ |
| 51 | ⑧ |
| 52 | ⑨ |
| 53–55 | ⑩ |
| 56–58 | ⑪ |
| 59–62 | ⑫ |
| 63–65 | ⑬ |
| 66–68 | ⑭ |
| 69 | ⑮ |
| 70–71 | ⑯ |
| 72–73 | ⑰ |
| 74–75 | ⑱ |
| 76 | ⑲ |
| 77–78 | ⑳ |
| 79–84 | (21) |
| 85–86 | (22) |
| 87–91 | (23) |
| 92–94 | (24) |
| 95 | (25) |
| 96–97 | (26) |
| 98 | (27) |
| 99–100 | (28) |
| 101–102 | (29) |
| 103–105 | (30) |
| 106–108 | (31) |
| 109 | (32) |
| 110–111 | (33) |
| 112–118 | (34) |
| 119 | (35) |
| 120–121 | (36) |
| 122–123 | (37) |
| 124–128 | (38) |
| 129–132 | (39) |
| 133–135 | (40) |
| 136–137 | (41) |
| 138–139 | (42) |
| 140–141 | (43) |
| 142–145 | (44) |
| 146–147 | (45) |
| 148–149 | (76) |
| 150–151 | (45) |
| 152–155 | (46) |
| 156–159 | (47) |
| 160 | (48) |
| 161–162 | (49) |

TABLE III

| Program line | Control state | Program line | Control state | Program line | Control state |
|---|---|---|---|---|---|
| 163 | | 180 | (58) | 197 | |
| 164 | (50) | 181 | | 198 | (67) |
| 165 | | 182 | (59) | 199 | |
| 166 | (51) | 183 | | 200 | (68) |
| 167 | (52) | 184 | (60) | 201 | (69) |
| 168 | | 185 | | 202 | (70) |
| 169 | (53) | 186 | | 203 | |
| 170 | | 187 | (61) | 204 | |
| 171 | | 188 | | 205 | (71)-(72)-(73) |
| 172 | (54) | 189 | | 206 | |
| 173 | | 190 | (62) | 207 | |
| 174 | (55) | 191 | (63) | 208 | (74)-(75) |
| 175 | | 192 | | 209 | |
| 176 | (56) | 193 | (64) | 210 | |
| 177 | | 194 | | 211 | (76) |
| 178 | (57) | 195 | | 212 | |
| 179 | | 196 | (65)-(66) | | |

What is claimed is:

1. A classification recognition system comprising a trainable signal processor having at least one input signal and at least two corresponding desired output signals applied thereto during training and at least one actual output signal derived therefrom from an input signal during execution, comprising:

a. means for storing all of such two or more desired output signals identified with the same input signal, b. means for interrogating said processor during execution with an input signal, means responsive to the interrogation for defining two or more corresponding desired output signals corresponding to said input signal, said input signal having at least two corresponding desired output signals stored in said storage means, and c. means responsive to said interrogation means for selecting one or more of such desired output signals as the actual output of the system.

2. The classification recognition system of claim 1 wherein said selection means selects the entire set of all desired output signals identified with said same input signal as the actual output of the system.

3. The classification recognition system of claim 2 including means responsive to said storing means for accumulating and storing the number of occurrences that each of such two or more desired output signals was identified with said same input signal.

4. The classification recognition system of claim 3 including means for periodically rearranging in said processor the set of all desired output signals identified with said same input signal in the order of their occurrences whereby the desired output with the most occurrences comes earliest in the set.

5. A classification recognition system comprising a trainable signal processor having at least one input signal and at least one corresponding desired output signal applied thereto during training, and at least one actual output signal derived therefrom from an input signal during execution, a tree-allocated memory array, said input signal during training defining a path through the levels of said tree-allocated memory array, said corresponding desired output being stored at the leaf level of said tree-allocated memory array, said processor capable of identifying two or more desired output signals corresponding to the same input signal, a. an additional level of said tree-allocated memory array extending from a path beyond and through said normal leaf level for storing all such two or more desired output signals identified with the same input signal, b. means for interrogating said processor during execution with an input signal, said input signal having at least two corresponding desired actual output signals stored in said additional level of said tree-allocated memory array, and c. means responsive to said interrogating means for selecting a set of one or more of such desired outputs stored in such additional level as the actual output of the system.

6. A classification recognition system comprising a trainable signal processor having at least one input signal and at least one corresponding desired output signal applied thereto during training and at least one actual output signal derived therefrom from an input signal during execution comprising:

a. means for encoding said input signal into a plurality of key components, b. a tree-allocated memory array having a plurality of levels including leaf levels corresponding to said plurality of key components as encoded by said encoding means, said key components defining a path through the levels of said memory array normally terminating at a leaf level, the leaf levels of said tree-allocated memory array having means for storing one desired output corresponding to an input signal during training, c. at least one additional level of said tree-allocated storage array extending from a path through and beyond one of said leaf levels for storing all desired output signals identified with a same set of key components when two or more desired output signals have been identified with a same set of key components during training, d. said leaf level including means for indicating the existence of such additional level extending from said leaf level, e. means for sequentially comparing the key components of an input signal during execution with the key components defining paths through the levels of said tree-allocated memory array, f. first means responsive to said comparison means for selecting the desired output stored at a leaf level of said tree-allocated memory array as the actual output corresponding to the input signal during execution of the system when there is no additional level extending from the leaf level of a path defined by the key components of the input signal during execution, and g. second means responsive to said comparison means for selecting a set of one or more desired output signals stored in the additional level as the actual output of the system corresponding to the input signal when there is such an additional level extending from the leaf level of a path defined by the key components of an input signal during execution.

* * * * *